(12) United States Patent
Tsai et al.

(10) Patent No.: US 12,514,866 B2
(45) Date of Patent: Jan. 6, 2026

(54) METHOD FOR TREATING CANCER

(71) Applicant: National Taiwan University, Taipei (TW)

(72) Inventors: Hsing-Chen Tsai, Taipei (TW);
Chien-Ting Lin, Taipei (TW);
Chong-Jen Yu, Taipei (TW);
Tai-Chung Huang, Taipei (TW);
Rueyhung Roc Weng, Taipei (TW);
Hsuan-Hsuan Lu, Taipei (TW);
Jung-Chi Liao, Dallas, TX (US)

(73) Assignee: National Taiwan University, Taipei (TW)

( * ) Notice: Subject to any disclaimer, the term of this patent is extended or adjusted under 35 U.S.C. 154(b) by 91 days.

(21) Appl. No.: 17/578,589

(22) Filed: Jan. 19, 2022

(65) Prior Publication Data

US 2022/0226378 A1    Jul. 21, 2022

Related U.S. Application Data

(60) Provisional application No. 63/139,820, filed on Jan. 21, 2021.

(51) Int. Cl.
| | |
|---|---|
| A61K 31/706 | (2006.01) |
| A61K 31/513 | (2006.01) |
| A61K 31/708 | (2006.01) |
| A61K 40/11 | (2025.01) |
| A61K 40/42 | (2025.01) |
| A61P 35/00 | (2006.01) |
| C12N 5/0783 | (2010.01) |
| C12Q 1/6886 | (2018.01) |

(52) U.S. Cl.
CPC .......... *A61K 31/706* (2013.01); *A61K 31/513* (2013.01); *A61K 31/708* (2013.01); *A61K 40/11* (2025.01); *A61K 40/4254* (2025.01); *A61P 35/00* (2018.01); *C12N 5/0636* (2013.01); *C12Q 1/6886* (2013.01); *A61K 2239/31* (2023.05); *A61K 2239/55* (2023.05); *C12Q 2600/118* (2013.01); *C12Q 2600/158* (2013.01)

(58) Field of Classification Search
CPC ........ A61K 40/11; A61P 35/00; C12N 5/0636
See application file for complete search history.

(56) References Cited

U.S. PATENT DOCUMENTS

2021/0205361 A1    7/2021 Lisi et al.

OTHER PUBLICATIONS

Li (2019, OncoTargets and Therapy, 12:5627-5638).*
Wang (2021, Nature Communications, 12:409, 18 pages).*
Mirzaei (2016, Cancer Letters 380:413-423).*
Turtle, 2016, J Clin Invest, 126:2123-2138.*
Fan (2014, J Immunol Res, 371087, 14 pages).*
You (2020, Frontiers in Immunology, Aug. 18, 2020, 11:1787, 11 pages).*
International Search Report & Written Opinion for PCT Application Serial No. PCT/US2022/012857, mailed May 2, 2022, 11 pages.
Weng, R. R et al., "Epigenetic therapy remodels the immune synaptic cytoskeleton to potentiate cancer susceptibility to γδ T cells", bioRxiv, 2020[preprint May 2, 2020], pp. 1-85 https://www.biorxiv.org/content/10.1101/2020.04.30.069955v1.full.pdf.
Weng, R. R et al., "Epigenetic modulation of immune synaptic-cytoskeletal networks potentiates γδ T cell-mediated cytotoxicity in lung cancer", Nature communications, 2021[epub Apr. 12, 2021], vol. 12, article No. 2163, pp. 1-18.

* cited by examiner

*Primary Examiner* — Valarie E Bertoglio
(74) *Attorney, Agent, or Firm* — Amin, Turocy & Watson, LLP

(57) ABSTRACT

Provided herein are methods for treating or ameliorating malignant diseases, such as cancers. Also provided herein are methods of increasing the immunity of an immune cell toward malignant cells.

11 Claims, 54 Drawing Sheets
Specification includes a Sequence Listing.

H1299 KO-lCAM1

SEQUENCE LISTING

```
<160> NUMBER OF SEQ ID NOS: 9

<210> SEQ ID NO 1
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 1
tcaaaagtca tcctgccccg                                              20

<210> SEQ ID NO 2
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 2
gtgaccagcc caagttgttg                                              20
```

<210> SEQ ID NO 3
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 3
cgggatccat ggctcccagc agccc                                              25

<210> SEQ ID NO 4
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 4
cgggatcctc agggaggcgt ggctt                                              25

<210> SEQ ID NO 5
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 5
accgtgattc aagcttagcc                                                    20

<210> SEQ ID NO 6
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 6
ccggaacaaa tgctgcagtt                                                    20

<210> SEQ ID NO 7
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 7
tccacatcga aggcaaagta t                                                  21

<210> SEQ ID NO 8
<211> LENGTH: 19
<212> TYPE: DNA
<213> ORGANISM: Artificial Sequence
<220> FEATURE:
<223> OTHER INFORMATION: Synthetic oligonucleotide

<400> SEQUENCE: 8
cccctccttg accctacga                                                     19

<210> SEQ ID NO 9
<211> LENGTH: 19
<212> TYPE: DNA
<213> ORGANISM: Artificial Sequence
<220> FEATURE:

```
<223> OTHER INFORMATION: Synthetic oligonucleotide

<400> SEQUENCE: 9
ctgtctctta tacacatct                                                                 19
```

METHOD FOR TREATING CANCER

CROSS-REFERENCE TO RELATED APPLICATIONS

This application claims priority to U.S. Provisional Application Ser. No. 63/139,820 filed on Jan. 21, 2021, the entire contents of which are incorporated herein by reference.

BACKGROUND

1. Technical Field

The present disclosure relates to methods for treating or ameliorating malignant diseases, such as cancers. Also provided herein are methods of increasing the immunity of an immune cell to malignant cells.

2. Description of Related Art

While immune-based therapy is regarded as one of the most promising strategies in the treatment of cancers, there are still many needs to be met. For example, only a small subset of patients responds to current checkpoint blockade therapies, and many patients are still seeking proper and effective treatment.

Among others, the adoptive transfer of immune cells targeting tumor cells has emerged as an attractive therapeutic option. γδ T cells, a distinct subset of T cells that sense molecular stress signals from pathogen-infected or transformed cells, can display broad tumor-targeting capabilities in a major histocompatibility complex (MHC)-independent manner. These cells provide potential therapeutic opportunities for patients who are inherently unresponsive to checkpoint blockade due to low mutational burden, or have acquired defects along the T cell receptor (TCR)-MHC axis. However, it has been shown that the adoptive transfer of autologous or allogeneic γδ T cells showed limited efficacy. Thus, methods of preparing γδ T cells to enable and initiate their immune action against tumors are in need to increase the therapeutic efficacy of γδ T-based immunotherapy.

SUMMARY

The present disclosure relates to methods for treating or ameliorating malignant diseases, such as cancers. For example, the methods for treating or ameliorating cancers provided by the present disclosure are immunotherapies comprising the use of γδ T cells. In at least one embodiment, the methods for treating or ameliorating cancers provided by the present disclosure are immunotherapies comprising the use of γδ T cells and DNA demethylating agents. In at least one embodiment, the DNA demethylating agent is a DNA methyltransferase inhibitor (DNMTi). In some embodiments, DNA demethylating agents are used to increase the immunity of γδ T cells toward cancer cells. In some embodiments, the γδ T-based immunotherapy for treating or ameliorating cancers provided by the present disclosure comprises pretreating cancers with DNA demethylating agents before administering γδ T cells. In some embodiments, a method is provided to identify and distinguish a group of patients suitable for immunotherapy, comprising obtaining and analyzing immune cytoskeleton patterns presented by the cancer cells of a patient in need thereof.

In at least one embodiment, the present disclosure provides a method for treating or ameliorating cancer in a subject in need thereof, comprising administering a DNA demethylating agent and an immune cell to the subject. In some embodiments, the immune cell is a T cell, a natural killer T (NKT) cell or an NK cell. In some embodiments, the immune cell is a parental immune cell or an engineered immune cell. In some embodiments, the parental immune cell is an immune cell without artificial genetic modification. For example, in some embodiments, the parental immune cell is not genetically modified to be resistant to a cytotoxic therapeutic agent. In some embodiments, the engineered immune cells are chimeric antigen receptor T (CAR-T) cells, chimeric antigen receptor NKT (CAR-NKT) cells or chimeric antigen receptor NK (CAR-NK) cells. In some embodiments, the T cell is a γδ T cell. In some embodiments, the γδ T cell is a Vδ1+γδ T cell, a Vδ2+γδ T cell or a Vδ1⁻Vδ2⁻ γδ cell.

In at least one embodiment, the method provided by the present disclosure comprises an immune cell that is expanded ex vivo. In some embodiments, the immune cell is pretreated with the DNA methyltransferase inhibitor before being administered to the subject. In some embodiments, the pretreatment of the DNA methyltransferase inhibitor expands, activates, and/or increases identification, specificity, survival, sensitivity, homing, targeting and/or attacking of Vδ1+ T cells. In some embodiments, the polyfunctionality of the Vδ1+ T cells is increased.

In at least one embodiment, at least one level of CD226, CD244, CD2, and CRACC is increased in the immune cell pretreated with the DNA methyltransferase inhibitor. In some embodiments, at least one level of CD107A, TNF-α, granzyme B, IL-2 and IFN-γ is increased in the immune cell pretreated with the DNA methyltransferase inhibitor.

In at least one embodiment, the DNA methyltransferase inhibitor is decitabine, azacytidine, guadecitabine or Inqovi (decitabine and cedazuridine). In at least one embodiment, the DNA methyltransferase inhibitor increases the formation of an immune synapse between the immune cell and a cancer cell. In some embodiments, the formation of the immune synapse increases the expression of ICAM-1. In some embodiments, the formation of the immune synapse comprises increase of filamentous actin (F-actin) at the cancer cell near the immune synapse.

In at least one embodiment, the cancer is a cancer of skin, mucosa, gland or lung. In some embodiments, the cancer is a cancer that metastasizes to skin, mucosa, gland or lung. In some embodiments, the cancer is colon cancer, ovarian cancer, breast cancer, melanoma, esophageal cancer, head and neck mucosal cancer, genital mucosal cancer or lung cancer.

In at least one embodiment, a method for remodeling the immune cytoskeleton of a cancer cell is provided. In some embodiments, the method comprises contacting the cancer cell with the DNA methyltransferase inhibitor. In at least one embodiment, the remodeling of the immune cytoskeleton comprises modulation of expression of at least one gene of actin cytoskeleton, intermediate filament and microtubule. In at least one embodiment, the expression of a gene of the actin cytoskeleton and the intermediate filament are upregulated. In some embodiments, the expression of a gene of the microtubule is downregulated. In some embodiments, a methylation level of a promoter DNA of a gene of the actin cytoskeleton is decreased in the remodeling of the immune cytoskeleton of a cancer cell by the DNA methyltransferase inhibitor.

In at least one embodiment, a method for prognosing a subject having a cancer is provided, the method comprising: obtaining a cancer tissue from the subject; analyzing the expression of cytoskeletal genes in the cancer tissue; and determining prognosis based on the expression of the cytoskeletal genes. In at least one embodiment, the cytoskeletal genes comprise at least one of actin, intermediate filament, microtubule genes or any combination thereof.

BRIEF DESCRIPTION OF THE DRAWINGS

The present disclosure will become more readily appreciated by reference to the following descriptions in conjunction with the accompanying drawings.

FIG. 1A shows the experimental diagram of stable isotope labeling with amino acids in cell culture (SILAC)-based quantitative proteomics on biotinylated surface proteins in mock-treated vs. DAC-treated lung cancer cells. FIG. 1B shows the treatment schedule of DAC at 100 nM daily for 72 hours (D3), followed by drug withdrawal for three days (D3R3). FIG. 1C illustrates the Venn diagram showing the numbers of surface proteins identified at D3 and D3R3 in A549 cells. FIG. 1D shows a scatter plot of proteins upregulated at D3 and D3R3 in A549 cells following decitabine treatment. FIG. 1E illustrates a heatmap showing log 2 fold changes of immune-related surface molecules in DAC-treated vs. mock-treated A549 cells at D3 and D3R3. FIG. 1F illustrates the Venn diagram showing numbers of surface proteins commonly identified at D3R3 in A549, H1299, and CL1-0 cells. FIG. 1G illustrates the bar graphs showing relative protein abundance of selected surface proteins related to innate immunity in surface proteomes of A549, H1299, and CL1-0 cells following decitabine treatment at D3R3 as compared with mock-treated cells. FIG. 1H shows the PANTHER gene list analysis performed on immune-related pathways for proteins upregulated by decitabine at D3R3.

FIG. 2A illustrates the bar graphs showing percentages of γδ T cell subsets (i.e., Vδ1, Vδ2, non-Vδ1 non-Vδ2 cells) in the CD3+ population from the peripheral blood of a healthy donor following ex vivo expansion at day 0, 14 and 21. Data are presented as mean±standard error of the mean (SEM). FIG. 2S shows the representative flow cytometric analysis of Annexin V and propidium iodide (PI) apoptosis assays in human colon cancer cell line SW620 upon treatments with 100 nM decitabine alone, γδ T cells alone or DAC/γδ T cell combination, in which the effector-to-target (E:T) ratio is 3:1.

FIG. 3A shows the immunofluorescence imaging of immune synapses between H1299 lung cancer cells and γδ T cells by phosphotyrosine (pTyr) staining. H1299 lung cancer cells are pretreated with phosphate-buffered saline (PBS) or DAC prior to coculture with γδ T cells. Quantifications of immune synapses per cancer cell on eight randomly taken high power fields for each treatment are shown in the dot plots (mean±SD). Scale bar: 100 μm. p value is calculated by the MannWhitney test. FIG. 3B shows a scatter plot of DAC-induced surface proteomes in H1299 (y-axis) and A549 (x-axis) human lung cancer cells following daily treatment of 100 nM DAC for 72 hours and culture in drug-free medium for 3 days (D3R3). ICAM-1 is among the top upregulated surface proteins by DAC in both cells. FIG. 3C shows the Western blot analyses of ICAM-1 protein expression in mock-treated vs. DAC-treated human lung cancer cells. D3: daily treatment of 100 nM decitabine for 72 hours. D3R3: daily treatment for 72 hours, followed by a 3-day rest period in a drug-free medium. β-actin: loading control. FIG. 3D shows the immunofluorescence staining of ICAM-1 and immune synapse molecules (e.g., LFA-1, LAT) at immune synapses formed between γδ T cells and DAC-treated H1299 lung cancer cells. Scale bar: 10 μm. FIG. 3E shows the result of Sanger sequencing validation of the CRISPR/Cas9-edited ICAM1 genome locus of lung cancer cells. Multiple sequence alignments of the KO-ICAM1 cells are shown against the reference ICAM1 genome locus. Alignment gaps are indicated with a hyphen (–) to represent the lost (knockout) regions of the edited ICAM1 genome locus. FIG. 3F shows the cytometric analysis of lung cancer cells subject to CRIPSR knockout of ICAM-1 (left panels) or overexpression of ICAM-1 using a doxycycline (doxy)-inducible Tet-on system (right panels). Two independent clones of each genetic manipulation for A549, H1299, and CL1-0 cell lines are shown. X-axis: signal intensities of ICAM-1. Y-axis: forward scatter (FSC). FIG. 3G shows the representative flow cytometric dot plot showing H1299 lung cancer cells with CRISPR-knockout of ICAM1 (KO-ICAM1) subject to γδ T cell killing for 2 hours. The effector-to-target (E:T) ratio is 3:1. Lung cancer cells are pre-treated with mock, DAC alone, γδ T cells alone or a combination of DAC and γδ T cells. The X-axis denotes surface ICAM1 levels. Y-axis represents signal intensities of propidium iodide (PI). FIG. 3H shows the bar graphs showing percent cell death of human lung cancer cell lines (i.e., H1299, CL1-0, and A549) with CRISPR-knockout of ICAM-1 subject to γδ T cell killing for 2 hours. Cell death is measured by Annexin V and propidium iodide apoptosis assays (mean±SEM, n=3). Statistical significance is determined by one-way ANOVA test. FIG. 3I shows the representative flow cytometric dot plot showing H1299 lung cancer cells with a Tet-on expression system of ICAM1 (OV-ICAM1) subject to γδ T cell killing for 2 hours. Doxycycline (1 μg/mL) is added 24 hours prior to coculture to induce ICAM-1 protein expression. Cell death is measured by Annexin V (x-axis) and propidium iodide (y-axis) apoptosis assays. FIG. 3J illustrates the bar graphs showing cell death of human lung cancer cell lines (i.e., H1299, CL1-0, and A549) with ICAM-1 over-expression subject to γδ T cell killing for 2 hours. E:T ratio is 3:1. Cell death is measured by Annexin V and propidium iodide apoptosis assays. Statistical significance is determined by one-way ANOVA test (*: $p<0.05$; : $p<0.01$; *: $p<0.001$). FIG. 3K shows the immunofluorescence imaging of immune synapses between H1299 KO-ICAM1 lung cancer cells and γδ T cells by phosphotyrosine (pTyr) staining. Scale bar: 100 μm. Quantifications of immune synapses per cancer cell on six randomly taken high power fields for each treatment are shown in the dot plots (mean±SD). p value is calculated by the Mann-Whitney test. FIG. 3L shows the bar graphs showing relative protein abundance of putative ligands for γδ TCR in surface proteomes of A549, H1299 and CL1-0 cells following decitabine treatment at D3R3 as compared with mock-treated cells.

FIG. 4A shows the immunofluorescence staining of F-actin (red), ICAM-1 (green), pTyr (phosphotyrosine, white) at immune synapses between γδ T cells and DAC-pretreated H1299 lung cancer cells at D3R3. Accumulation of F-actin beneath the cell membrane is noted in DAC-pretreated lung cancer cells. DAPI: 4',6-diamidino-2-phenylindole, as a nuclear counterstain. Scale bar: 10 μm. FIG. 4B shows the representative immunofluorescence images of the interfaces between γδ T cells and H1299 lung cancer cells (parental vs. ICAM-1 knockout (KO-ICAM1)). Signals of F-actin (red) in the periphery of H1299 cancer cells are shown in two-and-a-half dimensional (2.5D) images in the lower panels. Scale bar: 10 μm. FIG. 4C shows the dot plots of signal intensities of F-actin (left panel) and ICAM-1 (right panel) from five pTry-positive immune synapses between γδ T cells and H1299 lung cancer cells (parental or KO-ICAM1). p value is calculated by two-way ANOVA test. FIG. 4D shows the representative immunofluorescence staining of F-actin (red), ICAM-1 (green), and pTyr (phosphotyrosine, white) at immune synapses between γδ T cells and H1299 lung cancer cells. Parental or ICAM-1 knockout (KO-ICAM1) H1299 cells are pretreated daily with PBS (Mock) or 100 nM DAC for 72 hours followed by 3-day drug-free culture before coculture with γδ T cells. Signal intensities of each protein (F-actin, ICAM-1, pTyr) along the immune synapse area are graphed on the right. DAPI: 4',6-diamidino-2-phenylindole, as nuclear counterstain. Scale bar: 10 μm. FIG. 4E shows the immunofluorescence images of immune synapses between γδ T cells (marked with T) and H1299 lung cancer cells (marked with C) stained for ICAM-1 (green), F-actin (Red) and phosphotyrosine (pTyr, white). Lung cancer cells (parental or KO-ICAM1) are pretreated with PBS (Mock) or 100 nM DAC and cocultured with γδ T cells at D3R3. FIG. 4F shows the dot plots of F-actin signal intensities at immune synapses between γδ T cells and H1299 cells. H1299 cells are pretreated with PBS (Mock), DAC alone or a combination of DAC pretreatment (D3R3) and 1 μg/mL Cyto B (cytochalasin B, an inhibitor of actin filament polymerization) for 1.5 hours prior to coculture with γδ T cells (mean±SD). p value is calculated by one-way ANOVA with Tukey's multiple comparisons test (*: $p<0.001$; **: $p<0.0001$). FIG. 4G shows the dot plots of pTyr and ICAM-1 signal intensities at immune synapses between γδ T cells and H1299 cells. H1299 cells are pretreated with PBS (Mock), DAC alone or combination of DAC pretreatment (D3R3) and 1 μg/mL Cyto B for 1.5 hours prior to coculture with γδ T cells (mean±SD). p value is calculated by ANOVA with Tukey's multiple comparison test (*: $p<0.05$; ***:

p<0.001). FIG. 4H shows the dot plots showing the width of the immune synaptic cleft between γδ T cells and H1299 cells. H1299 cells are pretreated with PBS (Mock), DAC alone or a combination of DAC and Cyto B. Data are presented as mean±SD. p value is calculated by ANOVA with Tukey's multiple comparison test (****: p<0.0001). FIG. 4I shows the representative immunofluorescence images of synaptic clefts stained for F-actin and pTyr. Scale bar: 10 μm. FIG. 4J shows the representative immunofluorescence images of immune synapses (pTyr staining) between γδ T and H1299 cells pretreated with PBS (Mock), DAC alone, and combination of DAC and Cyto B. Blow-up images of the square areas for each treatment are shown in the lower panels. Arrows denote immune synapses between γδ T and H1299 cells. Scale bar: 100 μm (upper panel) and 20 μm (lower panel). FIG. 4K shows the dot plots showing numbers of immune synapses per cancer cell on eight randomly taken high power fields for H1299 cells pretreated with PBS (Mock), DAC, and combination of DAC and Cyto B (mean±SD). p value is calculated by one-way ANOVA with Tukey's multiple comparison test (*: statistical significance).

FIG. 5A shows a volcano plot showing differentially expressed genes in DAC-treated vs. mock-treated human lung cancer cells (i.e., A549, CL1-0, CL1-5, PC9, and H1299). The y-axis denotes statistical significance (−log 10 of p-value), and the x-axis displays the log 2 fold change values between the DAC-treated and the mock-treated groups. Genes related to the actin cytoskeleton, intermediate filaments, and microtubule are marked in red, blue and green, respectively. FIG. 5B shows the result of Gene Set Enrichment Analysis (GSEA) of mRNA-seq data in five DAC-treated lung cancer cell lines A549, CL1-0, CL1-5, PC9, and H1299. Gene sets related to actin cytoskeleton reorganization, intermediate filament-based process, and microtubule-related gene modules are shown. NES: Normalized Enrichment Score. FIG. 5C illustrates the heatmap showing mRNA expression of core enrichment genes for actin-cytoskeleton, intermediate filament, and microtubule-related processes in DAC-treated and mock-treated human lung cancer cells measured by mRNA-seq. FIG. 5D shows the result of Gene Set Enrichment Analysis (GSEA) of mRNA-seq data in HCT116 and DLD1 human colorectal cancer cell lines subject to shRNA knockdown of DNA methyltransferase 1 (DNMT1). Gene sets related to actin-cytoskeleton reorganization, intermediate filament-based process, and microtubule-related gene modules are shown. NES: Normalized Enrichment Score. FIG. 5E shows the box plots with median and 95% confidence interval showing promoter methylation status of genes in the actin cytoskeleton-, intermediate filament-, and microtubule-related gene modules in human lung cancer cells treated with 100 nM DAC for three days followed by a 3-day drug-free culture (D3R3). Methylation data are analyzed by Infinium MethylationEPIC arrays. Relative chromatin accessibility around TSS of genes (−3 to +3 kb) in the actin-cytoskeleton reorganization, intermediate filament-based process, and microtubule-related modules in DAC-treated (D) vs. mock-treated (M) lung cancer cell lines. FIG. 5F shows the integrative genome-wide analysis of DNA methylation and chromatin accessibility in lung cancer cells after decitabine treatment. Transcriptional changes (y-axis, log 2 fold change) in A549, H1299, PC9, and CL1-5 cells following DAC treatment at D3R3 and basal methylation levels (x-axis) in cells without DAC treatment (Mock) for all genes measured by mRNA-seq and Infinium MethylationEPIC arrays, respectively. Increases of gene expression by at least 2-fold (Log 2 fold change ≥1) are considered upregulated by DAC. Upper panel shows the methylation levels representing the median 13 values of promoter probes for each gene. β value=1, completely methylated; β value=0, completely unmethylated. Lower panel shows promoter chromatin accessibility measured by Omni-ATAC-seq for genes upregulated at least two-fold by DAC in H1299, PC-9, and CL1-5 lung cancer cells. Genes are classified into 3 groups based on β values at baseline (Mock). Chromatin accessibility around transcription start sites (TSS, −3 to +3 kb) are graphed. FIG. 5G shows relative chromatin accessibility around TSS of genes (−3 to +3 kb) in the actin-cytoskeleton reorganization, intermediate filament-based process, and microtubule-related modules in DAC-treated vs. mock-treated lung cancer cell lines. FIG. 5H shows the visualization of multi-omics data (i.e., mRNA-seq, Omni-ATAC-seq, and MethylationEPIC arrays) for DAPK3, EVPLL, and TUBE1 in H1299 lung cancer cells.

FIG. 6A shows the result of IPA network analysis of mRNA expression changes in human lung cancer cells treated by DAC, revealing coordinated changes of the immune-related surface molecules and the cytoskeleton-associated genes. FIGS. 6B and 6C show the result of IPA upstream regulator analysis of mRNA expression changes in human lung cancer cells treated by DAC. FIG. 6B shows that T cell effector cytokines such as TNF-α and IFN-γ may enhance DAC-induced expression changes of immune-related molecules and ICAM-1 in lung cancer cells. FIG. 6C shows that TP53 is a potential master regulator for cancer cytoskeleton reorganization for DAC-potentiated γδ T cell killing.

FIG. 7A illustrates the pie charts showing the cell frequencies of 14 cell clusters (T1 to T14) revealed by clustering analysis of ex vivo expanded γδ T cells with or without DAC treatment based on 38 mass cytometric markers. FIG. 7B shows the heatmaps showing the mean intensity of each marker in the 14 cell clusters (T1 to T14). Dark blue and dark green are high, and white is low. Clusters belonging to Vδ1 or Vδ2 are labeled in blue and yellow, respectively. FIG. 7C shows the result of flow cytometric analysis of effector cytokine production by ex vivo expanded γδ cells from 5 healthy donors at D3R3 with 10 nM DAC or mock treatment. Data is presented in a box and whisker plot showing the range minimum to a maximum of the percentages of Vδ1+ γδ T cells expressing individual cytokines. p value is calculated by the Mann-Whitney test (*: p<0.05). FIG. 7D shows the pie charts showing percentages of monofunctional and polyfunctional ex vivo expanded Vδ1+ γδ T cells from 5 healthy donors at D3R3 with 10 nM DAC or mock treatment. Percentages of Vδ1+γδ T with a concurrent expression of three effector cytokines are marked in red.

FIG. 8A shows the in vivo experiment of NOD-scid IL2rg$^{null}$ (NSG) mice bearing H1299 human lung cancer xenografts treated by DAC, adoptive human γδ T transfer, or both. For every cycle of drug treatment, DAC is administered intraperitoneally for three consecutive days, followed by intravenous injection of ex vivo expanded γδ T cells at day 5 and day 12. Mice were scarified after one day post-additional injection of γδ T cells following the 3rd cycle of the treatment. The tumor was surgically excised, and the weight was measured. Statistic result was determined by one-way ANOVA with Tukey's multiple comparison test (*: p<0.05; **: p<0.01). FIG. 8B shows the Kaplan-Meier survival curve of NSG mice in each treatment group. p value is calculated by the Mantel-Cox test. FIG. 8C shows the hematoxylin and eosin (H&E) staining of representative mouse tumors in each treatment group. Images of the whole tumor are generated by a digital slide scanner. FIG. 8D shows the heatmap of immune cytoskeleton gene signature derived from mRNA-seq data of primary lung adenocarcinoma tumor tissues in patients at the National Taiwan University Hospital (NTUH, left) and from the Cancer Genome Atlas (TCGA, right). FIG. 8E shows the overall survival analysis of the NTUH (upper) and TCGA (lower) lung adenocarcinoma patient cohorts stratified by immune cytoskeleton gene signatures associated with different γδ T susceptibilities. p value is calculated by the Mantel-Cox test.

DETAILED DESCRIPTIONS

Figure 1A:
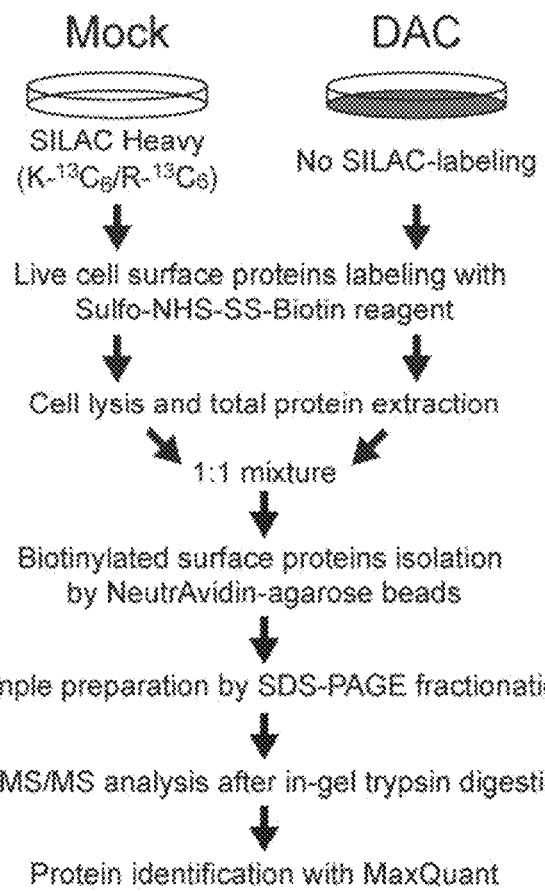
FIGS. 1A to 1H show that decitabine (DAC) upregulates surface immune molecules related to γδ T activation.

The present disclosure contains a Sequence Listing which has been submitted electronically in ST25 format and is hereby incorporated by reference in its entirety. Said ST25 copy, created on Dec. 5, 2025, is named 210756US-sequence listing ST25-revised.txt and is 2,062 bytes in size.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the descriptions of the present disclosure. Thus, the terms used herein are defined based on the meaning of the terms together with the descriptions throughout the specification.

It is further noted that, as used in this disclosure, the singular forms "a," "an," and "the" include plural referents unless expressly and unequivocally limited to one referent. The term "or" is used interchangeably with the term "and/or" unless the context clearly indicates otherwise.

Also, when a part "includes" or "comprises" a component or a step, unless there is a particular description contrary thereto, the part can further include other components or other steps, not excluding the others.

The terms "subject," "patient" and "individual" are used interchangeably herein and refer to a warm-blooded animal such as a mammal that is afflicted with, suspected of having, at risk for, pre-disposed to, or screened for cancer, including actual or suspected cancer. These terms include, but are not limited to, domestic animals, sports animals, primates and humans. For example, the terms refer to a human.

The terms "to treat" or "to ameliorate" as used herein mean the action taken for management and care of a patient for the purpose of combating a disease, disorder or condition. The term is intended to include the delaying of progression of the disease, disorder or condition, the alleviation or relief of symptoms and complications, and/or the cure or elimination of the disease, disorder or condition. The patient to be treated may be a mammal, e.g., a human being.

The terms "malignant disease," "malignant condition," "malignancy" or "cancer" are used interchangeably herein and refer to a malignant neoplasm. The terms "neoplasm" and "tumor" are used herein interchangeably and refer to an abnormal mass of tissue, wherein the growth of the mass surpasses and is not coordinated with the growth of a normal tissue. A "neoplasm" or "tumor" may be "benign" or "malignant," depending on the following characteristics: degree of cellular differentiation (including morphology and functionality), rate of growth, local invasion, and metastasis. A "malignant neoplasm" is generally poorly differentiated (anaplasia) and has characteristically rapid growth accompanied by progressive infiltration, invasion, and destruction of the surrounding tissue. Furthermore, a malignant neoplasm generally has the capacity to metastasize to distant sites. Malignant neoplasms or cancers include, but are not limited to: acoustic neuroma; adenocarcinoma; adrenal gland cancer; anal cancer; angiosarcoma (e.g., lymphangiosarcoma, lymphangioendotheliosarcoma, hemangiosarcoma); appendix cancer; benign monoclonal gammopathy; biliary cancer (e.g., cholangiocarcinoma); bladder cancer; breast cancer (e.g., adenocarcinoma of the breast, papillary carcinoma of the breast, mammary cancer, medullary carcinoma of the breast); brain cancer (e.g., meningioma, glioblastomas, glioma (e.g., astrocytoma, oligodendroglioma), medulloblastoma); bronchus cancer; carcinoid tumor; cervical cancer (e.g., cervical adenocarcinoma); choriocarcinoma; chordoma; craniopharyngioma; colorectal cancer (e.g., colon cancer, rectal cancer, colorectal adenocarcinoma); connective tissue cancer; epithelial carcinoma; ependymoma; endotheliosarcoma (e.g., Kaposi's sarcoma, multiple idiopathic hemorrhagic sarcoma); endometrial cancer (e.g., uterine cancer, uterine sarcoma); esophageal cancer (e.g., adenocarcinoma of the esophagus, Barrett's adenocarcinoma); Ewing's sarcoma; eye cancer (e.g., intraocular melanoma, retinoblastoma); familiar hypereosinophilia; gall bladder cancer; gastric cancer (e.g., stomach adenocarcinoma); gastrointestinal stromal tumor (GIST); germ cell cancer; head and neck cancer (e.g., head and neck squamous cell carcinoma, oral cancer (e.g., oral squamous cell carcinoma), throat cancer (e.g., laryngeal cancer, pharyngeal cancer, nasopharyngeal cancer, oropharyngeal cancer)); hematopoietic cancer (e.g., leukemia such as acute lymphocytic leukemia (ALL) (e.g., B-cell ALL, T-cell ALL), acute myelocytic leukemia (AML) (e.g., B-cell AML, T-cell AML), chronic myelocytic leukemia (CML) (e.g., B-cell CML, T-cell CML), and chronic lymphocytic leukemia (CLL) (e.g., B-cell CLL, T-cell CLL)); lymphoma such as Hodgkin lymphoma (HL) (e.g., B-cell HL, T-cell HL) and non-Hodgkin lymphoma (NHL) (e.g., B-cell NHL such as diffuse large cell lymphoma (DLCL) (e.g., diffuse large B-cell lymphoma), follicular lymphoma, chronic lymphocytic leukemia/small lymphocytic lymphoma (CLL/SLL), mantle cell lymphoma (MCL), marginal zone B-cell lymphoma (e.g., mucosa-associated lymphoid tissue (MALT) lymphoma, nodal marginal zone B-cell lymphoma, splenic marginal zone B-cell lymphoma), primary mediastinal B-cell lymphoma, Burkitt lymphoma, lymphoplasmacytic lymphoma (i.e., Waldenstrom's macroglobulinemia), hairy cell leukemia (HCL), immunoblastic large cell lymphoma, precursor B-lymphoblastic lymphoma and primary central nervous system (CNS) lymphoma; and T-cell NHL such as precursor T-lymphoblastic lymphoma/leukemia, peripheral T-cell lymphoma (PTCL) (e.g., cutaneous T-cell lymphoma (CTCL) (e.g., mycosis fungoides, Sezary syndrome), angioimmunoblastic T-cell lymphoma, extranodal natural killer T-cell lymphoma, enteropathy type T-cell lymphoma, subcutaneous panniculitis-like T-cell lymphoma, and anaplastic large cell lymphoma); a mixture of one or more leukemia/lymphoma as described above; and multiple myeloma (MM)), heavy chain disease (e.g., alpha chain disease, gamma chain disease, mu chain disease); hemangioblastoma; hypopharynx cancer; inflammatory myofibroblastic tumor; immunocytic amyloidosis; kidney cancer (e.g., nephroblastoma (also known as Wilms' tumor), renal cell carcinoma); liver cancer (e.g., hepatocellular cancer (HCC), malignant hepatoma); lung cancer (e.g., bronchogenic carcinoma, small cell lung cancer (SCLC), non-small cell lung cancer (NSCLC), adenocarcinoma of the lung); leiomyosarcoma (LMS); mastocytosis (e.g., systemic mastocytosis); muscle cancer; myelodysplastic syndrome (MDS); mesothelioma; myeloproliferative disorder (MPD) (e.g., polycythemia vera (PV), essential thrombocytosis (ET), agnogenic myeloid metaplasia (AMM) (also known as myelofibrosis (MF)), chronic idiopathic myelofibrosis, chronic myelocytic leukemia (CML), chronic neutrophilic leukemia (CNL), hypereosinophilic syndrome (HES)); neuroblastoma; neurofibroma (e.g., neurofibromatosis (NF) type 1 or type 2, schwannomatosis); neuroendocrine cancer (e.g., gastroenteropancreatic neuroendocrine tumor (GEP-NET), carcinoid tumor); osteosarcoma (e.g., bone cancer); ovarian cancer (e.g., cystadenocarcinoma, ovarian embryonal carcinoma, ovarian adenocarcinoma); papillary adenocarcinoma; pancreatic cancer (e.g., pancreatic adenocarcinoma, intraductal papillary mucinous neoplasm (IPMN), islet cell tumor); penile cancer (e.g., Paget's disease of the penis and scrotum); pinealoma; primitive neuroectodermal tumor (PNT); plasma cell neoplasia; paraneoplastic syndrome; intraepithelial neoplasm; prostate cancer (e.g., prostate adenocarcinoma); rectal cancer; rhabdomyosarcoma; salivary gland cancer; skin cancer (e.g., squamous cell carcinoma (SCC), keratoacanthoma (KA), melanoma, basal cell carcinoma (BCC)); small bowel cancer (e.g., appendix cancer); soft tissue sarcoma (e.g., malignant fibrous histiocytoma (MFH), liposarcoma, malignant peripheral nerve sheath tumor (MPNST), chondrosarcoma, fibrosarcoma, myxosarcoma); sebaceous gland carcinoma; small intestine cancer; sweat gland carcinoma; synovioma; testicular cancer (e.g., seminoma, testicular embryonal carcinoma); thyroid cancer (e.g., papillary carcinoma of the thyroid, papillary thyroid carcinoma (PTC), medullary thyroid cancer); urethral cancer; vaginal cancer; and vulvar cancer (e.g., Paget's disease of the vulva).

Cancers are classified in two ways: by the type of tissue in which the cancer originates (histological type) and by primary site, or the location in the body where the cancer first developed. From a histological standpoint, there are hundreds of different cancers, which are grouped into six major categories: carcinoma, sarcoma, myeloma, leukemia, lymphoma or mixed types. Carcinoma refers to a malignant neoplasm of epithelial origin or cancer of the internal or external lining of the body. Epithelial tissue is found throughout the body. It is present in the skin, as well as the covering and lining of organs and internal passageways, such as the gastrointestinal tract. Therefore, carcinomas are further divided into two major subtypes: adenocarcinoma, which develops in an organ or gland, and squamous cell carcinoma, which originates in the squamous epithelium. In some embodiments of the present disclosure, said cancers are selected from carcinomas of skin or mucosa, including but not limited to colon cancer, ovarian cancer, and melanoma.

γδ T cells are a distinct subset of T cells that combine adaptive characteristics and rapid, innate-like responses. Two major subsets of human γδ T cells, Vδ1+ and Vδ2+, are defined based on the recombination of the TCR γ and δ chains. Vδ1+ T cells are predominantly located in peripheral tissues and possess robust anticancer capacities without the requirement for opsonizing antibodies, as Vδ2+ T cells do. Nevertheless, the clinical use of Vδ1+ T cells has been fairly limited due to the scarcity of a reliable expansion protocol for selective and sustained proliferation of Vδ1+ T cells ex vivo. Instead, Vδ2+ T cells, which can be easily expanded with amino bisphosphonates (e.g., zoledronic acid) or phosphoantigens, are used in most clinical trials with limited clinical efficacy against solid tumors. Moreover, certain γδ T subsets may possess protumor functions; therefore, caution should be taken during the process of cell expansion for therapeutic uses.

DNA methyltransferase inhibitors (DNMTis) target the major histocompatibility complex (MHC) and T cell receptor (TCR) axis and have immunomodulatory effects. DNMTis reshape surface proteins of cancer cells to facilitate MHC-unrestricted recognition and tumor lysis in cell-based immunotherapies. In at least one embodiment of the present disclosure, a method to alter the surface proteome of cancer cells comprising the use of DNMTi is provided. In some embodiments of the present disclosure, a method is provided to increase MHC-unrestricted immune recognition, comprising contacting DNMTi with an immune cell. In at least one embodiment, the immune cell is a γδ cell. In some embodiments of the present disclosure, a method to activate γδ T cells is provided, comprising contacting γδ T cells with DNMTi. In some embodiments of the present disclosure, a method to induce immune synapse formation between γδ T cells and cancer cells is provided. In some embodiments of the present disclosure, a method to potentiate antitumor immunity of γδ T cells is provided, comprising contacting γδ T cells with DNMTi. In some embodiments of the present disclosure, a method to modulate cytoskeleton patterns of cancer cells is provided. In some embodiments, a method is provided to identify and distinguish a group of patients suitable for immunotherapy comprising obtaining and analyzing immune cytoskeleton patterns presented by the cancer cells of the patient.

EXAMPLE

Exemplary embodiments of the present disclosure are further described in the following examples, which should not be construed to limit the scope of the present disclosure.

Generally, the nomenclature used herein and the laboratory procedures utilized in the present disclosure include molecular, biochemical and recombinant DNA techniques. Such techniques are thoroughly explained in the literature. See, for example, "Molecular Cloning: A laboratory Manual," Sambrook et al., (1989); "Current Protocols in Molecular Biology," Volumes I-III Ausubel, R. M., ed. (1994); "A Practical Guide to Molecular Cloning," John Wiley & Sons, New York (1988); Watson et al., "Recombinant DNA," Scientific American Books, New York; Birren et al. (eds) "Cell Biology: A Laboratory Handbook," Volumes I-III Cellis, J. E., ed. (1994); "Culture of Animal Cells—A Manual of Basic Technique," Freshney, Wiley-Liss, N.Y. (1994), Third Edition; "Transcription and Translation," Hames, B. D., and Higgins S. J., eds. (1984); "Animal Cell Culture," Freshney, R. I., ed. (1986); "Immobilized Cells and Enzymes," IRL Press, (1986); "A Practical Guide to Molecular Cloning," Perbal, B., (1984) and "Methods in Enzymology," Vol. 1-317, Academic Press; "PCR Protocols: A Guide to Methods and Applications," Academic Press, San Diego, Calif. (1990); Marshak et al., "Strategies for Protein Purification and Characterization—A Laboratory Course Manual," CSHL Press (1996); all of which are incorporated by reference as if fully set forth herein. Other general references are provided throughout this specification. The procedures therein are believed to be well known in the art and are provided for the convenience of the readers. All the information contained therein is incorporated herein by reference.

Materials and Methods

Cancer Cell Lines and Drug Treatment

Human lung cancer cell lines, A549, H1299, HCC827, PC-9, PC-9-IR, H2981, H157, H1792 and H2170, and colorectal cancer cell line, HCT116, were obtained from the American Type Culture Collection (ATCC). CL1-0 and CL1-5 human lung adenocarcinoma cell lines were kindly provided by Prof. Pan-Chyr Yang at the National Taiwan University College of Medicine.

Cells were grown in HyClone PRMI medium (SH30027.02, GE Healthcare) supplemented with 10% GIBCO dialyzed FBS (26140-079, Life Technologies), 1% L-glutamine (A29168-01, Life Technologies), and 1% penicillin-streptomycin (15140-122, Life Technologies). Authentication of all cell lines used in this disclosure was performed using short tandem repeat (STR) analysis.

For drug treatment experiments, cells were cultured with 100 nM decitabine (DAC; A3656, Sigma-Aldrich) for three days with daily change of complete medium and drug replenishment, followed by 3 to 4 days of cell recovery in the decitabine-free medium. To block the DAC's effect on immune synapse formation via actin cytoskeleton reorganization, the DAC-pretreated (D3R3) cells were treated with 1 μg/mL cytochalasin B (Cyto B; C6762, Sigma-Aldrich) for 1.5 hours prior to coculture with γδ T cells.

SILAC Labeling

For quantitative mass spectrometry analysis, lung cancer cells were cultured for at least seven cell doublings in SILAC RPMI medium (88365, Thermo Fisher Scientific) supplemented with 10% FBS and heavy isotope-labeled amino acids (L-Lysine 13C6, L-Arginine 13C6) (CLM-2247-H-1, CLM-2265-H-1, Cambridge Isotope Laboratories). DAC-treated cells grown in the regular medium were considered as SILAC light counterparts.

Biotinylation and Isolation of Cell Surface Proteins

Cancer cells (around $1.5 \times 10^7$ cells) were grown in a 15-cm culture dish and washed with ice-cold PBS (21040CM, Corning) before the labeling. A total of 5 mg of membrane-impermeable sulfosuccinimidyl-6-(biotinamido) hexanoate reagent at the concentration of 0.3 mg/mL (EZ-link sulfo-NHS-SS-biotin; 21331, Thermo Fisher Scientific) was applied to the cells with gentle shaking at 4° C. for 30 minutes. The reaction was quenched by 20 mM glycine (G8790, Sigma-Aldrich) in PBS for 10 minutes. Subsequently, biotinylated cells were collected by scraping in PBS containing 100 μM oxidized glutathione (G4376, Sigma-Aldrich) to prevent the reduction of the disulfide bridge in the labeling molecule. After centrifugation at 500×g for 3 minutes, the cell pellet was subjected to a freezing-thawing step and resuspended in the lysis buffer [2% Nonidet P40 (NP40; 11332473001, Roche), 0.2% SDS (75746, Sigma-Aldrich), 100 μM oxidized glutathione and 1× Halt protease inhibitor cocktail (87786, Thermo Fisher Scientific) in PBS)] for 30 minutes on ice. The lysate then underwent sonication with five 15-second bursts and was centrifuged at 14,000×g for 5 minutes at 4° C. to remove insoluble materials. The protein concentration of the supernatants was determined using Pierce 660 nm Protein Assay Reagent Kit (22660, Thermo Fisher Scientific) supplemented with Ionic Detergent Compatibility Reagent (22663, Thermo Fisher Scientific). The biotinylated protein extracts from unlabeled and SILAC-heavy-labeled cancer cells were mixed in 1:1 (w/w), and the mixture was subjected to biotin-affinity purification. Pierce NeutrAvidin-agarose slurry (29200, Thermo Fisher Scientific) in 200 μL/mg of total proteins was conditioned by three washes in buffer A (1% NP40 and 0.1% SDS in PBS). The binding of biotinylated proteins was performed on a rotating mixer at 4° C. overnight. The beads were then washed twice with buffer A, twice with buffer B [0.1% NP40, 10.3 M NaCl (4058-01, JT Baker) in PBS] and twice with buffer C (50 mM in PBS, pH 7.8). Proteins were eluted twice for 30 minutes each at 58° C. with 150 mM dithiothreitol (DTT; D0632, Sigma-Aldrich), 1% SDS, 50 mM Tris-HCl in PBS (pH 7.8). Subsequently, 150 mM iodoacetamide (IAA; 16125, Sigma-Aldrich) was added to the sample followed by incubation for 30 minutes at room temperature in the dark to alkylate reduced cysteine residues in proteins. To concentrate the proteins and reduce the detergents in the membrane-rich eluate, the eluate was purified using an Amicon MWCO-10K centrifugation unit (UFC501096, Millipore) with the exchange buffer [0.5% SDS in 50 mM $NH_4HCO_3$ (09830, Sigma-Aldrich) aqueous solution]. The sample retained in the exchange buffer was then recovered for subsequent analyses.

In-Gel Digestion and Mass Spectrometry

The purified biotinylated-surface proteins were fractionated using SDS-PAGE, followed by in-gel trypsin digestion, as described in Karhemo, Piia-Riitta et al. "An optimized isolation of biotinylated cell surface proteins reveals novel players in cancer metastasis." Journal of Proteomics, Vol. 77 (2012): 87-100. The trypsinized peptides were vacuum-desiccated and solubilized in 0.1% trifluoroacetic acid (TFA; 299537, Sigma-Aldrich). The sample was then desalted using C18 Ziptip (ZTC18S960, Millipore) according to the manufacturer's protocol. Peptide mass acquisition was performed on an Ultimate system 3000 nanoLC system connected to the Orbitrap Fusion Lumos mass spectrometer equipped with NanoSpray Flex ion source (Thermo Fisher Scientific). After loading the peptides into the HPLC instrument, the peptides were concentrated by a C18 Acclaim PepMap NanoLC reverse-phase trap column with a length of 25 cm and an internal diameter of 75 μm containing C18 particles sized at 2 μm with a 100 Å pore (164941, Thermo Fisher Scientific). The mobile phase aqueous solvent A (0.1% formic acid; 33015, Sigma Aldrich) and organic solvent B [0.1% formic acid in acetonitrile (9829, JT Baker)] were mixed to generate a linear gradient of 2% to 40% solvent B for fractionated elution of peptides. The mass spectra were acquired from one full MS scan, followed by data-dependent MS/MS of the most intense ions in 3 seconds. Full MS scans were recorded with a resolution of 120,000 at m/z 200. For MS/MS spectra, selected parent ions within a 1.4 Da isolation window were fragmented by high-energy collision activated dissociation (HCD) with charge status of 2+ to 7+. The duration of the dynamic exclusion of parent ions was set at 180 seconds with a repeat count. Mass spectra were recorded by the Xcalibur tool version 4.1 (Thermo Fisher Scientific).

LC-MS/MS Data Analysis and SILAC-Based Protein Quantitation

The resulting Thermo RAW files were analyzed using MaxQuant v1.6.0.1668. MS/MS spectra were searched in the Andromeda peptide search engine against the UniProtKB/Swiss-Prot human proteome database as well as the reversed counterpart as a decoy database. The common contaminant list provided by MaxQuant software was applied during the search. Peptides with a minimum of 6 amino acids and maximum trypsin missed cleavages of 3 were considered. The setting of variable modifications includes methionine oxidation, protein N-terminal acetylation, asparagine/glutamine deamidation, and EZ link on primary amines after sulfhydryl reduction and alkylation by IAA (EZ-IAA, +145.020 Da). Carbamidomethyl cysteine was applied as a fixed modification. Initial parent peptide and fragment mass tolerance were set to 20 ppm and 0.5 Da, respectively. False discovery rate (FDR) filtration of the peptide-spectrum match and protein assignment were utilized at 0.05 and 0.01, respectively. Finally, proteins identified as a reverse decoy, matched with only one unique peptide, and as common contaminations were excluded before further analysis. The Thermo RAW files and MaxQuant results have been deposited to the ProteomeXchange Consortium with the dataset identifier MSV000084997 through the MassIVE partner repository.

Patient-Derived Lung Cancer Cells from Malignant Pleural Effusions (MPEs)

The MPEs from lung cancer patients were centrifuged at 1,800×g for 5 minutes to collect cell pellets. Cell pellets were resuspended in 4 mL PBS and subject to density gradient centrifugation with Ficoll-Paque PLUS (17144002, GE Healthcare) according to the manufacturer's instructions. Briefly, the resuspended cells were carefully loaded onto 3 mL Ficoll-Paque PLUS in a 15-mL centrifuge tube and layered by centrifugation at 1,800×g for 20 minutes at room temperature. Nucleated cells enriched at the interface were collected and washed by at least three volumes of PBS. Then, the cells were pelleted by centrifugation at 300×g for 5 minutes. Red blood cells (RBC) in the cell pellet were lysed with RBC lysis buffer [155 mM $NH_4Cl$ (11209, Sigma-Aldrich), 10 mM $KHCO_3$ (2940-01, JT Baker) and 0.1 mM EDTA (34550, Honeywell Fluka) in deionized water], and discarded after centrifugation of the sample at 300×g for 3 minutes. The cell pellet was finally washed twice with PBS and centrifuged at 300×g for 3 minutes. The collected cells were grown in DMEM/F-12 (1:1 in v/v; 11330, Thermo Fisher Scientific) supplemented with 5% FBS, 2% penicillin-streptomycin, 0.4 µg/mL hydrocortisone (H088, Sigma-Aldrich), 5 µg/mL insulin (12643, Sigma-Aldrich), 10 ng/mL epidermal growth factor (PHG0311L, Invitrogen), 24 µg/mL adenine (A2786, Sigma-Aldrich) and 6 µM Y-27632 (ALX-270-333, Enzo Life Sciences). Floating lymphocytes in the primary culture were eliminated by PBS washing before a detachment of adherent cells with trypsin-EDTA (25200072, Thermo Fisher Scientific) at 0.25% in PBS during each passage. The removal of fibroblasts was achieved due to their faster adhesion to the culture dish than tumor cells. The trypsinized-cell suspension was transferred to a new culture dish and deposited at 37° C. until the two types of cells were separated from each other. After repeated subcultures, the purity of the tumor cell population was confirmed by measuring the surface expression of EpCAM by flow cytometric analysis.

Isolation and Ex Vivo Expansion of γδ T Lymphocytes

A total of $1\times10^7$ peripheral blood mononuclear cells (PBMC) obtained from healthy donors were seeded in each well coated with anti-TCR PAN γδ antibody (IMMU510 clone) using a 6-well culture plate. The culture medium contained Optimizer CTS T-Cell Expansion SFM (A1048501, Thermo Fisher), 15 ng/mL IL-1β (AF200-01B), 100 ng/mL IL-4 (AF-200-04), 7 ng/mL IL-21 (AF-200-21), and 70 ng/mL IFN-γ (AF300-02, Peprotech). After seven days, the medium was changed to Optimizer CTS medium, 5% human platelet lysate (PLS1, Compass Biomedical), 70 ng/mL IL-15 (AF-200-15, Peprotech), and 30 ng/mL IFN-γ. These cells were harvested on Day 21 for subsequent experiments, including in vitro cytotoxicity and animal experiments. Informed consent was obtained from individual healthy donors before enrollment. The study was approved by the Institutional Review Board (IRB) of National Taiwan University Hospital.

Immunophenotypic and Functional Analysis of γδ T cells

Ex vivo expanded γδ cells were stained with immunofluorescence antibodies targeting the surface markers, including γδTCR Vδ1, γδTCR Vδ2, CD27, CD69, NKG2D, TGF-β1, and CD107a. Antibodies used in this disclosure are listed in Table 1 below.

TABLE 1

Antibodies used in this disclosure

ANTIBODY — SOURCE — IDENTIFIER

Names of the antibodies are presented in order by human protein target; host; clone; conjugation; the analysis applied in this disclosure (IF: immunofluorescence; CyTOF: mass cytometry; FC: flow cytometry; WB: Western blot; N/A: not applicable)

| ANTIBODY | SOURCE | IDENTIFIER |
|---|---|---|
| β-Actin; Mouse; Clone C4; N/A; WB | Millipore | Cat# MAB1501; RRID: AB_2223041 |
| CD2; Mouse; Clone RPA-2.10; N/A; CyTOF | BioLegend | Cat# 300202; RRID: AB_314026 |
| CD3; Mouse; Clone BW264/56; APC; FC | Miltenyi Biotec | Cat# 130-113-125; RRID: AB_2725953 |
| CD3; Mouse; Clone UCHT1; N/A; CyTOF | BioLegend | Cat# 300402; RRID: AB_314056 |
| CD3; Mouse; Clone UCHT1; N/A; IF | BioLegend | Cat# 300416; RRID: AB_389332 |
| CD4; Rat; Clone A161A1; N/A; CyTOF | BioLegend | Cat# 357402; RRID: AB_2561907 |
| CD8a; Mouse; Clone RPA-T8; 146Nd; CyTOF | Fluidigm | Cat# 3146001B; RRID: AB_2687641 |
| CD11a (LFA-1); Mouse; Clone HI111; N/A; IF | BioLegend | Cat# 301202; RRID: AB_314140 |
| CD14; Mouse; Clone M5E2; N/A; CyTOF | BioLegend | Cat# 301802; RRID: AB_314184 |
| CD16; Mouse; Clone 3G8; N/A; CyTOF | BioLegend | Cat# 302002; RRID: AB_314202 |
| CD16; Mouse; Clone 3G8; Brilliant Violet 421; FC | Sony | Cat# 2110190; RRID: N/A |

TABLE 1-continued

Antibodies used in this disclosure

ANTIBODY / SOURCE / IDENTIFIER

Names of the antibodies are presented in order by human protein target; host; clone; conjugation; the analysis applied in this disclosure (IF: immunofluorescence; CyTOF: mass cytometry; FC: flow cytometry; WB: Western blot; N/A: not applicable)

| ANTIBODY | SOURCE | IDENTIFIER |
|---|---|---|
| CD19; Mouse; Clone HIB19; N/A; CyTOF | BioLegend | Cat# 302202; RRID: AB_314232 |
| CD27; N/A; Clone L128; N/A; CyTOF | BD Biosciences | Cat# Custom-order; RRID: N/A |
| CD38; Mouse; Clone HB-7; N/A; CyTOF | BioLegend | Cat# 356602; RRID: AB_2561794 |
| CD45; N/A; Clone HI30; 89Y; CyTOF | Fluidigm | Cat# 3089003B; RRID: AB_2661851 |
| CD45RA; Mouse; Clone HI100; N/A; CyTOF | BioLegend | Cat# 304102; RRID: AB_314406 |
| CD56; Mouse; Clone NCAM16.2; Brilliant Violet 421; FC | BD Biosciences | Cat# 562751; RRID: AB_2732054 |
| CD56; Mouse; Clone NCAM16.2; 176Yb; CyTOF | Fluidigm | Cat# 3176008B; RRID: AB_2661813 |
| CD57; Mouse; Clone HNK-1; N/A; CyTOF | BioLegend | Cat# 359602; RRID: AB_2562403 |
| CD66b; Mouse; Clone G10F5; N/A; CyTOF | BioLegend | Cat# 305102; RRID: AB_314494 |
| CD69; Mouse; Clone FN50; N/A; CyTOF | BioLegend | Cat# 310902; RRID: AB_314837 |
| CD69; Mouse; Clone FN50; PerCP/Cyanine5.5; FC | BioLegend | Cat# 310925; RRID: AB_2074957 |
| CD94; Mouse; Clone DX22; N/A; CyTOF | BioLegend | Cat# 305502; RRID: AB_314532 |
| CD107a; Mouse; Clone H4A3; N/A; CyTOF | BD Biosciences | Cat# 555798; RRID: AB_396132 |
| CD107a; Mouse; Clone H4A3; Brilliant Violet 605; FC | BioLegend | Cat# 328634; RRID: AB_2563851 |
| CD107a; Mouse; Clone H4A3; Phycoerythrin; FC | BD Pharmingen | Cat# 555801; RRID: AB_396135 |
| CD107b; Mouse; Clone H4B4; N/A; CyTOF | BD Biosciences | Cat# 555803; RRID: AB_396137 |
| CD159a (NKG2A); Mouse; Clone Z199; APC; CyTOF | Beckman Coulter | Cat# A60797; RRID: AB_10643105 |
| CD161; Mouse; Clone HP-3G10; N/A; CyTOF | BioLegend | Cat# 339902; RRID: AB_1501090 |
| CD197 (CCR7); Mouse; Clone G043H7; 159Tb; CyTOF | Fluidigm | Cat# 3159003A; RRID: AB_2714155 |
| CD226 (DNAM-1); Mouse; Clone TX25; N/A; CyTOF | BioLegend | Cat# 337102; RRID: AB_1236383 |
| CD235ab; Mouse; Clone HIR2; N/A; CyTOF | BioLegend | Cat# 306602; RRID: AB_314620 |
| CD244 (2B4); Mouse; Clone C1.7; N/A; CyTOF | BioLegend | Cat# 329502; RRID: AB_1279194 |
| CD279 (PD-1); Mouse; Clone EH12.2H7; 174Yb; CyTOF | Fluidigm | Cat# 3174020B; RRID: AB_2687629 |
| CD314 (NKG2D); Mouse; Clone ON72; 166Er; CyTOF | Fluidigm | Cat# 3166016B; RRID: AB_2801262 |
| CD319 (CRACC); Mouse; Clone 162.1; N/A; CyTOF | BioLegend | Cat# 331802; RRID: AB_961330 |
| CD328 (Siglec-7); Mouse; Clone 6-434; N/A; CyTOF | BioLegend | Cat# 339202; RRID: AB_1501162 |
| CD329 (Siglec-9); Mouse; Clone K8; N/A; CyTOF | BioLegend | Cat# 351502; RRID: AB_10896430 |
| CD335 (NKp46); Mouse; Clone 195314; N/A; CyTOF | R&D Systems | Cat# MAB1850-100; RRID: AB_2149153 |
| CD336 (NKp44); Mouse; Clone P44-8; N/A; CyTOF | BioLegend | Cat# 325102; RRID: AB_756094 |
| CD337 (NKp30); Mouse; Clone P30-15; N/A; CyTOF | BioLegend | Cat# 325202; RRID: AB_756106 |
| CD352 (NTB-A); Mouse; Clone NT-7; N/A; CyTOF | BioLegend | Cat# 317202; RRID: AB_571931 |
| EpCAM; Mouse; Clone EBA-1; PE; FC | BD Biosciences | Cat#347198; RRID: AB_400262 |
| Granzyme B; Mouse; Clone GB11; 171Yb; CyTOF | Fluidigm | Cat# 3171002B; RRID: AB_2687652 |
| HLA-DR; Mouse; Clone L243; N/A; CyTOF | BioLegend | Cat# 307602; RRID: AB_314680 |
| ICAM-1; Mouse; Clone BBIG-I1; FITC; FC | R&D Systems | Cat# BBA20; RRID: AB_356942 |
| ICAM-1; Rabbit; Clone EPR4776; N/A; IF | Abcam | Cat# ab109361; RRID: AB_10858467 |

TABLE 1-continued

Antibodies used in this disclosure

ANTIBODY      SOURCE      IDENTIFIER

Names of the antibodies are presented in order by human protein target; host; clone; conjugation; the analysis applied in this disclosure (IF: immunofluorescence; CyTOF: mass cytometry; FC: flow cytometry; WB: Western blot; N/A: not applicable)

| Antibody | Source | Identifier |
|---|---|---|
| ICAM-1; Rabbit; N/A; N/A; WB | Cell Signaling Technology | Cat# 4915; RRID: AB_2280018 |
| IFN-γ; Mouse; Clone 25723.11; Allophcocyanin; FC | BD Biosciences | Cat# 341117; RRID: AB_2264629 |
| IFN-γ; Mouse; Clone B27; N/A; CyTOF | BD Biosciences | Cat# 554698; RRID: AB_395516 |
| IL-2; Rat; Clone MQ1-17H12; N/A; CyTOF | BioLegend | Cat# 500302; RRID: AB_315089 |
| IL-10; Rat; Clone JES3-19F1; APC; FC | BioLegend | Cat# 506806; RRID: AB_315456 |
| IL-17A; Mouse; Clone BL168; N/A; CyTOF | BioLegend | Cat# 512302; RRID: AB_961399 |
| IL-17A; Mouse; Clone BL168; Brilliant Violet 421; FC | BioLegend | Cat# 512321; RRID: AB_10899566 |
| KIR3DL1; Mouse; Clone DX9; N/A; CyTOF | R&D Systems | Cat# MAB1225; RRID: AB_2130828 |
| LAT; Mouse; N/A; N/A; IF | Santa Cruz | Cat# sc-53550; RRID: AB_784283 |
| Perforin; Mouse; Clone B-D48; 175Lu; CyTOF | Fluidigm | Cat# 3175004B; RRID: N/A |
| Phosphotyrosin; Mouse; Clone 4G10; N/A; IF | Merck Millipore | Cat# 05-321; RRID: AB_568857 |
| T-bet; Mouse; Clone 4B10; N/A; CyTOF | BioLegend | Cat# 644802; RRID: AB_1595503 |
| TCR γδ; Mouse; Clone B1; N/A; CyTOF | BioLegend | Cat# 331202; RRID: AB_1089222 |
| TCR γδ; Mouse; Clone GL3; FITC; FC | Miltenyi Biotec | Cat# 130-104-015; RRID: AB_2654076 |
| TCR PAN γδ; Mouse; Clone IMMU510; N/A; FC | Beckman Coulter | Cat# IM1349; RRID: AB_131619 |
| TCR Vδ1; Mouse; Clone REA173; FITC; FC, CyTOF | Miltenyi Biotec | Cat# 130-118-498; RRID: AB_2751531 |
| TCR Vδ2; Mouse; Clone B6; N/A; CyTOF | BioLegend | Cat# 331402; RRID: AB_1089226 |
| TCR Vδ2; Mouse; Clone B6; Brilliant Violet 711; FC | BioLegend | Cat# 331412; RRID: AB_2565421 |
| TNF-α; Mouse; Clone MAB11; N/A; CyTOF | BioLegend | Cat#502902; RRID: AB_315254 |
| TNF-α; Mouse; Clone MAB11; PE-Cy7; FC | BD Biosciences | Cat# 560678; RRID: AB_1727578 |
| Anti-Mouse IgG (H + L) Cross-Adsorbed Secondary Antibody, Alexa Fluor 488; Goat; IF | Thermo Fisher Scientific | Cat# A-11001; RRID: AB_2534069 |
| Anti-Mouse IgG (H + L) Cross-Adsorbed Secondary Antibody, Alexa Fluor 647; Goat; IF | Thermo Fisher Scientific | Cat# A-21235; RRID: AB_2535804 |
| Anti-Mouse IgG; Goat; Clone Poly4053; HRP; WB | BioLegend | Cat# 405306; RRID: AB_315009 |
| Anti-Rabbit IgG (H + L) Cross-Adsorbed Secondary Antibody, Alexa Fluor 488; Goat; IF | Thermo Fisher Scientific | Cat# A-11008; RRID: AB_143165 |
| Anti-Rabbit IgG (H + L) Cross-Adsorbed Secondary Antibody, Alexa Fluor 647; Goat; IF | Thermo Fisher Scientific | Cat# A-21244; RRID: AB_2535812 |
| Anti-Rabbit IgG; Goat; N/A; HRP; WB | GeneTex | Cat# GTX213110-01; RRID: AB_10618573 |
| Fluorescein/Oregon Green; Rabbit; N/A; FITC; CyTOF | Thermo Fisher Scientific | Cat# A-889; RRID: AB_221561 |

Subsequently, γδ T cells were fixed and permeabilized using Cytofix/Cytoperm solution (554714, BD Biosciences) for 20 minutes at 4° C. for intracellular staining of cytokines, including IL-2, IL-10, IL-17A, IFN-γ, and TNF-α (antibody information listed in Table 1 above). Staining was performed at 4° C. for 30 minutes in the dark. The samples were washed and fixed with 100 μL of 1×IOTest3 Fixative Solution (A07800, Beckman Coulter) per well for at least 10 minutes at 4° C. Cells were then resuspended in 300 μL PBS and analyzed using a BD LSR Fortessa flow cytometry (BD Biosciences). Acquired data were analyzed using FlowJo software (Tree Star). For polyfunctional response measurement, γδ T cells were stimulated with 30 ng/mL phorbol 12-myristate 13-acetate (PMA; P1585, Sigma-Aldrich) and 1 μg/mL ionomycin (19657, SigmaAldrich) in the presence of monensin (00-4505-51, eBioscience) and brefeldin A (420601, BioLegend) for 4 hours at 37° C. After stimulation, γδ T cells were transferred to v-bottom 96-well plates and stained for surface markers and intracellular cytokines as described above. As an unactivated control, γδ T cells were incubated only with dimethyl sulfoxide (DMSO; D2650, Sigma-Aldrich), monensin, and brefeldin A before staining.

Single-Cell Mass Cytometry (CyTOF)

Samples were processed as described with few modifications. Briefly, the cell samples were first stained for viability with cisplatin (201064, Fluidigm) and then fixed with 1.5% paraformaldehyde (15710, Electron Microscopy Sciences) at room temperature for 10 minutes followed by two washes with Cell staining medium (CSM) [PBS containing 0.5% bovine serum albumin (BSA; A3059, Sigma-Aldrich) and 0.02% sodium azide (S2002, Sigma-Aldrich)]. Formaldehyde-fixed cell samples were then subjected to pre-permeabilization palladium barcoding, as described in Bengsch, Bertram et al. "Deep immune profiling by mass cytometry links human T and NK cell differentiation and cytotoxic molecule expression patterns." Journal of Immunological Methods, Vol. 453 (2018): 3-10. The barcoded samples were first incubated with anti-TCR Vδ1-FITC for 30 minutes on ice, washed once with CSM, and then stained with metal-conjugated antibodies against surface markers for 1 hour. After incubation, samples were washed once with CSM, permeabilized with 1×eBioscience Permeabilization Buffer (00-8333-56, Thermo Fisher Scientific) on ice for 10 minutes, and then incubated with metal-conjugated antibodies against intracellular molecules for 1 hour. Cells were washed once with 1×eBioscience Permeabilization Buffer and then incubated at room temperature for 20 minutes with an iridium-containing DNA intercalator (201192A, Fluidigm) in PBS containing 1.5% paraformaldehyde. After intercalation/fixation, the cell samples were washed once with CSM and twice with water before measurement on a CyTOF mass cytometer (Fluidigm). Normalization for detector sensitivity was performed as described in Gaudillière, Brice et al. "Implementing Mass Cytometry at the Bedside to Study the Immunological Basis of Human Diseases: Distinctive Immune Features in Patients with a History of Term or Preterm Birth." Cytometry. Part A: the Journal of the International Society for Analytical Cytology, Vol. 87, 9 (2015): 817-29. After measurement and normalization, the individual files were debarcoded and gated according to FIG. 2D. viSNE maps were generated using software tools available from Cytobank Inc. For antibody conjugations, antibodies in carrier-free PBS were conjugated to metal-chelated polymers according to the manufacturer's protocol. The CyTOF raw FCS files have been deposited to FlowRepository database with the identifier FR-FCM-Z2G5.

Data Analysis for Mass Cytometry Data

For the comparison between ex vivo expanded γδ T cells with and without DAC treatment, 50,000 cells from each group were randomly sampled and pooled together for clustering using X-shift, a density-based clustering method. All markers except the ones used for gating were selected for clustering. Clusters separated by a Mahalanobis distance less than 2.0 were merged. The optimal nearest-neighbor parameter, K, was determined as 20 using the elbow method. The expression level and the cell frequency in each cluster were exported and represented by heatmaps and pie charts using R. For the correlation between expression levels of markers in CD3+ T cells at baseline and after ex vivo expansion, pairwise Pearson correlation coefficients were calculated. The heatmap was generated and clustered based on hierarchical clustering of the Pearson correlation coefficients by R.

γδ T Cell-Mediated Cytotoxicity Assays

Cancer cells were cocultured with γδ T cells at an effector-to-target (E:T) ratio of 3:1 at 37° C. for 2 hours. After coculture, cell death was evaluated by flow cytometric analysis using FITC Annexin V Apoptosis Detection Kit I (556547, BD Biosciences). In addition, real-time monitoring of γδ T-mediated killing of cancer cells was performed using the Electric Cell-Substrate Impedance Sensing (ECIS) monitoring system with an 8W10E+ culture chamber (Applied Biophysics). Mock or DAC-treated cancer cells were cultured in the chamber at 37° C. overnight until the cancer cells were fully attached to the bottom of the wells. Following the addition of γδ T cells, the detachment of cancer cells indicating cell death was recorded in real-time using multiple frequency capture with the ECIS software. Relative impendence at the time of γδ T cell addition was used for between-sample normalization. For non-contact killing experiments, cancer cells were seeded in the bottom wells of a 24-well Transwell system overnight, followed by the addition of γδ T cells onto the top 0.4 µm pore membrane inserts that are impermeable to cells (353095, Falcon). The coculture was performed at an E:T ratio of 10:1 at 37° C. for overnight. The death of cancer cells in the bottom wells was evaluated by flow cytometric analysis using FITC Annexin V Apoptosis Detection Kit I.

γδ T Cell Chemotaxis Assay

Cancer cells were cocultured with γδ T cells in a Transwell system with a 3 µm pore membrane insert (3415, Falcon) that allows γδ T cells to pass through. Prior to the coculture, cancer and γδ T cells were stained with vital dyes, Calcein AM (1755, BioVision) and Hoechst 33342 (H3570, Thermo Fisher Scientific), respectively. After coculture for 2 hours, the γδ T cells (positive for Hoechst 33342) that had migrated into the bottom chamber were imaged under a fluorescence microscope and quantified by ImageJ.

Immunofluorescence Imaging of Immune Synapses

Cancer and γδ T cells were spun down onto poly-L-lysine coated coverslips by using a Cyto-Tek table-top cytofuge at 500 rpm for 5 minutes (Sakura Scientific) before fixation with ice-cold methanol or 4% (w/v) paraformaldehyde in PBS for 10 minutes. The fixed samples were blocked in detergent-free blocking solution [1% normal donkey serum (ab7475, abcam) and 3% BSA in PBS] without membrane permeabilization by detergents. Subsequently, cells were incubated with primary antibodies diluted in the blocking solution for 1 hour in a moist chamber at room temperature and washed with PBS. Labeling of fluorescent secondary antibodies at 1:200 dilution in PBS was carried out in the blocking buffer for 1 hour at room temperature. Information on antibodies is listed in Table 1. After PBS washing, cell nuclei were stained with Hoechst 33342 or DAPI (62248, Thermo Fisher Scientific) in PBS. Finally, the samples were washed with PBS and mounted on the slides. All slides were examined under an epifluorescence microscope EVOS FLc (Invitrogen), and the images were analyzed using the ImageJ software. For the visualization of immune synaptic proteins, cells were imaged with a high-resolution confocal microscope (LSM780, Zeiss) with a 63×oil objective and analyzed with the confocal software ZEN (Zeiss).

Overexpression and CRISPR/Cas9 Gene Knockout Experiments

In overexpression experiments, doxycycline-inducible ICAM-1 overexpressing vector was created through the cloning of full-length ICAM1 cDNA into a Tet-On lentiviral plasmid pLVX-Tight-Puro (632162, Clontech). The gene expressing vector and the regulator vector (pLVX-Tet-On Advanced) were packaged with VSV-G pseudotyped lentivirus particles in 293T cells. After co-transfection of the two lentiviral particles into lung cancer cells, the cells were then grown in the selection media containing G418 (10131035, Thermo Fisher Scientific) and puromycin (A1113803, Thermo Fisher Scientific) at proper concentrations for the retention of both plasmids. In knockout experiments, editing of the ICAM1 genome locus on H1299 cells was achieved through coexpression of the Cas9 protein with the guide RNAs (gRNAs) targeting to ICAM1 exon 2 at the sequences 5'-TCAAAAGTCATCCTGCCCCCG-3' (SEQ ID NO:1) and 5'-GTGACCAGCCCAAGTTGTTG-3' (SEQ ID NO:2). ICAM-1-null cell lines were established through clonal propagation from single cells. The overexpression and loss of ICAM-1 protein were validated by flow cytometry with an anti-ICAM1 antibody (BBA20, R&D Systems). In addition, the edited genome patterns at the ICAM1 locus around the gRNA-targeting sites of the ICAM1-knockout lines were validated by Sanger sequencing after PCR amplification. The PCR primer pairs used are listed in Table 2 below. Analysis of the sequencing results for the CRISPR/Cas9-edited ICAM1 genome locus is performed using multiple sequence alignment tool (ClustalO) on QIAGEN CLC Genomics Workbench software (v20.0.2).

using the R packages GenomicFeatures (v1.36.4) and GenomicAlignments (v1.20.1), according to the GENCODE human GRCh37 annotation. Finally, FPKM normalization of the raw-counts was performed using DESeq2 (v1.24.0). Bar graphs and dot plots of RNA-seq data were created by ggplot2 (v3.2.1). Networks and upstream regulator analysis were conducted by Ingenuity Pathway Analysis (IPA; version 01-16, Qiagen). The BAM files with alignments and analysis results of mRNA-seq data have been deposited to Gene Expression Omnibus (GEO) database with the identifier GSE145663.

Gene Ontology and Gene Set Enrichment Analysis

Surface proteins upregulated by more than 1.4-fold with DAC treatment in the quantitative membrane proteomic analysis were subjected to gene ontology (GO) analysis using the AmiGO 2 web tool, PANTHER (v2.5.12), with Fisher's Exact test. For gene set enrichment analysis (GSEA), mRNA-seq data of cancer cell lines with and without DAC treatment were used to identify gene sets enriched in the DAC-treated samples (FDR<0.25 and nominal p-value<0.05). Cytoskeleton-associated gene sets were retrieved from the Molecular Signatures Database (MSigDB, v6.2).

Genome-Wide DNA Methylation Analysis

Genomic DNA of cancer cells was extracted with the QIAamp DNA Mini Kit (51304, QIAGEN) according to the

TABLE 2

Primer sequences used in this disclosure

| Primer | Sequence | SEQ ID NO |
|---|---|---|
| Forward primer for cloning full length ICAM1 cDNA | 5'-CGGGATCCATGGCTCCCAGCAGCCC-3' | 3 |
| Reverse primer for cloning full length ICAM1 cDNA | 5'-CGGGATCCTCAGGGAGGCGTGGCTT-3' | 4 |
| Forward primer for the ICAM1 ATAC-PCR | 5'-ACCGTGATTCAAGCTTAGCC-3' | 5 |
| Reverse primer for the ICAM1 ATAC-PCR | 5'-CCGGAACAAATGCTGCAGTT-3' | 6 |
| Forward primer for PCR amplification of the flanking regions surrounding the sgRNA sequence | 5'-TCCACATCGAAGGCAAAGTAT-3' | 7 |
| Reverse primer for PCR amplification of the flanking regions surrounding the sgRNA sequence | 5'-CCCCTCCTTGACCCTACGA-3' | 8 |

RNA Preparation and mRNA-seq Analysis

Total RNA was extracted with the PureLink RNA Mini Kit according to the manufacturer's instructions (12183018A, Invitrogen). The quality of RNA was evaluated using a Bioanalyzer 2100 with RNA 6000 Nano LabChip Kit (5067-1511, Agilent Technologies). mRNA-seq libraries were prepared using TruSeq Stranded mRNA Library Prep Kit (RS-122-2101, Illumina) and sequenced using the HiSeq 4000 system. Raw reads were processed with adapter trimming and quality filtering using Trimmomatic with default settings. The cleaned reads were aligned to UCSC human genome hg19 using RSEM tool with the bowtie2 aligner. Mapped reads were counted for each gene manufacturer's instruction. The DNA concentration and quality were evaluated by NanoDrop 2000 (Thermo) and electrophoresis with 0.8% agarose gel, respectively. Bisulfite conversion of 1 µg genomic DNA was performed using EZ DNA Methylation Kit (D5001, Zymo Research). The bisulfite-converted DNA samples were subject to genome-wide methylation analysis using the Illumina Infinium MethylationEPIC BeadChips. Raw intensity data were obtained as IDAT files and processed using R package minfi v1.30.081 with a probe annotation package for Illumina EPIC array (IlluminaHumanMethylationEPICanno.ilm10b4.hg19). The data were quantile normalized using the "preprocessQuantile" function of "minfi." Low-quality probes with detection P-value >0.01 as well as probes described as single nucleotide polymorphisms (SNPs) or cross-reactive and genetic variants were removed. Finally, a total of 692,476 probes were used for further analysis. The signal intensity raw IDAT files and analysis results of MethylationEPIC data have been deposited to GEO database with the identifier GSE145588.

Genome-Wide Chromatin Accessibility Analysis

Chromatin accessibility of lung cancer cells before and after DAC treatment was analyzed using the Omni-ATAC protocol with modifications. After harvesting cells with trypsin/EDTA, a total of $1 \times 10^5$ cells were resuspended in 1 mL of cold ATAC resuspension buffer [ATAC-RSB; 10 mM Tris-HCl pH 7.4, 10 mM NaCl, and 3 mM $MgCl_2$ (AM9530G, Thermo Fisher Scientific) in water] supplemented with 0.1% Tween-20 (P2287, Sigma-Aldrich). Cells were centrifuged at 650×g for 5 minutes at 4° C. to remove the buffer and lysed in 50 µL of ATAC-RSB containing 0.1% NP40, 0.1% Tween-20, and 0.01% digitonin (G9441, Promega) on ice for 3 minutes. Subsequently, the lysate was washed by 1 mL of ATAC-RSB containing 0.1% Tween-20, and the supernatant was discarded following centrifugation at 650×g for 10 minutes at 4° C. to pellet the cell nuclei. The nuclear fraction was then resuspended in 50 µL of 1:1 (v/v) premix of 2×Tagmentation DNA (TD) buffer [20 mM Tris-HCl, 10 mM $MgCl_2$, 10% dimethyl formamide (D4551, Sigma-Aldrich), pH 7.6] and Transposition buffer [2 µL of Illumina adapters-bearing Tn5 transposase (FC-121-1030, Illumina), 0.02% digitonin and 0.2% Tween-20 in PBS]. The sample was incubated at 37° C. for 30 minutes in a water bath and vortexed every 5 minutes to facilitate the transposition reaction.

At the end of the reaction, the transposed DNA fragments were harvested and cleaned up with Zymo DNA Clean and Concentrator-5 kit (D4011, Zymo Research). The libraries were indexed and amplified with Illumina i5/i7 indexing primers (FC-121-1011, Illumina) by PCR reaction to reach a target concentration of 4 nM in 20 µL. Library quality was checked by Agilent 2100 Bioanalyzer with high sensitivity DNA kit (5067-4626, Agilent Technologies). The sample was sequenced on the Illumina HiSeq X Ten platform with 151 bp paired-end sequencing for an average of 60 million raw reads per sample.

Bioinformatic Analysis of the Omni-ATAC-seq Data

The Nextera adapter sequence (5'-CTGTCTCTTATACA-CATCT-3') (SEQ ID NO:9) was trimmed from the raw reads using CutAdapt v2.7. Trimmed reads of each sample were mapped to the human reference genome build UCSC hg19 using BWA mem v0.7.17-r1188 with default -M parameter and a maximum fragment length of 2,000. The PCR duplicated reads were marked using Picard (v2.21.4). Further quality filtering was performed using SAMtools (v1.9, PMC2723002) to remove unmapped reads, unmapped mates, PCR duplicated reads, unpaired alignments, and reads mapped to mitochondrial DNA. The size distribution of the filtered reads and nucleosome-occupancy frequency was evaluated by ATACseqQC v1.8.5. The broad peak regions of ATAC-seq were called using MACS2 v2.2.5 with parameters: --nomodel --shift -75 --extsize 150 --keep-dup all --broad --broad-cutoff 0.1. Annotation of the peaks and the distance of each peak to the closest TSS were determined using ChIPseeker v1.20.0. The bam files of the post-filtering read alignment from mock- and DAC-treated samples were simultaneously normalized with reads per genomic content (RPGC) approach by --effectiveGenomeSize 2827437033, and the log 2 ratio of decitabine/mock per bin was reported using deepTools v3.3.189. The BAM files with genome mapping and MACS2-called broad peaks results of ATAC-seq data have been deposited to GEO with the identifier GSE145663.

Transcriptomic Data of Primary Lung Cancer Tissues

The genome-wide gene expression data by mRNA-seq were obtained from two lung adenocarcinoma cohorts, National Taiwan University Hospital (NTUH), and the Cancer Genome Atlas (TCGA) database. The NTUH data were generated by our laboratory and deposited in the Gene Expression Omnibus (GEO) database with an accession number of GSE120622. The curated TCGA lung adenocarcinoma (LUAD) data of normalized gene expression (RNASeq2GeneNorm) and clinical information were acquired using an R package, curatedTCGAData v1.6.0. Heatmaps of the Z-transformed gene expression level of selected genes of NTUH and TCGA mRNA-seq data were created using the R package pheatmap (v1.0.12).

Combination Therapy of DAC and γδ T cells in a Tumor Xenograft Mouse Model

Six-week old male NOD.Cg-Prkdc$^{scid}$ Il2rg$^{tm1Wjl}$/SzJ (NSG) mice were purchased from the National Laboratory Animal Center (Taiwan) and maintained under the standard pathogen-free condition. H1299 lung cancer cells were injected subcutaneously into the mice ($1 \times 10^7$/mouse). The therapy was started at seven days post-injection. For each two-week treatment cycle, tumor-bearing mice were treated with DAC (0.2 mg/kg body weight (BW)) by intraperitoneal injection on Day 1, 2, and 3. Human γδ T cells (1× $10^7$/mouse) were intravenously injected via tail vein on Day 5 and 10. The treatment was continued until the death of mice or the end of experiments. The survival time of individual mice in each treatment group was recorded. The surviving mice on day 42 post-tumor injection were sacrificed to obtain tumors for pathologic examination and hematoxylin and eosin (H&E) staining. All mice experiments were approved by the NTU College of Medicine Institutional Animal Care and Use Committee (IACUC) (Protocol #20180077).

Statistical Analysis

Statistical analysis was performed using GraphPad Prism 8 and computing environment R. Mann-Whitney or unpaired t-tests were used to compare the means between two groups, whereas one-way ANOVA with Tukey's multiple comparisons was used to compare the means of three or more groups. Overall survival analysis for the NTUH and TCGA lung adenocarcinoma cohorts was performed using the Cox regression model, as well as the Kaplan-Meier method. Calculation and plotting of the survival curve were performed using R packages survival (v3.1-8) and survminer (v0.4.6), respectively. Heatmaps of the Z-transformed gene expression level of mRNA-seq data were created by using R package pheatmap (v1.0.12). Bar and spot charts representing methylation β-value and RNA-seq FPKM were created by ggplot2 (v3.2.1).

Example 1: DNMTi Increases Surface Immune Molecules Related to γδ T Cell Activation Two FDA approved DNMTis, decitabine (Dacogen, DAC) and azacytidine (Vidaza, AZA), are cytidine analogs that incorporate into DNA/RNA and deplete DNMTs through irreversible binding of the enzymes followed by proteasome degradation. In this example, DNMTis were shown to induce the alterations of surface proteins that account for susceptibility to immunotherapy.

Specifically, procedures to obtain a comprehensive profile of surface proteins altered by decitabine (DAC) through isolating cell surface proteins from A549 human lung cancer cells before and after DAC treatment using the EZ-link Sulfo-NHS-SS-biotin-assisted biotinylation method, followed by a SILAC-based quantitative proteomic approach were shown in FIG. 1A.

Figure 1B:
Figure 1C:
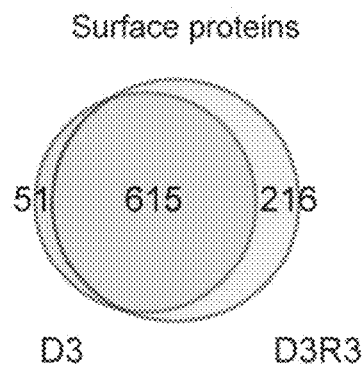

A low-dose treatment protocol was established to manifest the drug's epigenetic effects over cytotoxicity, as shown in FIG. 1B, and identified 666 and 831 Gene Ontology (GO)-annotated surface proteins (corresponding to 8,791 and 11,898 unique peptides) in A549 cells upon 100 nM DAC treatment for 72 hours (D3) and growth in drug-free medium for another 3 days (D3R3), respectively, as shown in FIG. 1C and Table 3 below.

TABLE 3

Numbers of identified total and surface proteins/peptides in A549 human lung cancer cells subject to 100 nM decitabine daily treatment for 72 hours (D3), followed by growing in drug-free medium for three days (D3R3)

| | | A549 | |
|---|---|---|---|
| | | D3 | D3R3 |
| Total | Proteins* | 1,771 | 2,389 |
| | Peptides | 17,166 | 26,735 |
| Surface** | Proteins* | 666 | 831 |
| | Peptides | 8,791 | 11,898 |

Figure 1D:
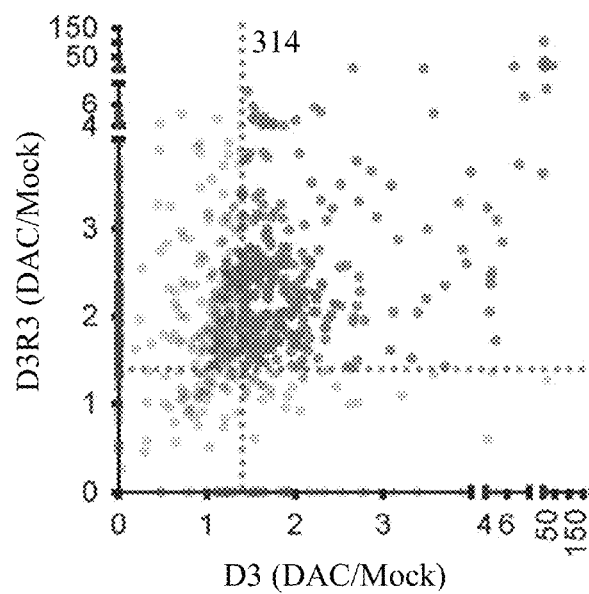
Figure 1E:
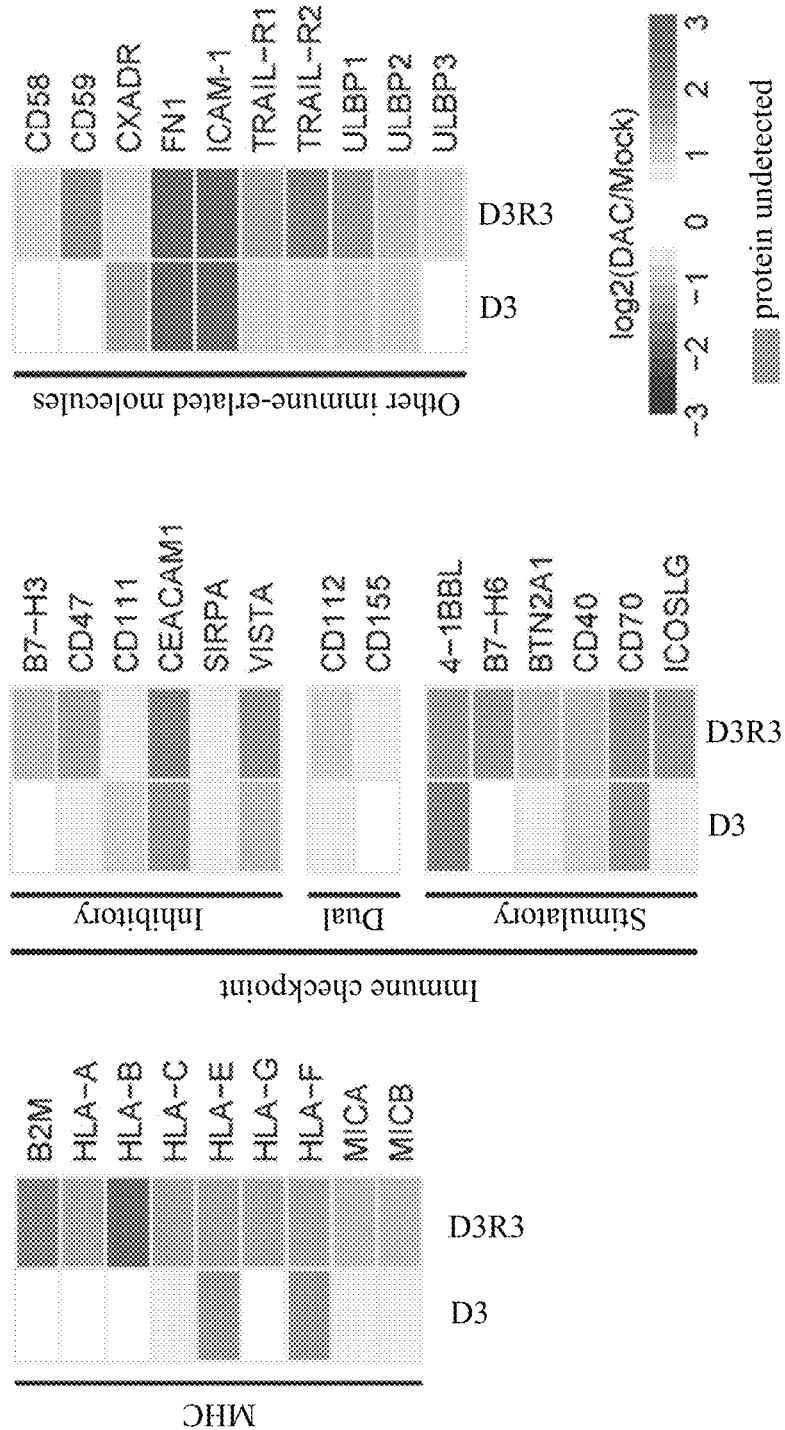

*with Q-value <0.01 and unique peptides ≥2
**Uniprot annotation as plasma membrane proteins The continued increase in identified surface proteins after drug withdrawal is resulted from epigenetic memory effects following transient drug exposure. Among all the identified proteins, 314 proteins showed sustained upregulation upon DAC treatment by at least 1.4-fold for both D3 and D3R3 (FIG. 1D). Many of these are immune-related proteins. In addition to MHC molecules and certain immune checkpoint proteins that were previously known to be upregulated by DAC, a plethora of proteins that participate in innate immunity or MHC-unrestricted immunity is found, as shown in FIG. 1E, such as MHC class I polypeptide-related sequences A and B (i.e., MICA, MICB), which are ligands of NKG2D on γδ T and NK cells. DAC also upregulates UL16-binding proteins 1, 2, and 3 (i.e., ULBP1, ULBP2, and ULBP3), another group of NKG2D ligands that are expressed in many cancers and in stressed/damaged tissues. These molecules have been identified as targets for tumor immunosurveillance by the innate immune system and may elicit antitumor immunity without the requirement for conventional MHC-restricted antigen presentation. In addition, the two death receptors (i.e., TRAIL-R1 and TRAIL-R2) for TNF-related apoptosis inducing ligand (TRAIL) that induce cancer apoptosis as part of immune surveillance were significantly upregulated at D3R3, also shown in FIG. 1E.

Figure 1F:
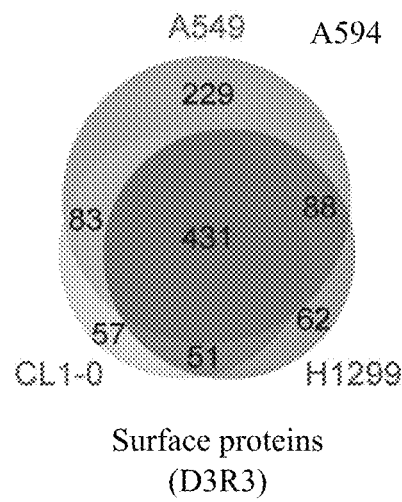

Analysis of SILAC-based surfaceomes in another two human lung cancer cell lines, H1299 and CL1-0, revealed highly similar profiles of DAC-induced surface proteins. There were 431 proteins commonly upregulated by DAC in all three lung cancer cell lines for D3R3 as shown in FIG. 1F and Table 4 below.

TABLE 4

Numbers of identified total and surface proteins/peptides in H1299 and CL1-0 human lung cancer cells subject to 100 nM decitabine daily treatment for 72 hours (D3), followed by growing in a drug-free medium for three days (D3R3)

| | | H1299 | | CL1-0 | |
|---|---|---|---|---|---|
| | | D3 | D3R3 | D3 | D3R3 |
| Total | Proteins* | 1,943 | 1,770 | 1,742 | 1,885 |
| | Peptides | 18,981 | 19,010 | 16,249 | 18,114 |
| Surface** | Proteins* | 661 | 632 | 584 | 622 |
| | Peptides | 8,562 | 8,741 | 6,902 | 7,590 |

Figure 1G:
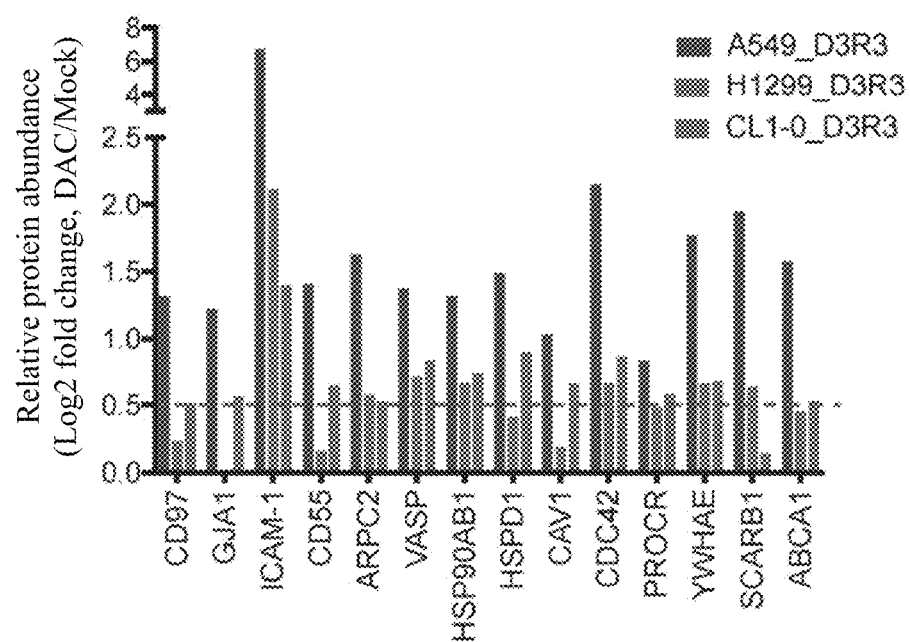

*with Q-value <0.01 and unique peptides ≥2
**Uniprot annotation as plasma membrane proteins The involvement of DAC-induced surface molecules in the innate immune response is also shown. These proteins are mapped against the innate immune interactomes from InnateDB, an extensively curated database of innate immune pathways and interactions. It is found that DAC-mediated innate immune molecules participate in adhesion/cell-cell interactions (e.g., CD97 and ICAM-1), the cytoskeleton (e.g., ARPC2 and VASP), heat shock protein responses, integrin-associated pathways, and various signal transduction networks, as shown in FIG. 1G.

Figure 1H:
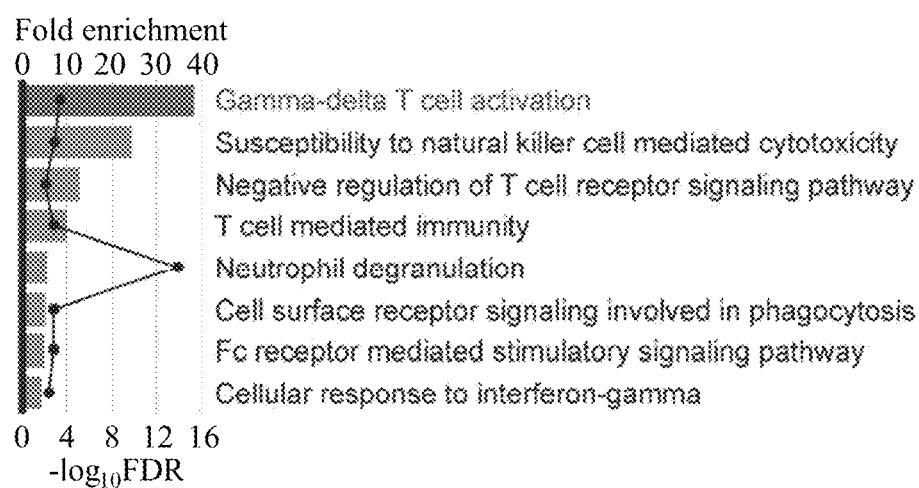

Next, Gene Ontology (GO) term enrichment was performed using PANTHER Gene List Analysis tools on the DAC-induced surface proteome to search for relevant immune pathways. As shown in FIG. 1H, γδT cell activation was the top enriched pathway among all immune-related processes, followed by natural killer (NK) cell-mediated immunity—two of the key immune cell types involved in innate immune responses against cancer.

Figure 2A:
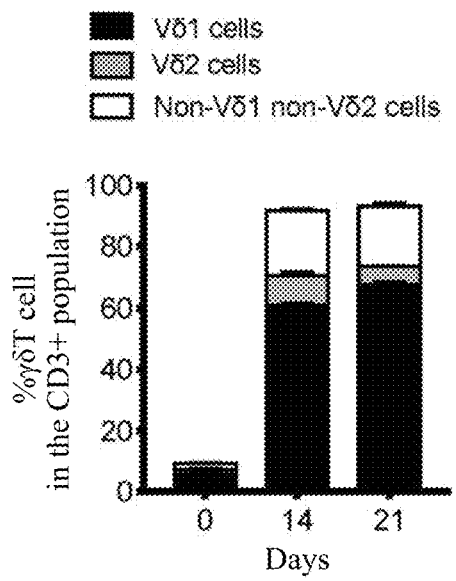
FIGS. 2A to 2S show that decitabine (DAC) enhances γδ T cell-mediated cytolysis of cancer cells.
Figure 2B:
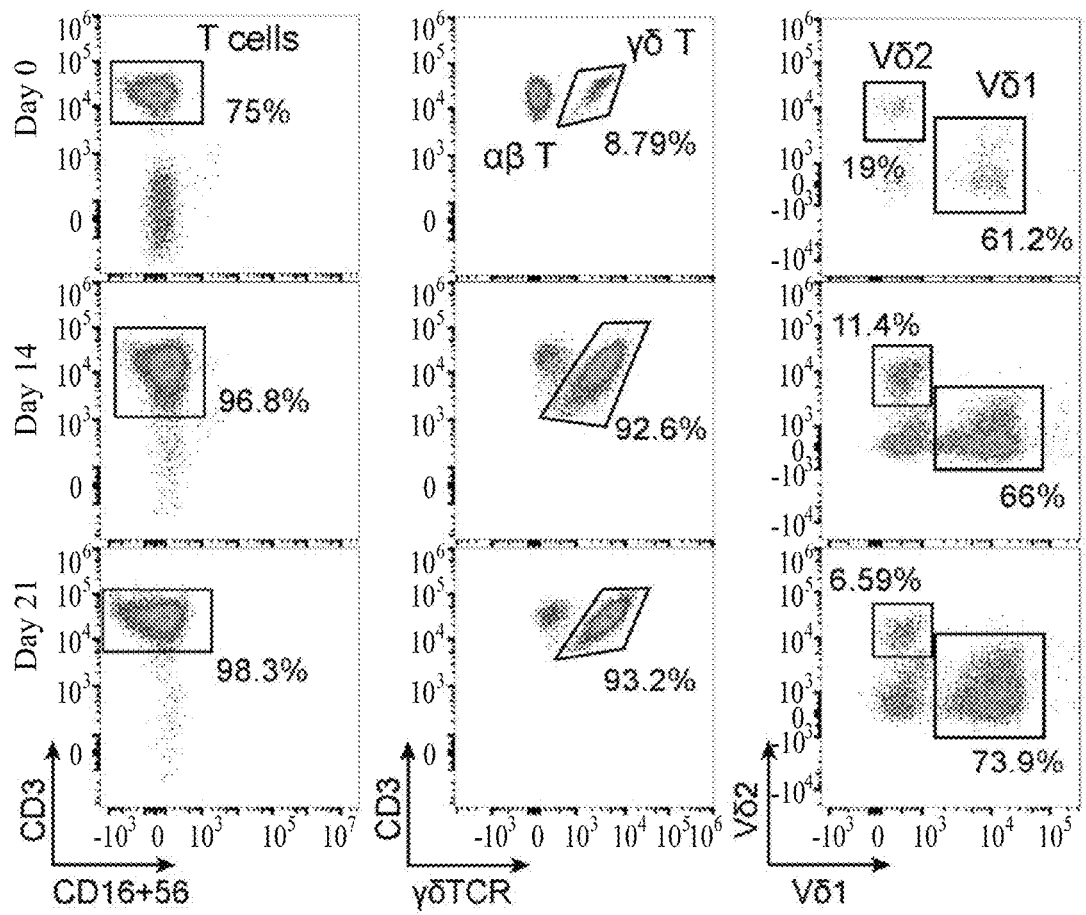
FIG. 2B shows a representative plot of flow cytometric analysis showing ex vivo expansion of γδ T cells from peripheral blood mononuclear cells of a healthy donor at days 0, 14, and 21.

Example 2: Ex Vivo Expanded Human Vδ1-Enriched γδ T Cells Retain Antitumor Effector Functions Based on the DAC-mediated surfaceome data from Example 1, epigenetic therapy has the potential to enhance tumor attack by γδ T cells. To conduct preclinical functional studies with γδ T cells for their therapeutic potential, a sequential cytokine stimulation protocol was optimized for ex vivo clinical-grade expansion of γδ T cells preferentially enriched for the Vδ1+ subset from the peripheral blood of healthy donors. The process does not require the step of initial γδ T cell purification shown previously. Over the course of 21 days, the percentage of total γδ T cells in the CD3+ cell population increased from less than 10% to over 90%, while Vδ1+ T cells accounted for approximately 70% of all γδ T cells, as shown in FIGS. 2A and 2B.

Figure 2C:
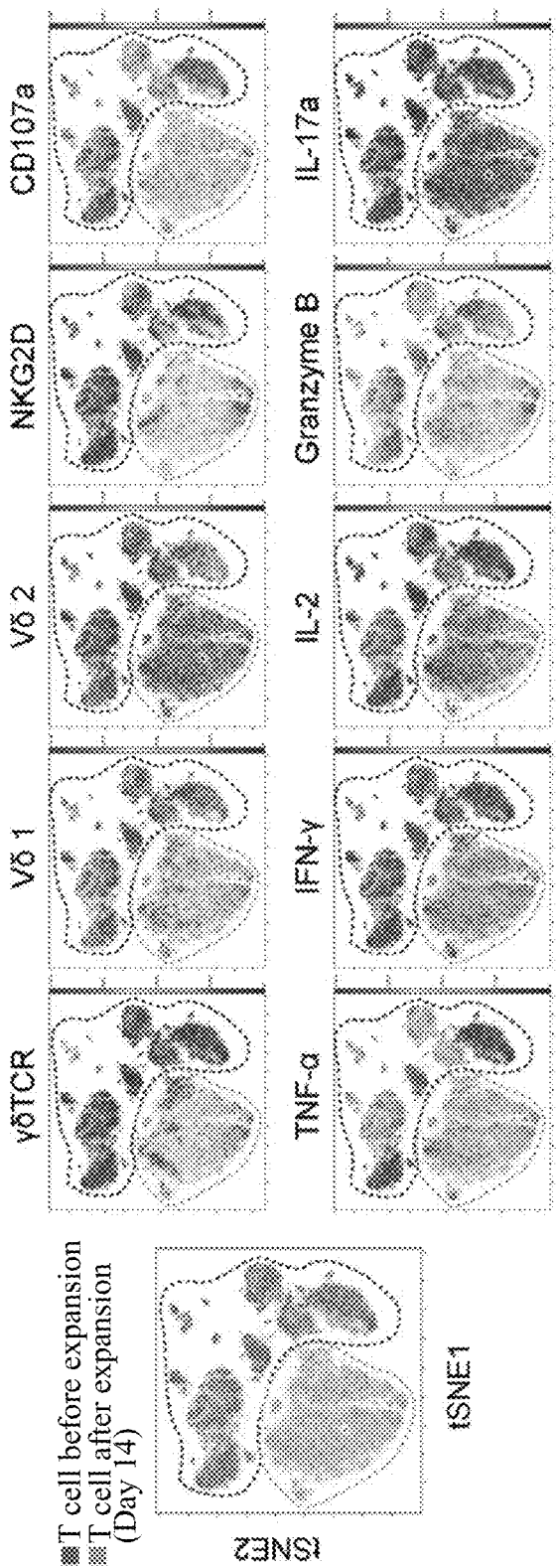
FIG. 2C shows the overlay of tSNE maps of CD3+ T cells from PBMC at baseline and after ex vivo expansion analyzed by mass cytometry (CyTOF). Each dot represents a single cell. Cells enclosed in the blue or orange dashed lines are cells enriched at baseline or after expansion, respectively. For individual markers, the color represents the expression level of the indicated markers. Red is high, and blue is low.
Figure 2D:
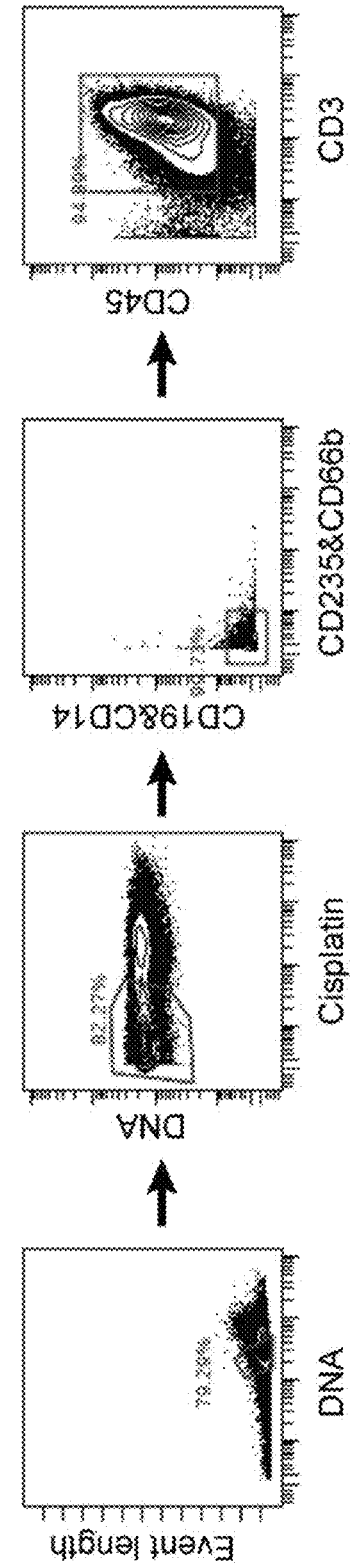
FIG. 2D shows the representative manual gating strategy to identify CD3+ T cells. Doublet and cell debris were gated out by event length and DNA content. Dead cells were then gated out based on the intensity of cisplatin staining. B cells, monocytes, granulocytes and red blood cells were excluded using CD19 and CD14, as well as CD235 and CD66b. Finally, CD3+ T cells were defined by the level of CD3 expression.
Figure 2E:
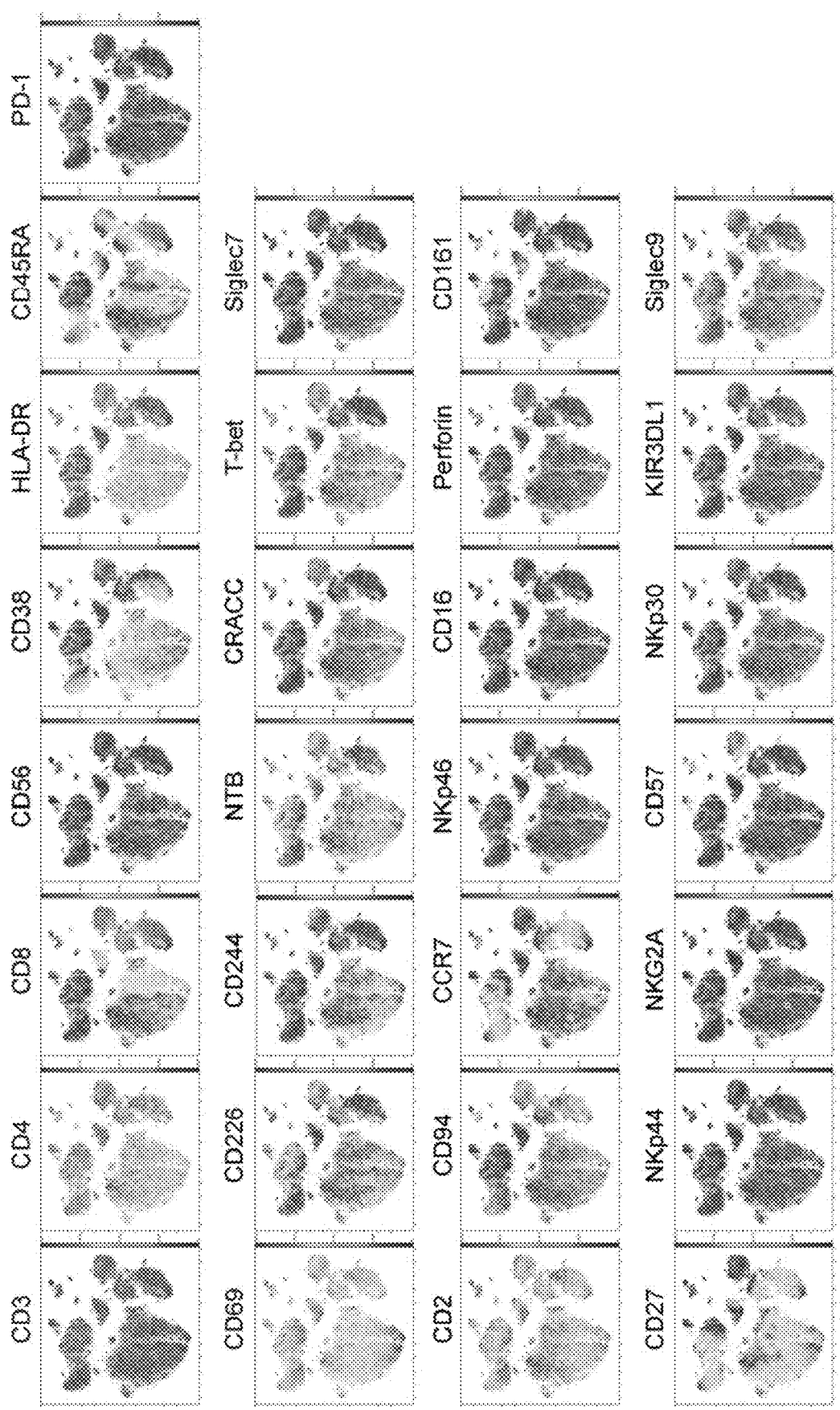
FIG. 2E shows an extended panel for immunophenotyping PBMCs at baseline and after ex vivo expansion. Each dot represents a single cell, and the color of each dot represents the expression level of the indicated markers for each tSNE plot. Red is high, and blue is low.
Figure 2F:
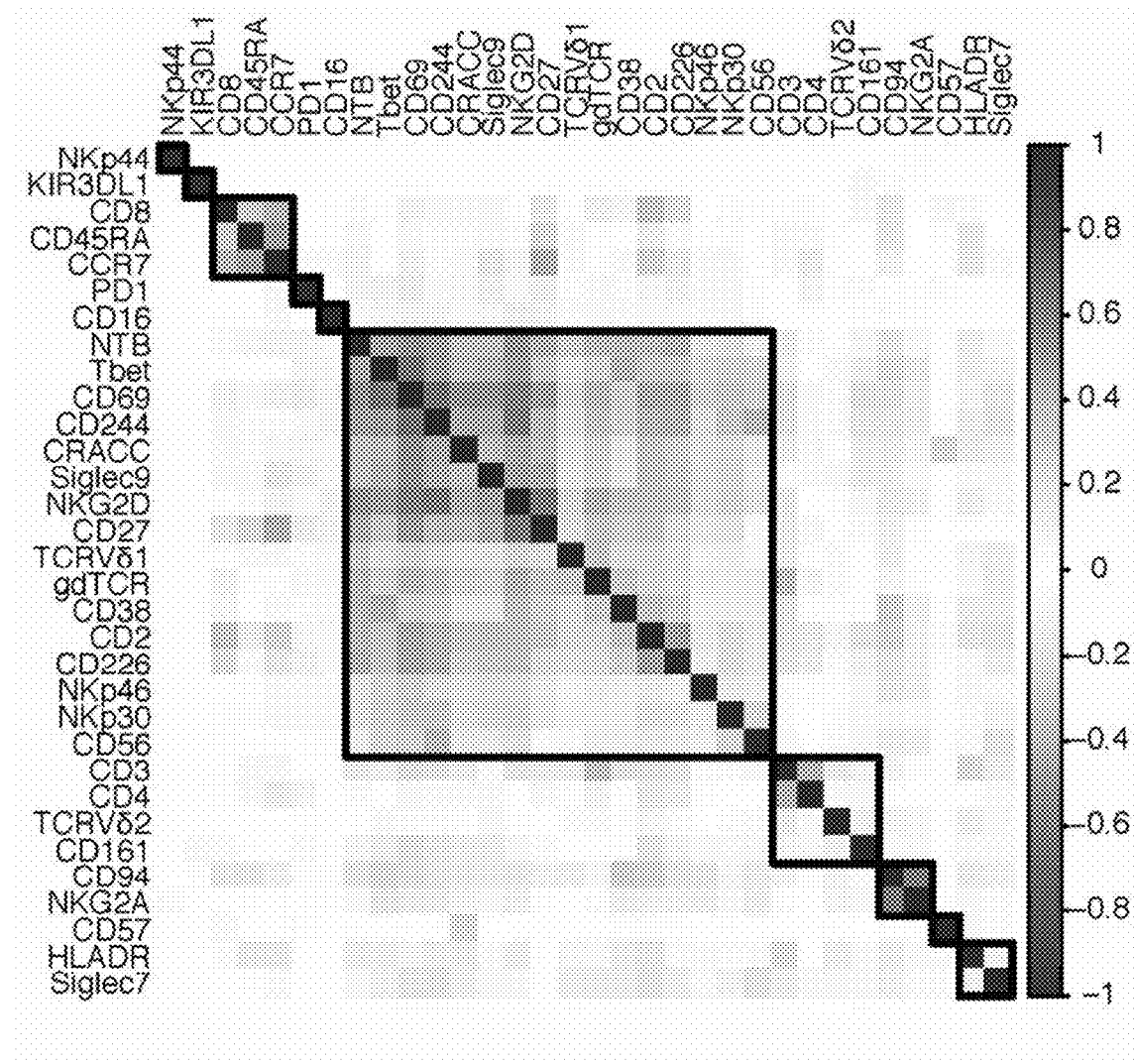
FIG. 2F shows the Pearson correlation of markers expressed in ex vivo expanded γδ T cells analyzed by mass cytometry. The rectangles indicate groups with distinctive marker expression signatures according to the hierarchical clustering.

To evaluate the immunophenotypes of expanded γδ T cells, single-cell analysis on PBMCs was performed at baseline and after ex vivo expansion using mass cytometry with an antibody panel designed to characterize T cell and MHC-unrestricted immunity-related receptors. t-distributed stochastic neighbor embedding (t-SNE) was used to investigate the differences and cellular heterogeneity within T cells before and after ex vivo expansion. First, preferential enrichment of the Vδ1+ subset from the peripheral blood after 14 days of expansion was noted, as shown in FIGS. 2C, 2D and 2E). Within the expanded Vδ1+ subset, differential expression of MHC-unrestricted immunity-related receptors was found, including NKG2D, CD226, CD244, NTB, CRACC, and NKp30, and the expression levels of these receptors were highly correlated, as shown in FIG. 2F.

Furthermore, the ex vivo expanded γδ T cells express markers for cytolytic degranulation (e.g., CD107a) as well as secrete antitumor effector cytokines (i.e., TNF-α and IFN-γ).

Figure 2G:
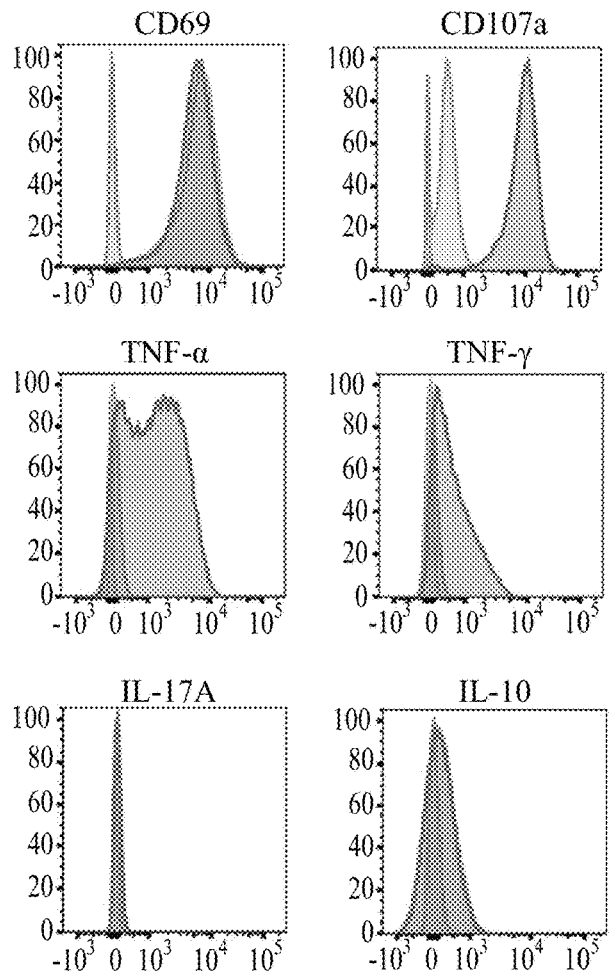
FIG. 2G shows the flow cytometric analysis of T cell activation markers (CD69, CD107a), antitumor effector cytokines (TNF-α, IFN-γ) and protumor effector cytokines (IL-17A, IL-10) produced by Vδ1 cells following PMA (30 ng/mL) and ionomycin (1 μg/mL) stimulation for 4 hours.

On the other hand, the expanded γδ T cells secrete almost no protumor or negative regulatory cytokines, such as IL-17A and IL-10, nor do they express PD-1, an immune checkpoint associated with the exhausted state, as shown in FIGS. 2C, 2E and 2G, which precludes the concern that constant cytokine stimulation in the ex vivo expansion protocols leads to premature exhaustion of γδ T cells. The data indicate that the expanded γδ T cells are at an activated and proliferative stage with the antitumor phenotype suitable for potential therapeutic uses.

Example 3: Decitabine Enhances γδ T Cell-Mediated Cytolysis of Cancer Cells

In this example, it is shown that pretreatment with low-dose DAC potentiated and increased susceptibility of cancer cells to the attack by γδ T cells.

Figure 2H:
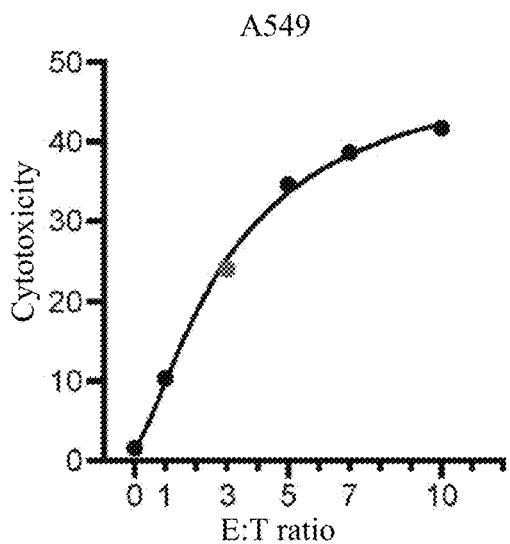
FIG. 2H shows cytolysis of A549 lung cancer cells by γδ T cells at effector-to-target (E:T) ratio of 1, 3, 5, 7, and 10 determined by calcein-release assay.
Figure 2I:
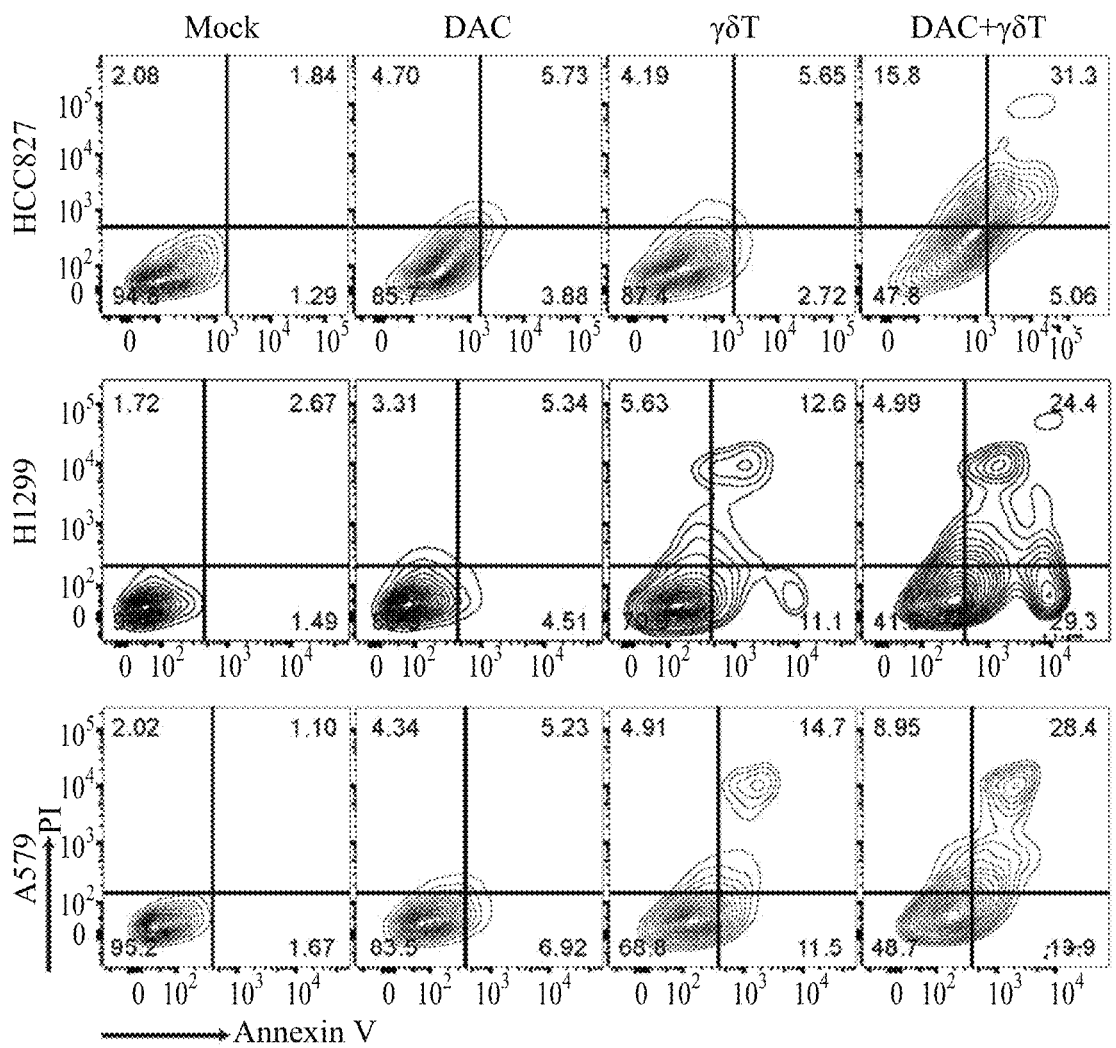
FIG. 2I shows the representative flow cytometric analysis of Annexin V and propidium iodide (PI) apoptosis assays in human lung cancer cell lines HCC827, H1299, A549 upon treatments with 100 nM decitabine alone, γδ T cells alone or DAC/γδ T cell combination. The effector-to-target (E:T) ratio is 3:1.
Figure 2J:
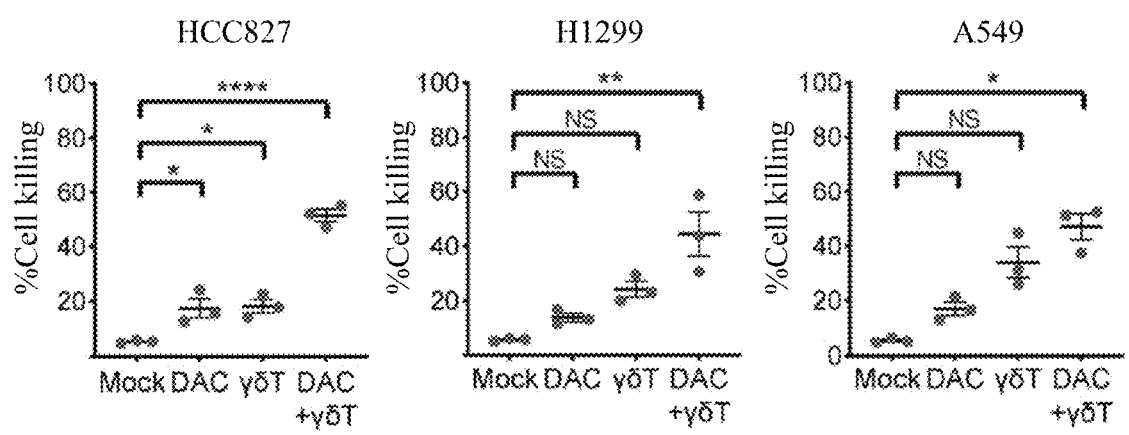
FIG. 2J shows the dot plots showing three biological replicates of Annexin V and propidium iodide (PI) apoptosis assays in human lung cancer cell lines described in FIG. 2I. Data are presented as mean±SEM. p value is calculated by one-way ANOVA with Tukey's multiple comparison test (*: $p<0.05$; : $p<0.01$; *: $p<0.001$; ****: $p<0.0001$).

Initially, in vitro coculture of untreated lung cancer and γδ T cells at an effector-to-target (E:T) ratio of 3:1 caused merely 20-30% cytolysis of A549 human lung cancer cells, as shown in FIG. 2H. However, 72-hour daily treatment with 100 nM DAC on human lung cancer cells (i.e., HCC827, H1299, and A549 cells) significantly potentiates the killing of lung cancer cells by γδ T cells at the same E:T ratio, as shown in FIG. 2I. On the other hand, either treatment alone resulted in minimal or moderate cell death using Annexin V and propidium iodide apoptosis assays, as shown FIG. 2J.

Figure 2K:
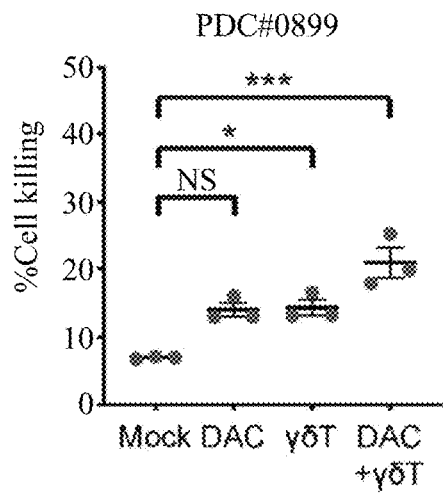
FIG. 2K shows the Annexin V and propidium iodide apoptosis assays of a patient-derived lung cancer cell line from malignant pleural effusion, PD #0899 (mean±SEM, n=3).
Figure 2L:
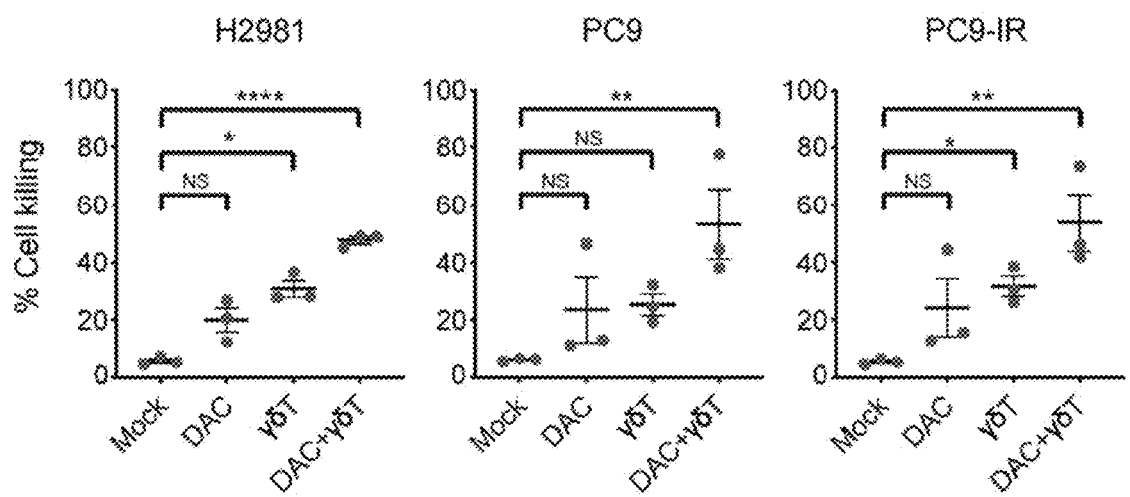
FIG. 2L shows the Annexin V and propidium iodide apoptosis assays of human lung cancer cell lines H2981, PC9, PC9-IR, H157, CL1-0, and CL1-5 upon treatments with 100 nM DAC alone, γδ T cells alone or DAC/γδ T cells combination. E:T ratio is 3:1. Data represent three biological replicates presented as mean±SEM. p value is calculated by one-way ANOVA with Tukey's multiple comparison test (*: $p<0.05$; **: $p<0.01$).

Similar potentiating effects were observed in several other lung cancer cell lines, including H2981, PC9, PC9-IR (Iressa resistant), H157, CL1-0, and CL1-5, as well as patient-derived lung cancer cells from a malignant pleural effusion, PDC #0899, as shown in FIGS. 2K and 2L.

Figure 2M:
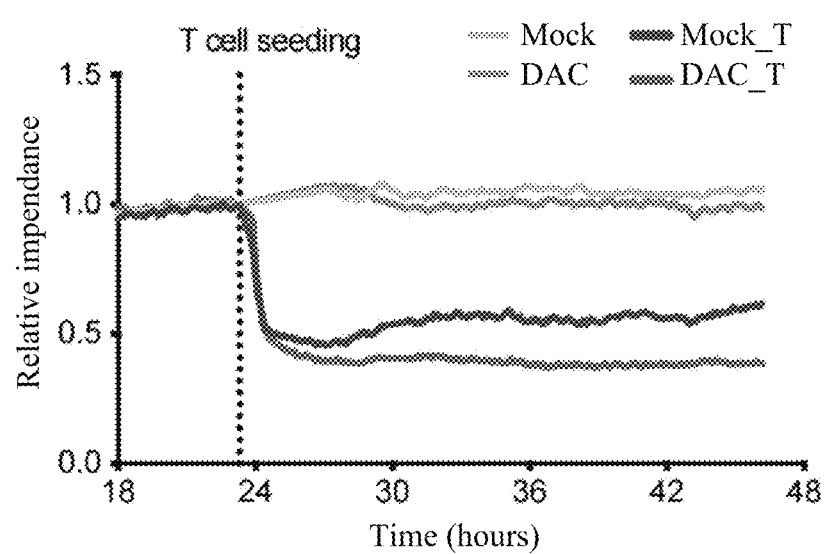
FIG. 2M shows the real-time impedance-based cell viability measurement of A549 lung cancer cells subject to mock, DAC alone, γδ T alone or a combination of DAC and γδ T treatment using the electric cell-substrate impedance sensing (ECIS™) system. Acquired raw data are normalized by the impedance at the latest time prior to adding γδ T cells of each condition. DAC treatment alone has minimal effects on cell viability but may potentiate γδ T-mediated cytolysis when combined with γδ T.

DAC's potentiation effect on γδ T cell killing was also tracked using an electric cell-substrate impedance sensing (ECIS™) system, a biophysical approach for real-time monitoring of the γδ T cell killing process. γδ T cell-mediated cytolysis usually takes place within 30 minutes to a few hours. The effect can be enhanced by DAC pretreatment at a dose that does not cause significant cytotoxicity, as shown in FIG. 2M.

Figure 2N:
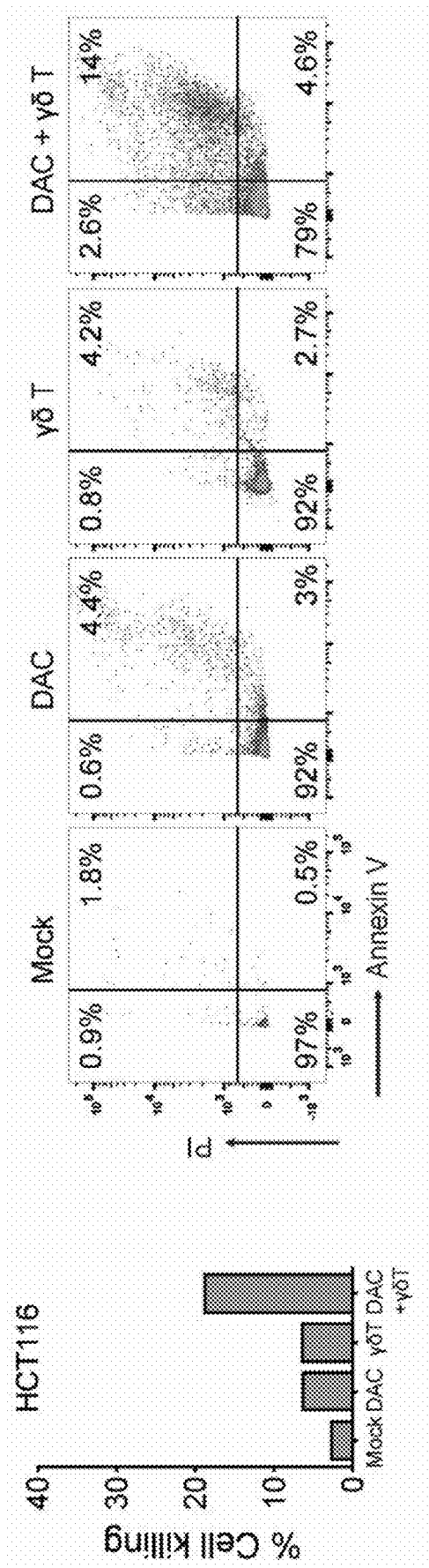
FIG. 2N illustrates the bar graphs showing Annexin V and propidium iodide (PI) apoptosis γδ T cells alone or DAC/γδ T cells combination. Representative flow cytometric analysis is shown on the right.
Figure 2O:
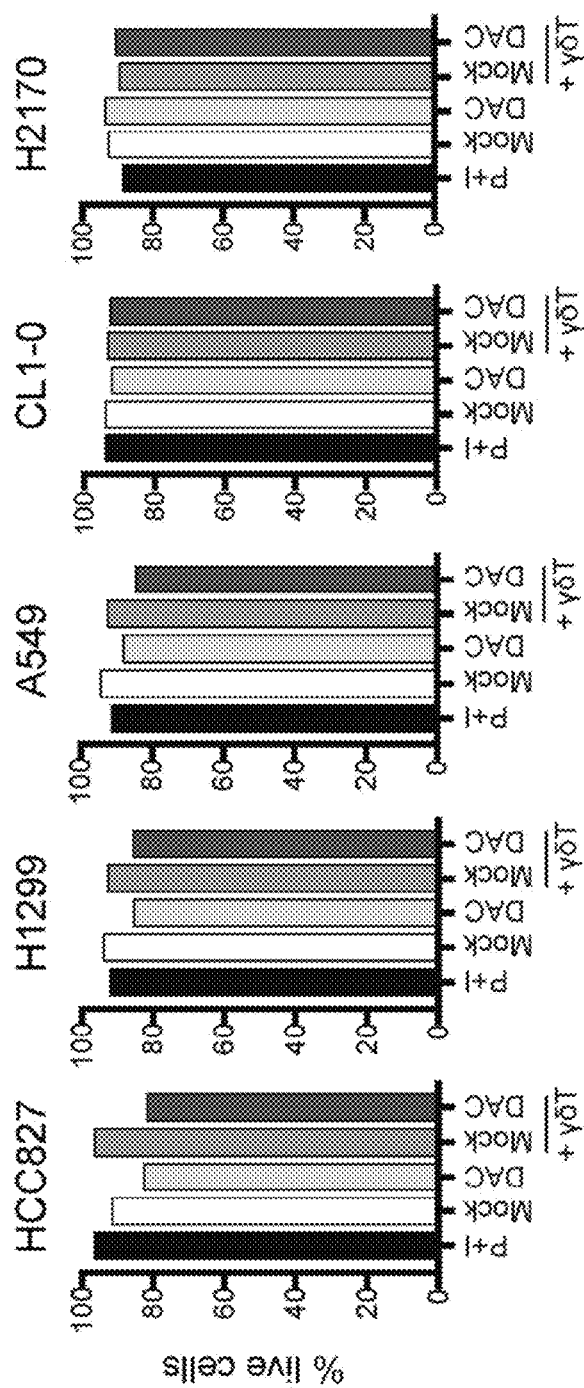
FIG. 2O shows the non-contact killing assays of five lung cancer cells (lower chamber) by γδ cells (upper chamber) in a Transwell coculture system permeable to cytokines and cytotoxic mediators. Lung cancer cell lines are pretreated with DAC for 72 hours and rest for 3 days before coculture with γδ T cells. Cell death is analyzed by Annexin V apoptosis assays after coculture for 24 hours.
Figure 2O:
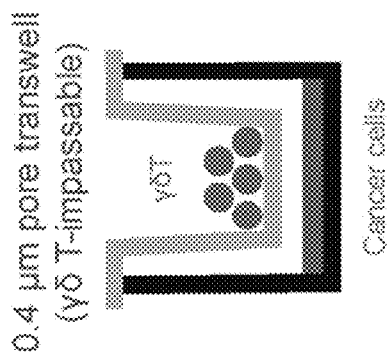
Figure 2P:
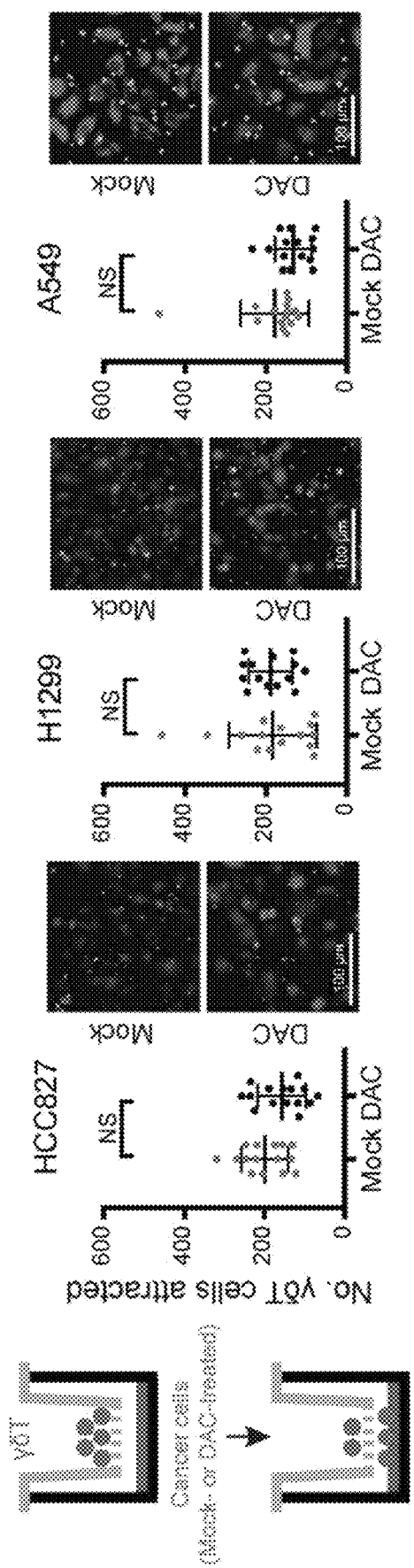
FIG. 2P shows the transwell migration assays of γδ T cells (upper chamber) towards mock- or DAC-treated lung cancer cells (lower chamber). Numbers of γδ T cells in the lower chambers are counted per high power field and presented as mean±standard errors in the dot plots. Representative images of γδ T cells (Hoechst 33342-labeled; green) and lung cancer cells (Calcein-retained; red) in the lower chambers are shown. Data are presented as mean±standard deviation (SD). p value is calculated by the Mann-Whitney test. Scale bar: 100 μm.
Figure 2Q:
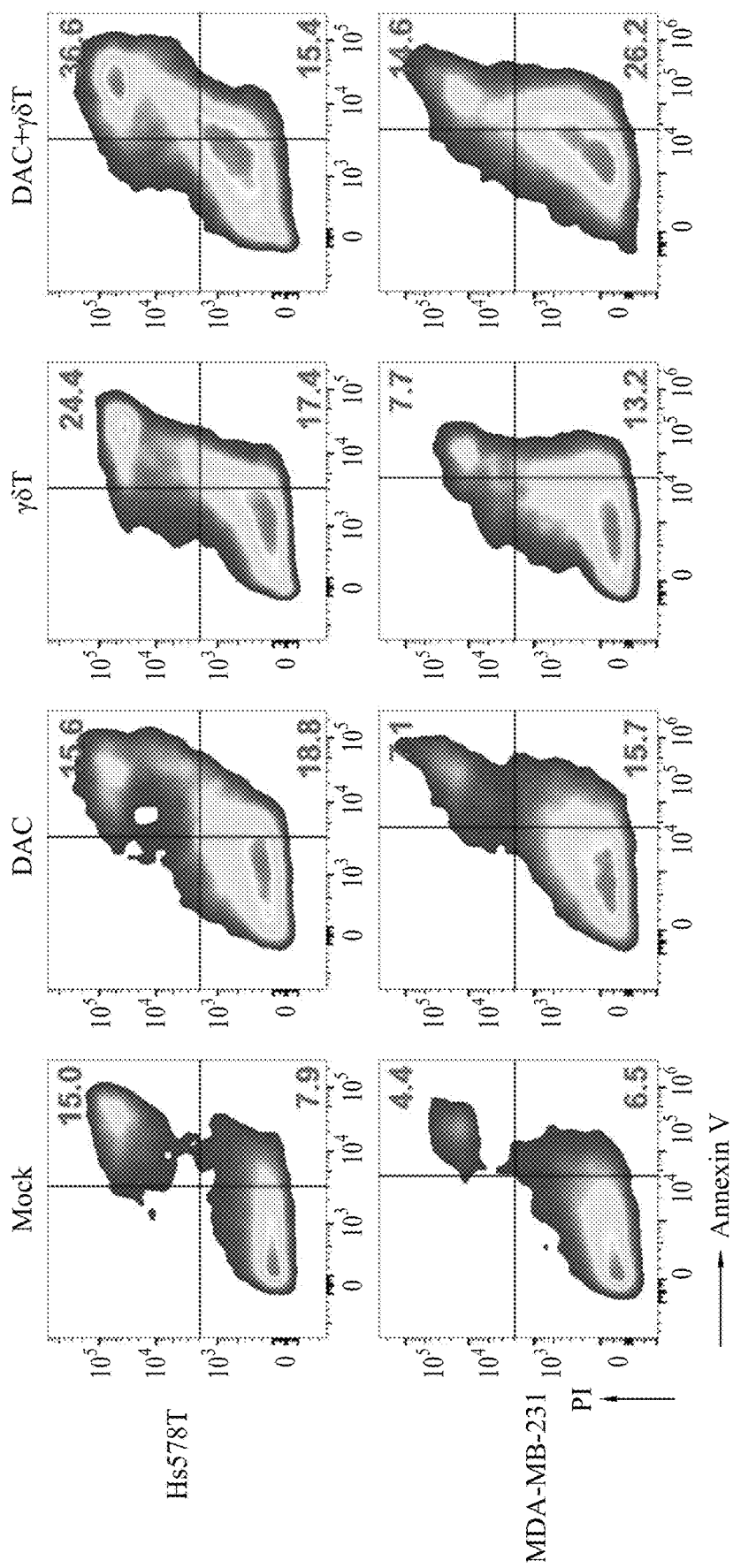
FIG. 2Q shows the representative flow cytometric analysis of Annexin V and propidium iodide (PI) apoptosis assays in human breast cancer cell lines Hs578T and MDA-MB-231 cells upon treatments with 100 nM decitabine alone, γδ T cells alone or DAC/γδ T cell combination, in which the effector-to-target (E:T) ratio is 3:1.
Figure 2R:
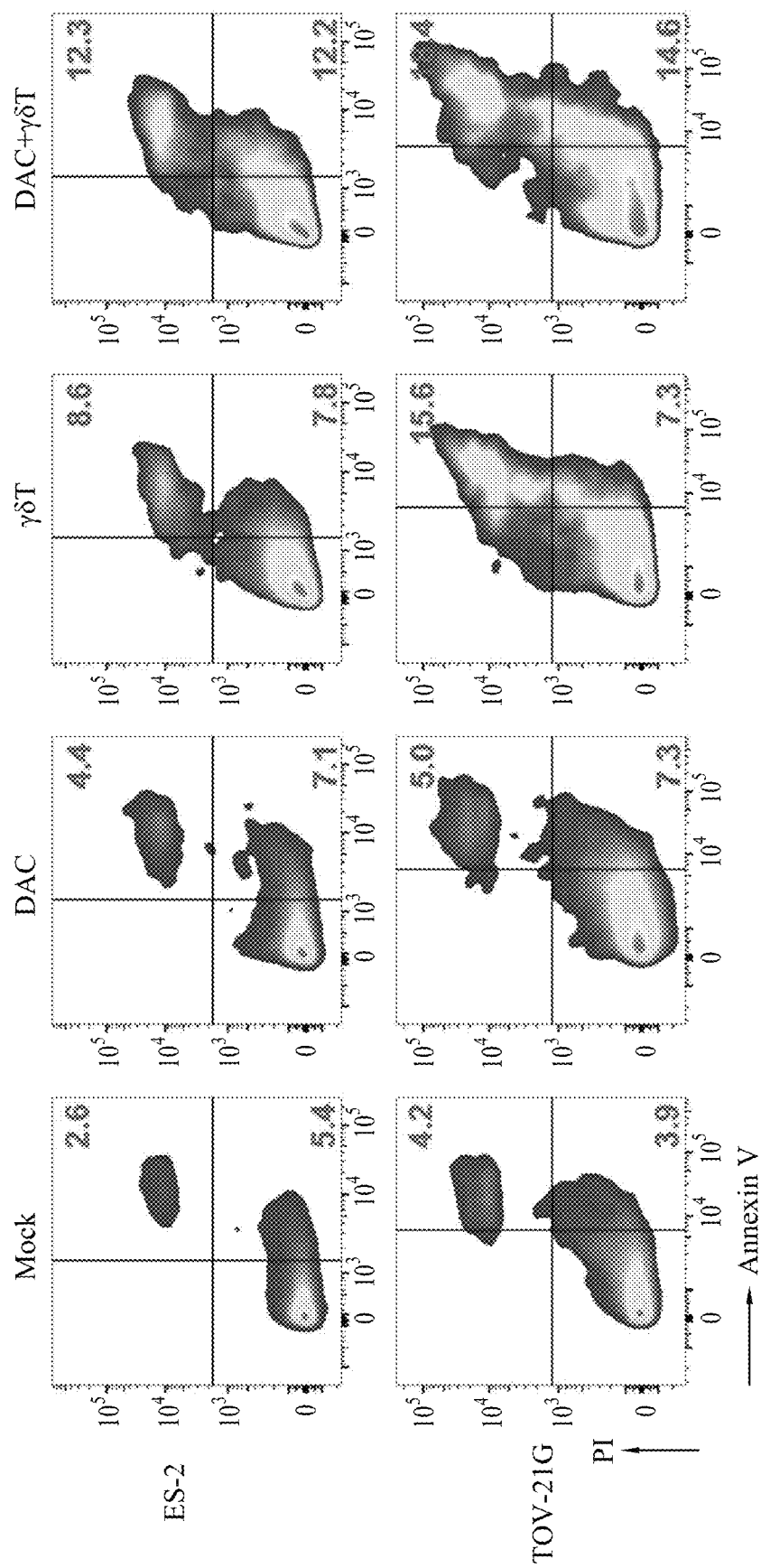
FIG. 2R shows the representative flow cytometric analysis of Annexin V and propidium iodide (PI) apoptosis assays in human ovarian cancer cell lines ES-2 and TOV-21G upon treatments with 100 nM decitabine alone, γδ T cells alone or DAC/γδ T cell combination, in which the effector-to-target (E:T) ratio is 3:1.
Figure 2S:
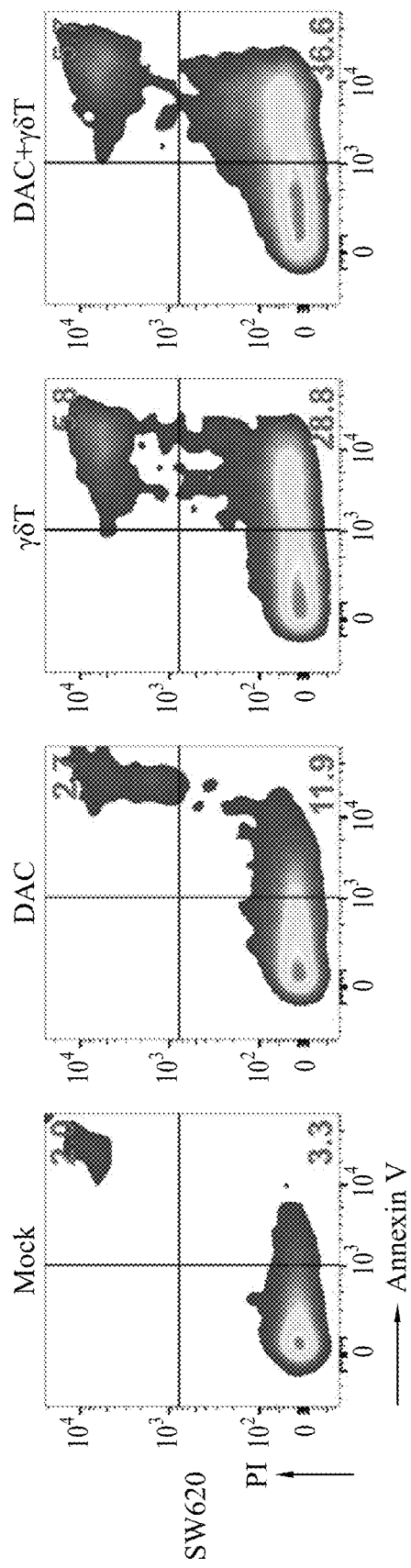

DAC's This potentiating effect was also observed in HCT116 and SW620 colon cancer cells, as shown in the results of Annexin V and propidium iodide apoptosis assays in FIG. 2N and FIG. 2S, respectively, where it was found that cell apoptosis quantitated by Annexin V and/or propidium iodide apoptosis assays increased in the group of pretreatment with low-dose DAC and γδ T cell. In addition, more cancer cell lines including human breast cancer cell lines Hs578T and MDA-MB-231 cells, as well as human ovarian cancer cell lines ES-2 and TOV-21G, were evaluated for the DAC's potentiation effect on γδ T cell killing. As shown in FIGS. 2Q and 2R, the γδ T cell killing effect is enhanced by DAC pretreatment.

In addition to the granule exocytosis-dependent cytotoxic pathway through direct contact, activated γδ T cells also trigger cancer death via noncontact cytotoxicity by secreting TRAILs that engage TRAIL receptors and the downstream apoptotic pathway.

To assess the significance of secretory TRAIL-mediated apoptosis in the DAC potentiating effect, a transwell system was used to allow diffusion of γδ T cell-secreted TRAILs to reach cancer cells without direct cell contact. No significant cancer cell death was observed after 24 hours, as shown in FIG. 2O, suggesting that direct cell contact is required for DAC-potentiated γδ T cell killing.

Furthermore, it is investigated to confirm whether DAC enhances γδ T cell chemotaxis, using a transwell coculture system that allows γδ T cells to pass through the membrane. As shown in FIG. 2P, results found that there was no significant difference between the numbers of γδ T cells migrating toward mock-treated or DAC-treated lung cancer cells in the bottom wells. The data suggest that the potentiating effect of DAC is not dependent on increased chemoattraction of γδ T cells by DAC-primed cancer cells.

Example 4: Decitabine Facilitates Immune Synapse Formation between Cancer and γδ T Cells Effective lysis of cancer cells by immune cells relies on functional immune synapses to facilitate directional and coordinated delivery of lytic granules Immune synapse formation between γδ T cells and DAC-pretreated cancer cells was studied by immunofluorescence staining of phosphotyrosine (pTyr), a marker of immune synapses with active signaling.

Figure 3A:
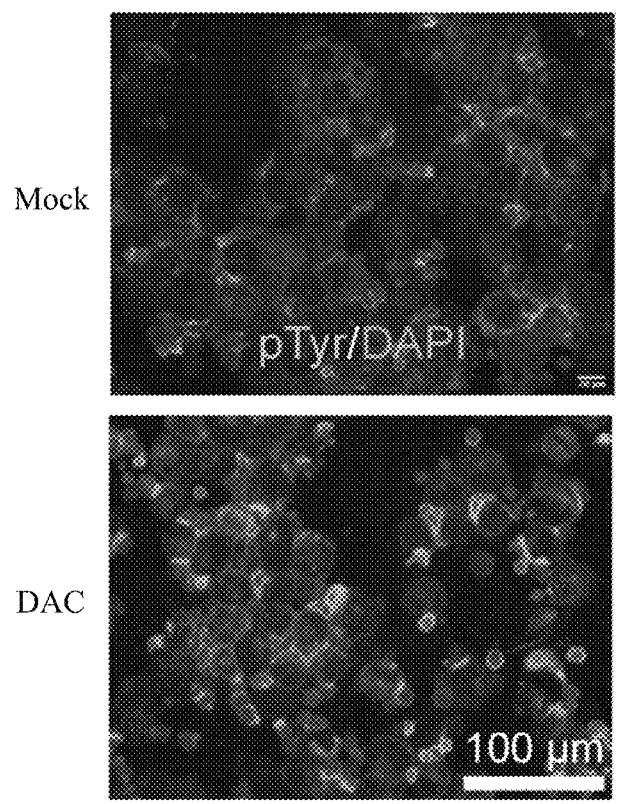
FIGS. 3A to 3L show that decitabine (DAC) facilitates immune synapse formation between lung cancer and γδ T cells.
Figure 3A:
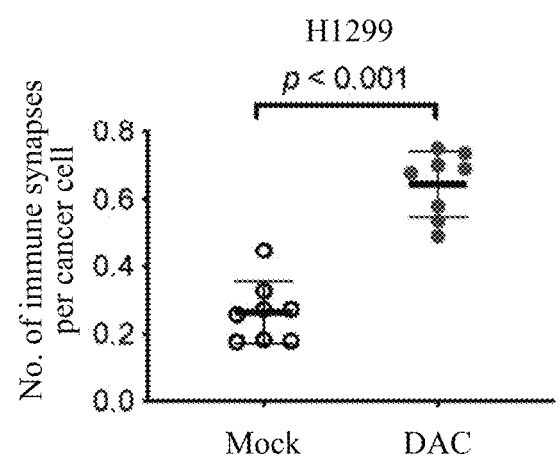
Figure 3B:
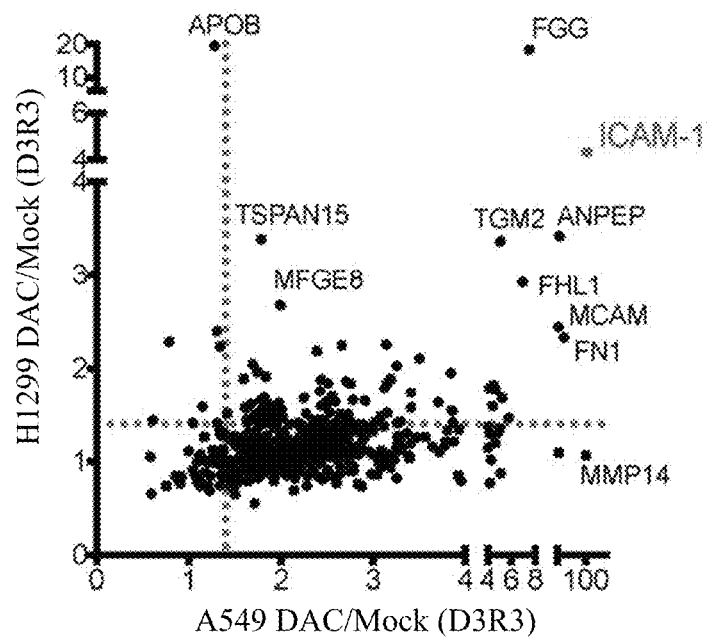
Figure 3C:
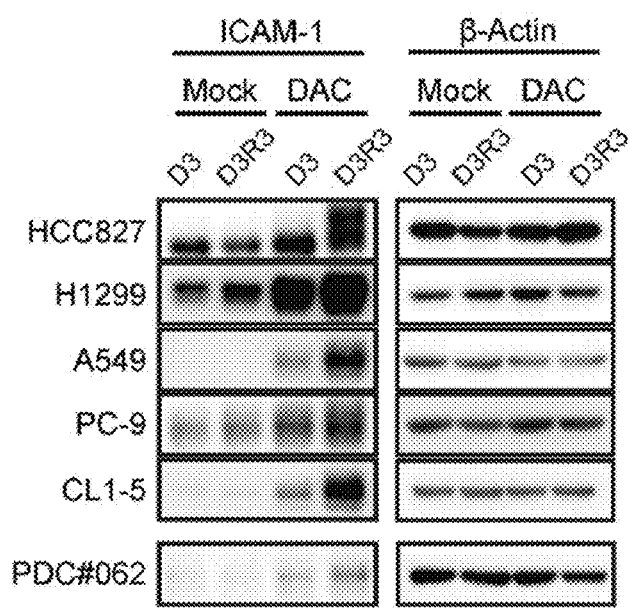

A much higher number of immune synapses was found to form between γδ T and DAC-treated H1299 lung cancer cells than by mock-treated cells, as shown in FIG. 3A. In search of the key molecules involved in the synaptic interaction, the DAC-induced surface proteome of two human lung cancer cell lines H1299 and A549 were compared; both of which showed enhanced γδ T cell killing following DAC treatment. Among the identified proteins, intercellular adhesion molecule 1 (ICAM-1) was highly upregulated in both cell lines, as shown in FIG. 3B. Western blotting confirmed that DAC significantly upregulate ICAM-1 proteins in many lung cancer cell lines as well as a patient-derived lung cancer cell line from a malignant pleural effusion, PDC #062, as shown in FIG. 3C.

Figure 3D:
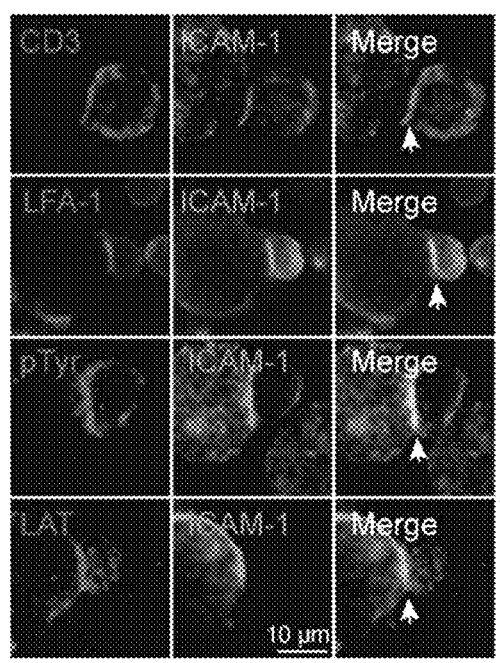
Figure 3E:
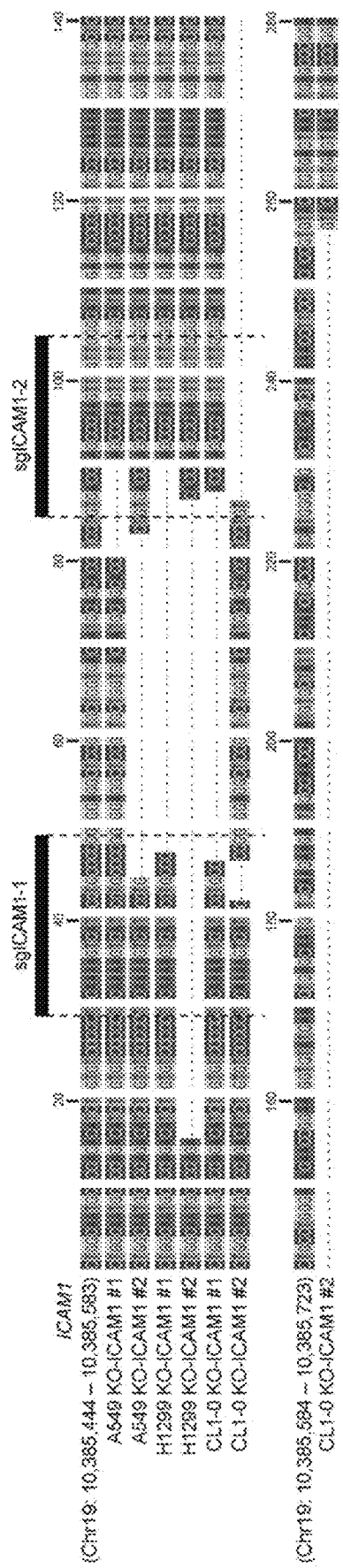

ICAM-1 is a surface glycoprotein and a member of the immunoglobulin superfamily. It is present in immune cells, endothelial cells, and epithelial cells as a general adhesion molecule. It is demonstrated that ICAM-1 localized within the cancer-γδ T immune synapse along with other classical immune synapse proteins, including LFA-1 and linker for activation of T cells (LAT), as shown in FIG. 3D. Knockout of ICAM-1 (KO-ICAM1) with CRISPR technology as shown in FIGS. 3E and 3F in lung cancer cells A549, H1299, and CL1-0 diminished the potentiation effects of DAC for γδ T cell killing in all three cell lines tested, as shown in FIGS. 3G and 3H.

Figure 3F:
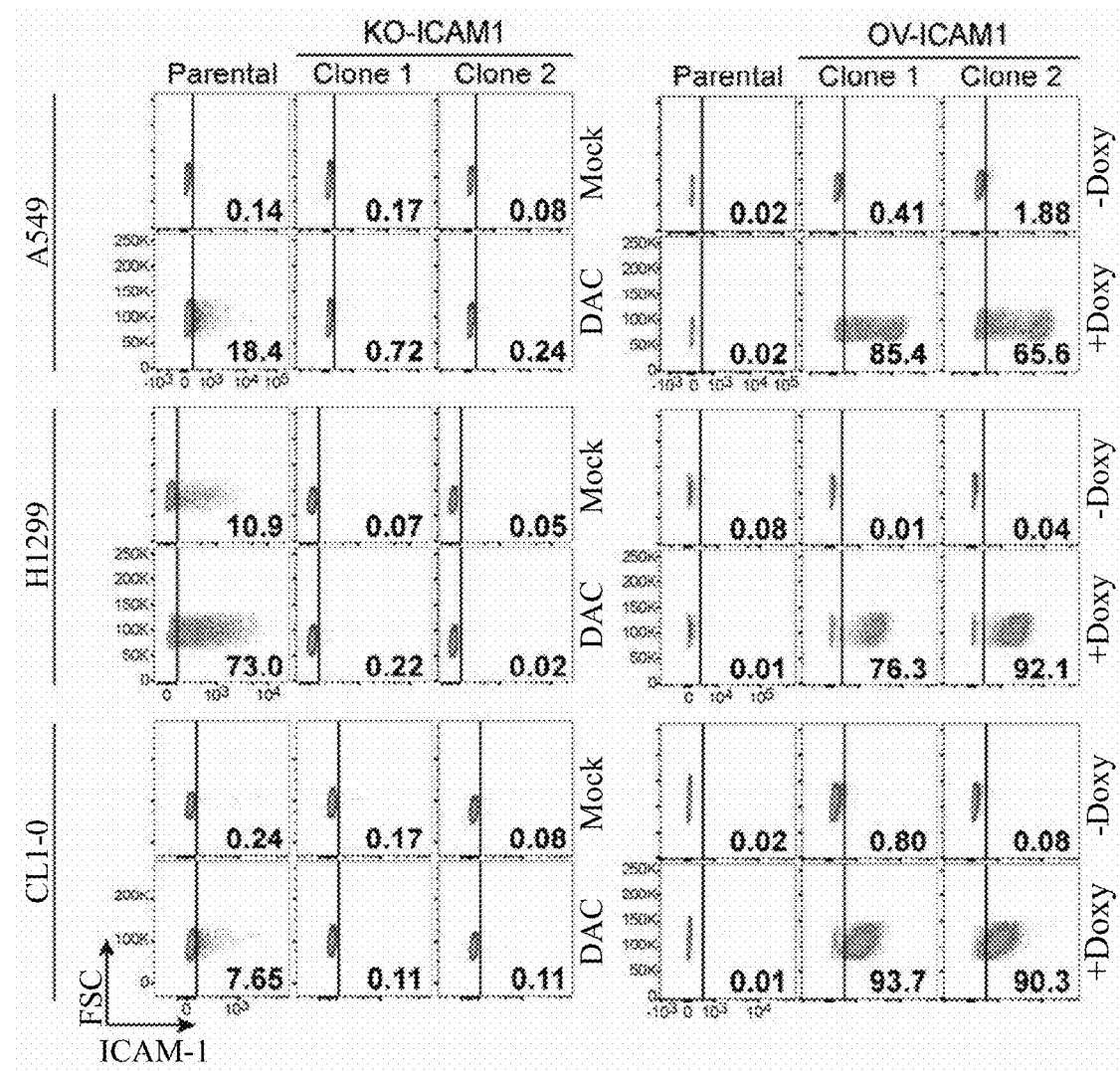
Figure 3G:
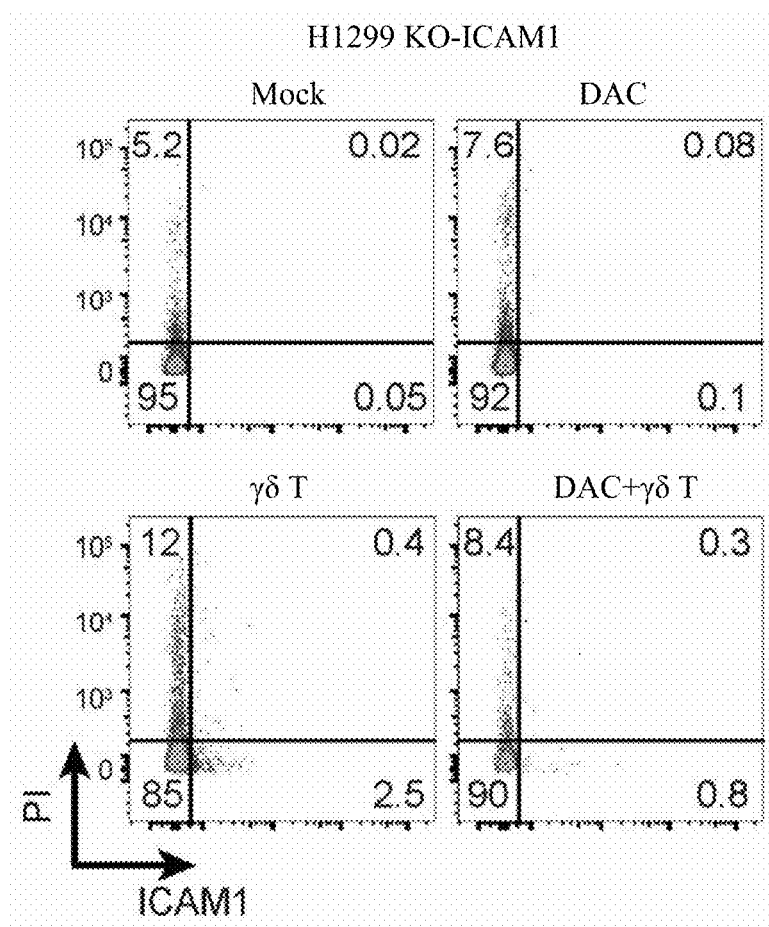
Figure 3H:
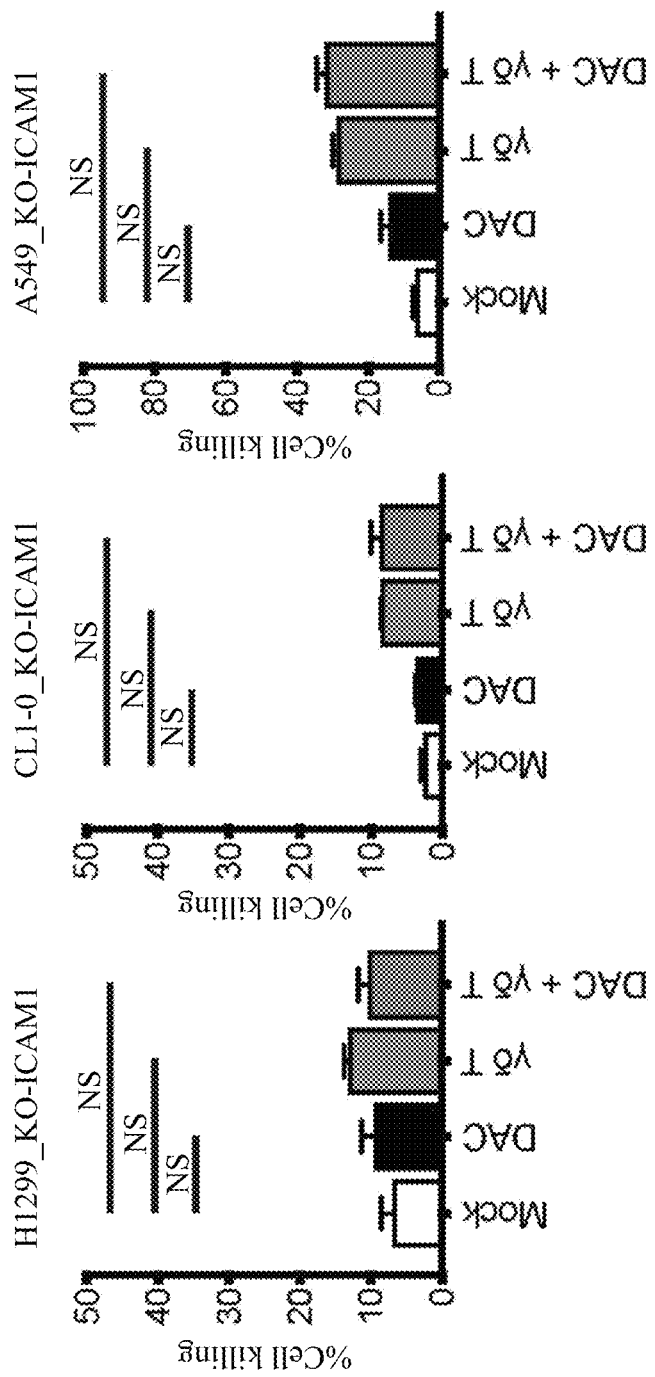
Figure 3I:
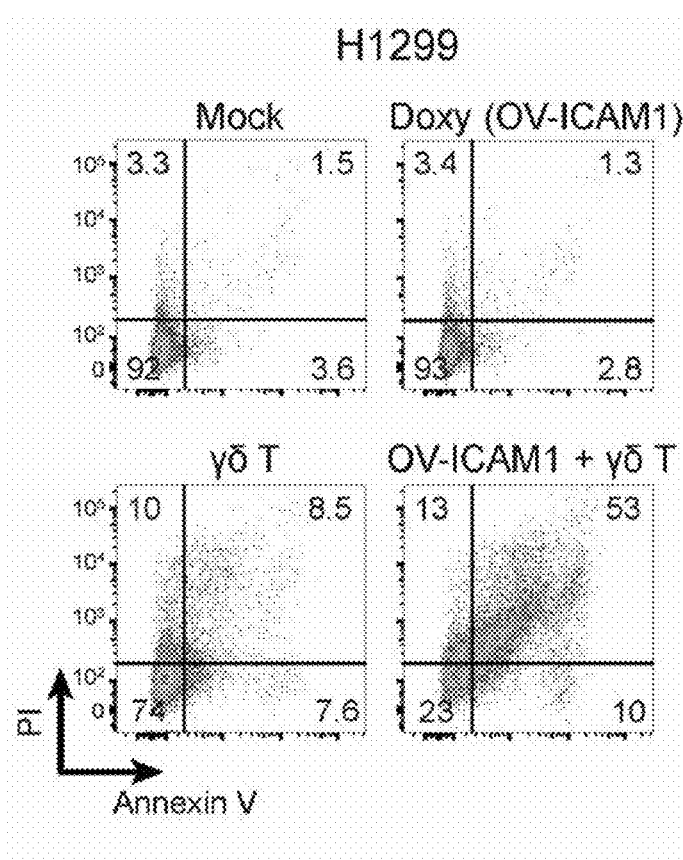
Figure 3J:
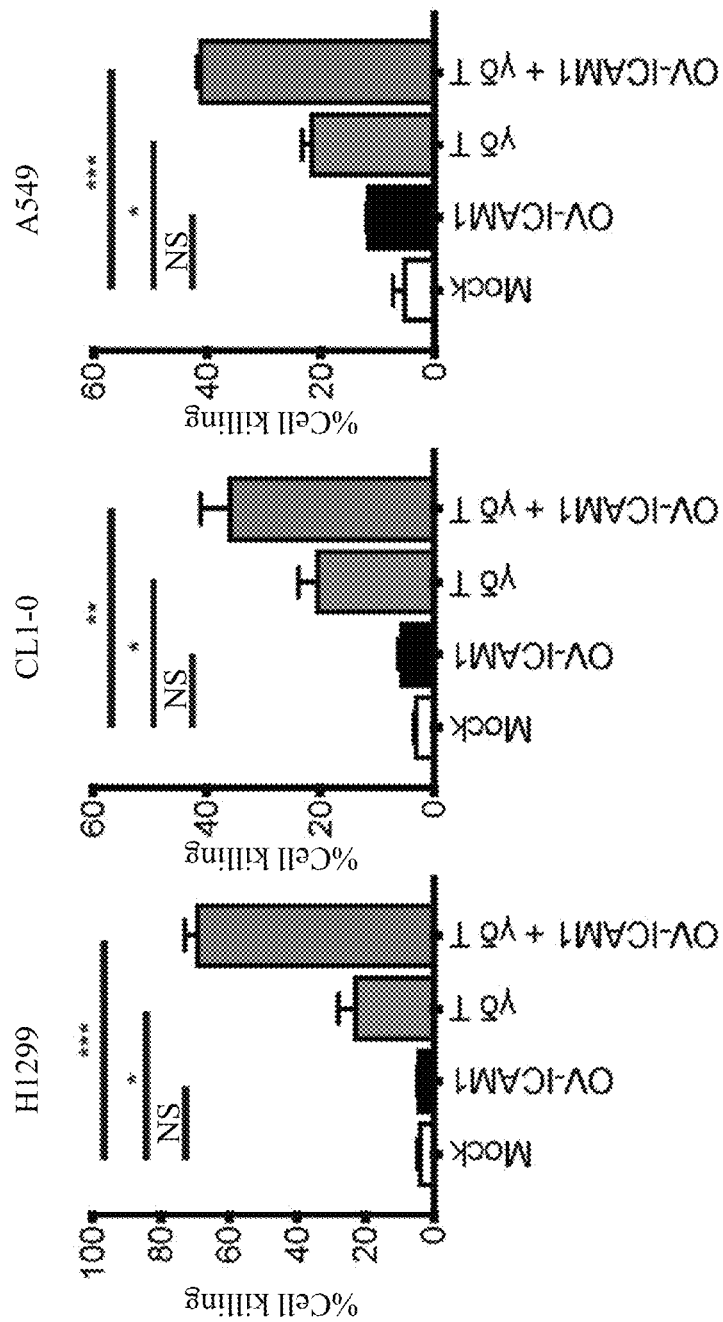

On the other hand, overexpression of ICAM-1 (OV-ICAM1) in lung cancer cell lines with a Tet-On system, as shown in FIG. 3F, markedly enhanced γδ T cell-mediated cytotoxicity on human lung cancer cells, mimicking the effect of DAC pretreatment, as shown in FIGS. 3I and 3J.

Figure 3K:
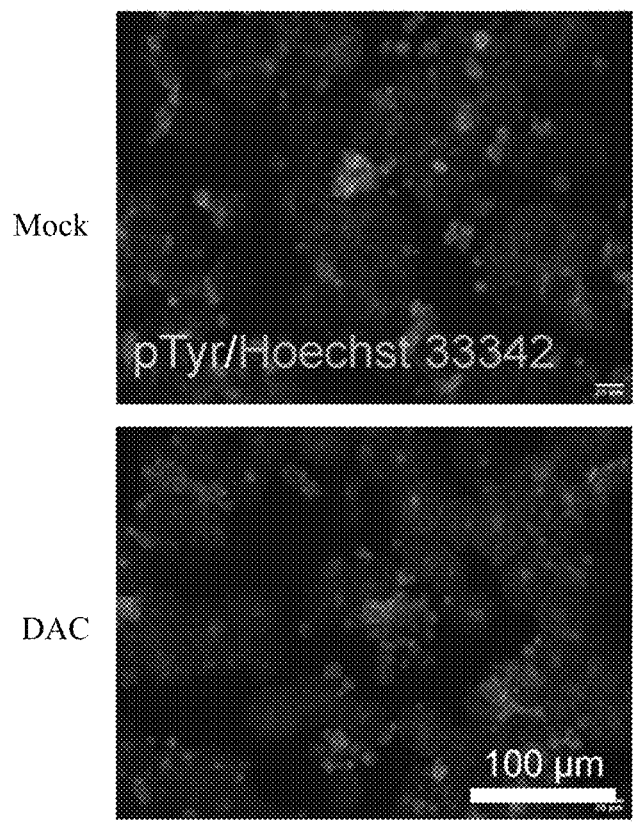
Figure 3K:
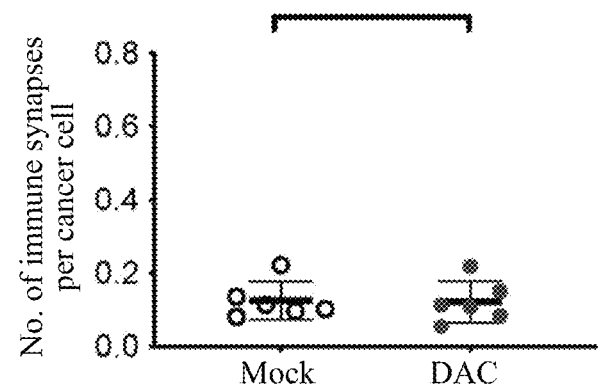
Figure 3L:
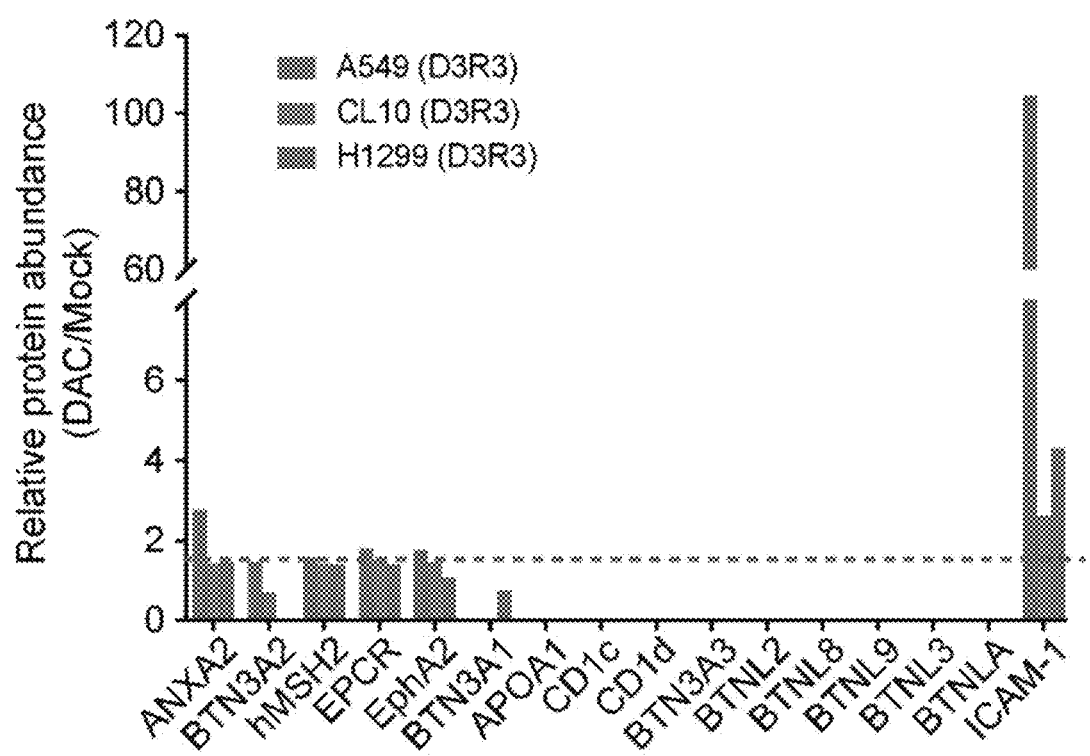

DAC treatment of ICAM-1-knockout cells failed to enhance immune synapse formation between lung cancer and γδ cells, as shown in FIG. 3K. Other immune synaptic proteins, such as putative ligands for γδ TCR, including CD 1d complexes, BTN3A, BTNL3 and others, are not consistently upregulated by DAC in all the cancer cell lines from the surface proteomic study as shown in FIG. 3L and are not essential for DAC's potentiating effect on γδ T cell cytotoxicity.

As presented here, DAC's potentiating effects on γδ T cell antitumor immunity comprises ICAM-1-mediated adhesion and stabilization of the synaptic structure.

Figure 4A:
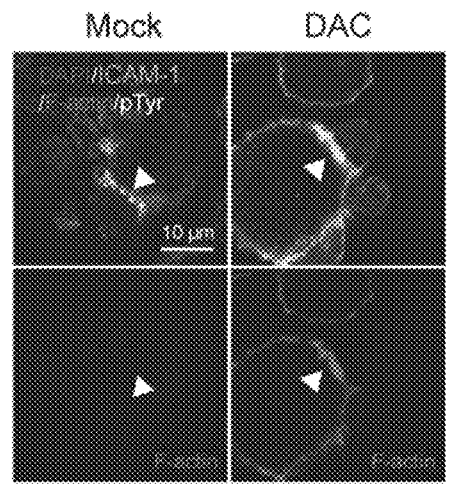
FIGS. 4A to 4K show the effect of decitabine stabilizing the immune synaptic cleft to facilitate tumor lysis via strengthening the actin cytoskeleton.
Figure 4B:
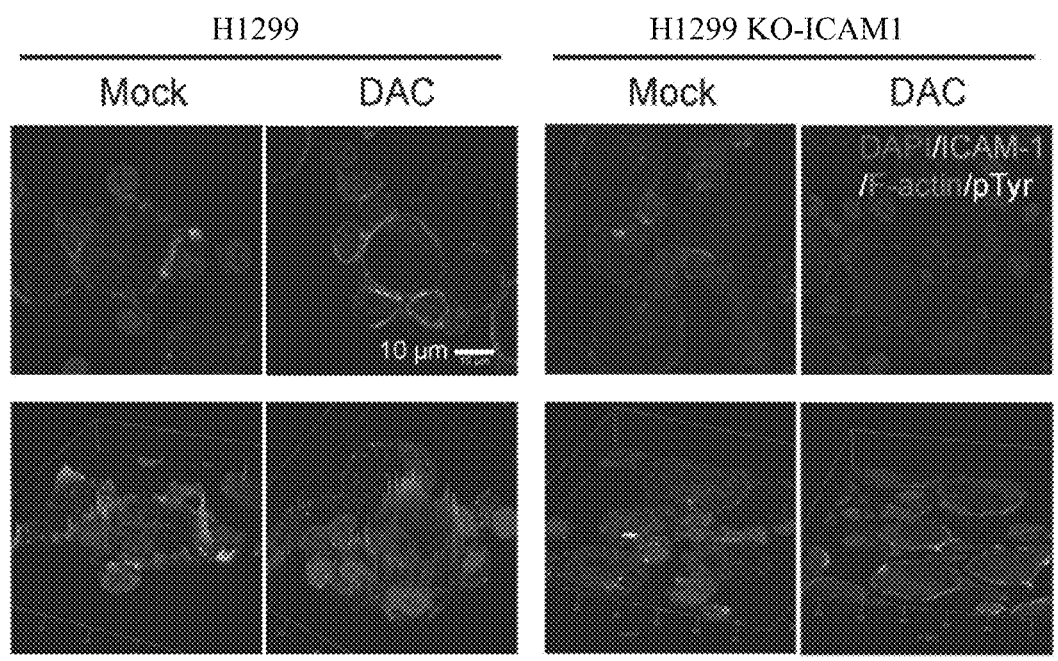
Figure 4C:
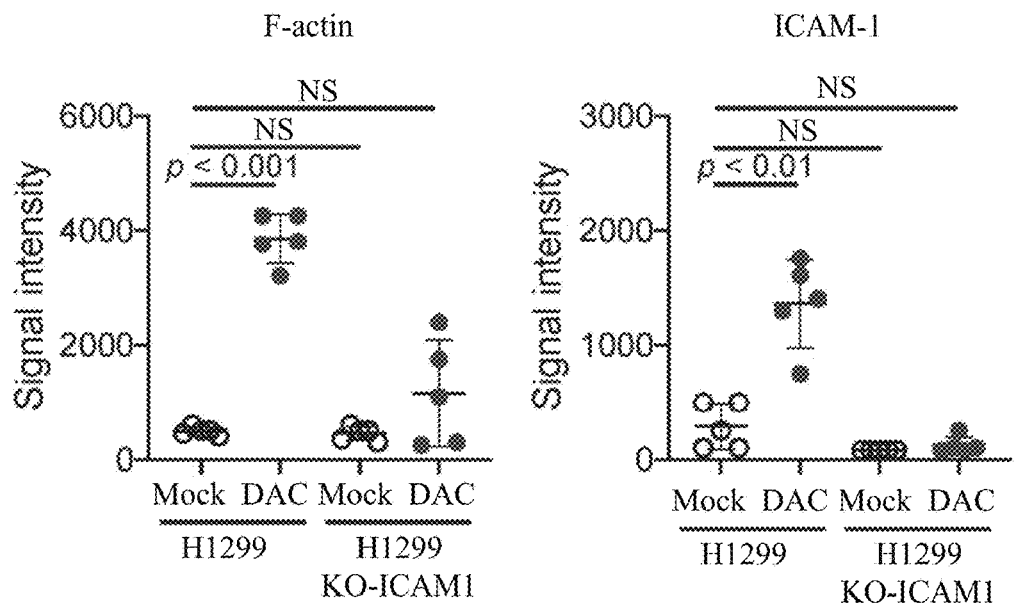
Figure 4D:
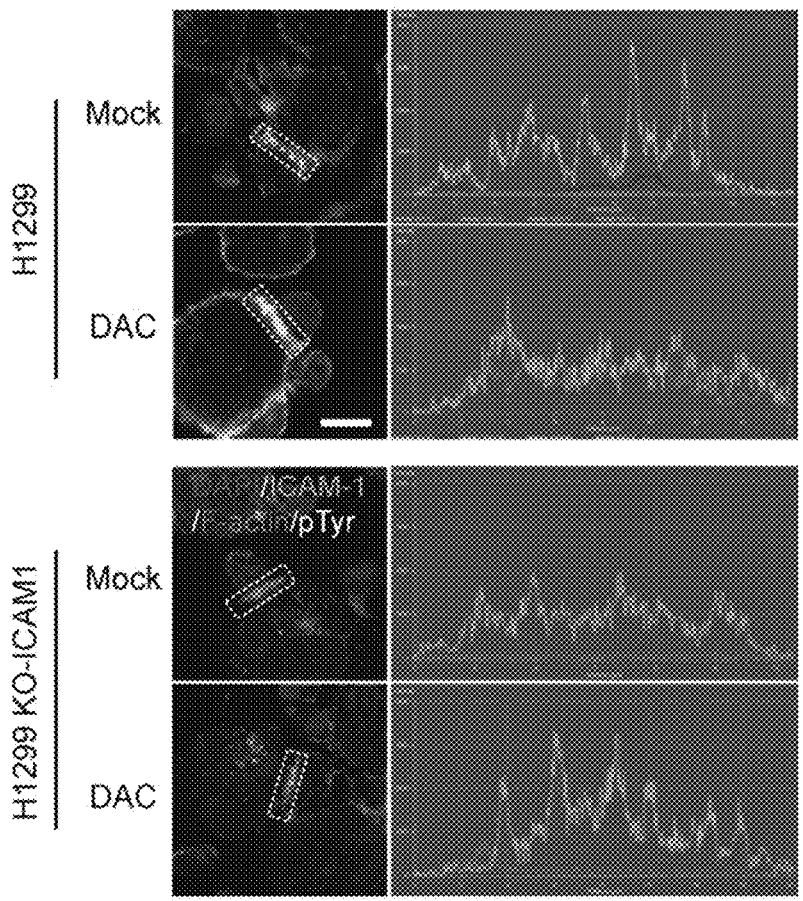

Example 5: Decitabine Rearranges Actin Cytoskeleton and Stabilizes the Immune Synaptic Cleft to Facilitate Tumor Lysis DAC affects the synaptic structure to exert MHC-unrestricted cytotoxicity, a marked accumulation of filamentous actin (F-actin) at the cancer cell membrane near the region of immune synapses, as shown in FIGS. 4A and 4B. When ICAM-1 was knocked out in H1299 lung cancer cells, there was a substantial decrease in DAC-induced F-actin accumulation at immune synapses, as shown in FIGS. 4C and 4D, which was associated with a significant reduction in synaptic cleft width, as shown in FIG. 4E.

Figure 4E:
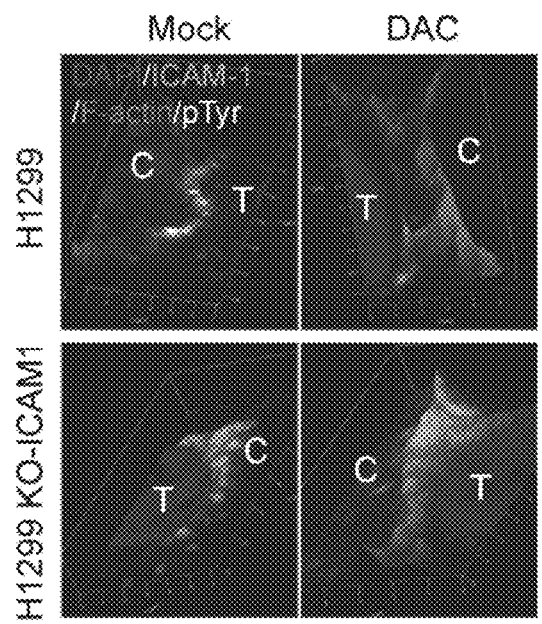
Figure 4F:
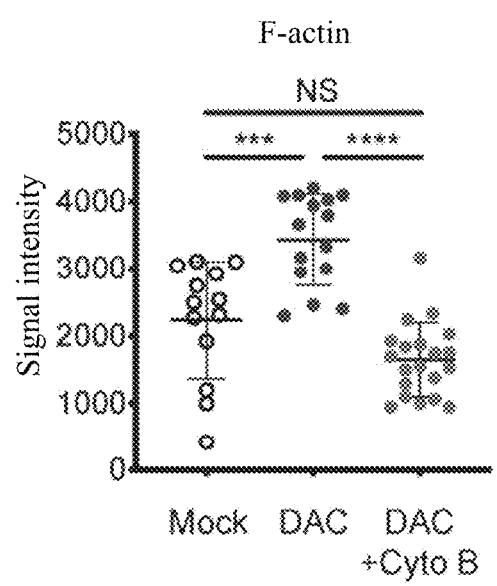
Figure 4G:
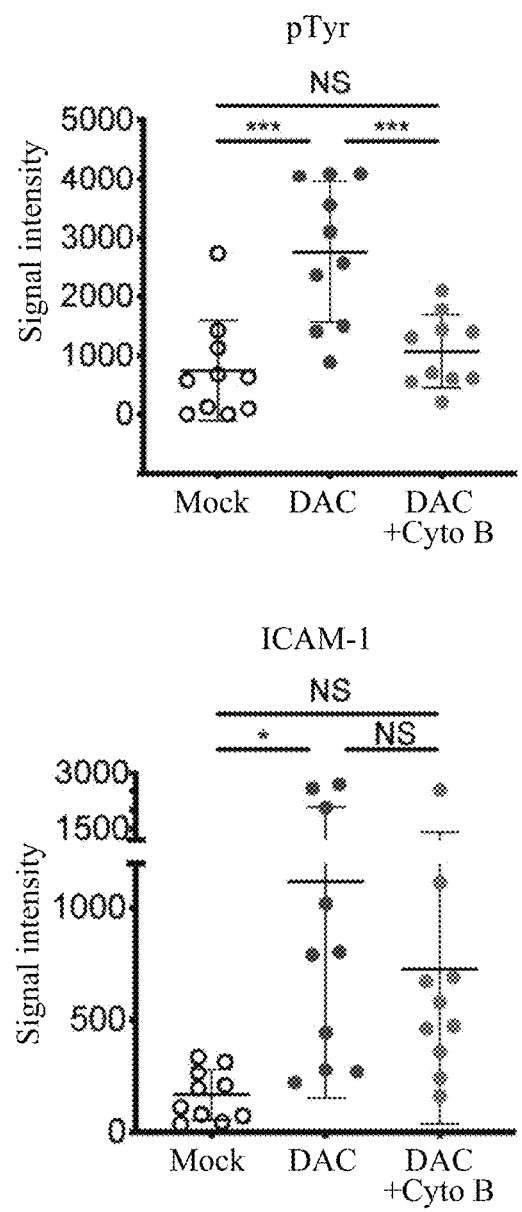
Figure 4H:
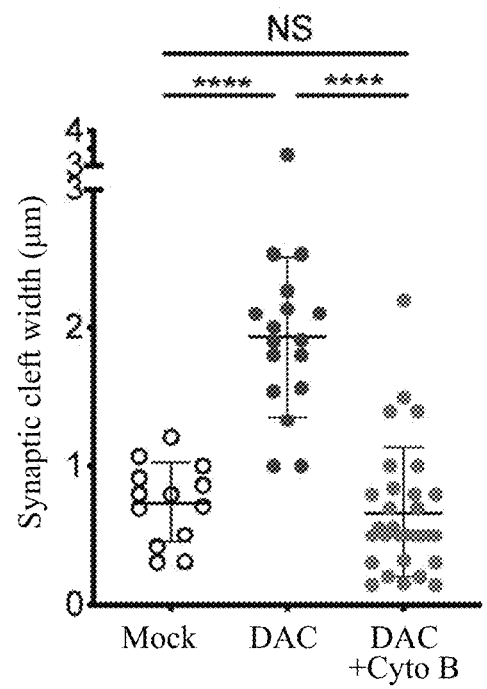
Figure 4I:
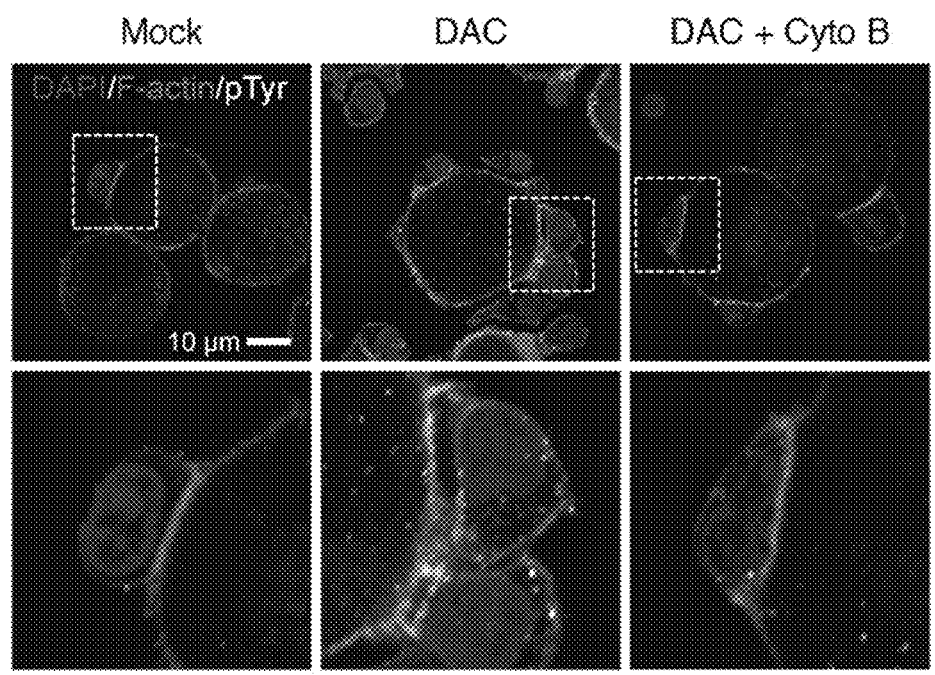
Figure 4J:
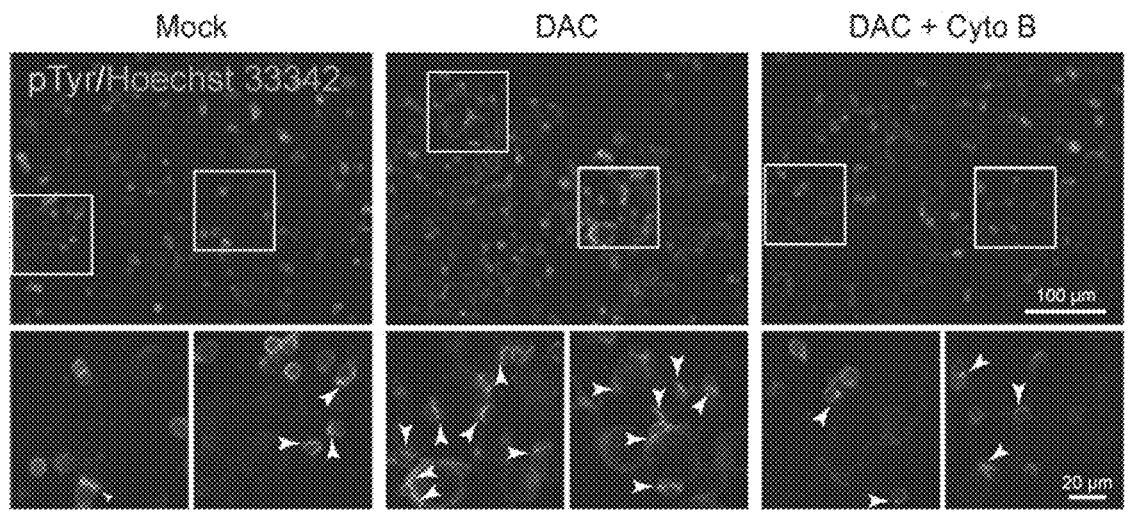
Figure 4K:
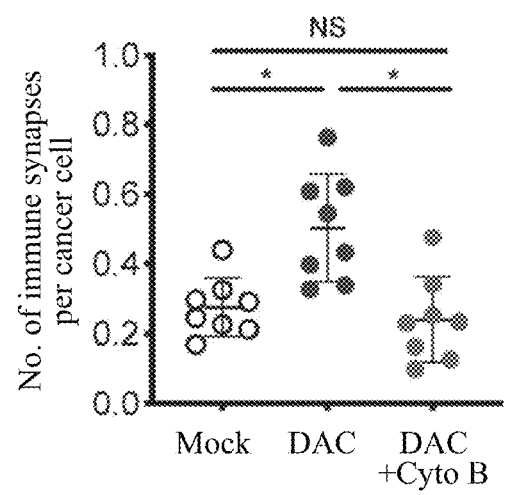

In contrast, DAC-treated lung cancer cells with normal ICAM-1 expression established immune synapses with a prominent synaptic cleft between cancer and γδ T cells, as shown in FIG. 4E. Pharmacological disruption of actin polymerization with cytochalasin B (Cyto B) abolished DAC-induced F-actin clustering and pTyr signaling at immune synapses but had minimal effects on ICAM-1 expression, as shown in FIGS. 4F and 4G. Additionally, cytochalasin B also diminished the DAC effects on the width of the synaptic cleft, as shown in FIGS. 4H and 4I. Furthermore, cytochalasin B significantly counteracted DAC's enhancing effects on immune synapse formation, as shown in FIGS. 4J and 4K.

F-actin accumulation and larger sizes of the synaptic clefts are characteristics of activating instead of inhibitory immune synapses. Data presented here suggest that DAC remodels the actin cytoskeleton to facilitate the formation of activating immune synapses between cancer and γδ T cells.

Example 6: Depletion of DNMTs Induces γδ T-Sensitive Cytoskeletal Gene Patterns at the Cancer Side of the Immune Synapse Proper cytoskeleton dynamics and arrangements in immune cells are relevant to satisfactory immune responses. It is shown that coordinated regulation of immune-related cytoskeletal gene networks is disrupted by DNMTs.

Figure 5A:
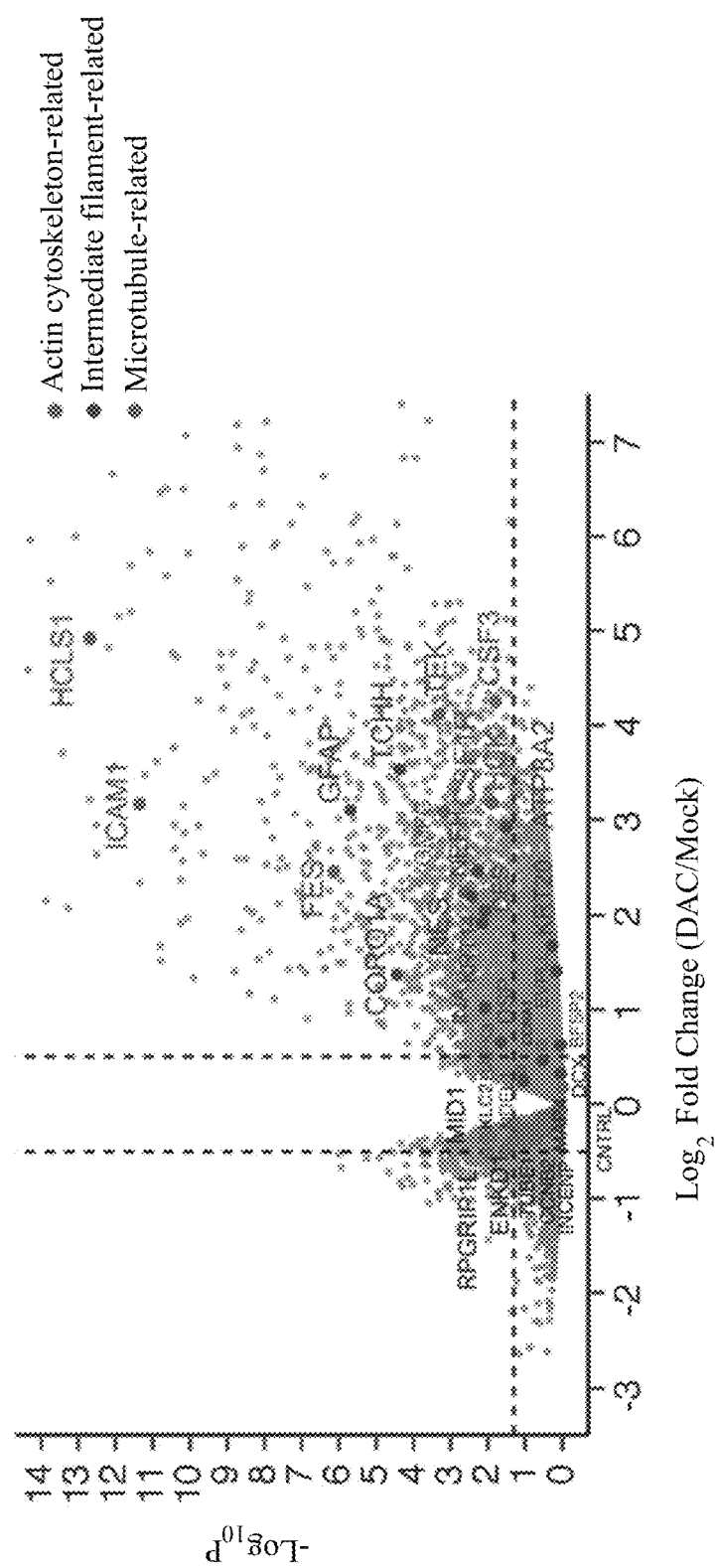
FIGS. 5A to 5H show that depletion of DNMTs induces γδ T-sensitive cytoskeletal gene patterns at the cancer side of the immune synapse.

Genome-wide mRNA-seq data of five lung cancer cell lines (i.e., A549, CL1-0, CL1-5, PC9, and H1299) after DAC treatment showed significant induction of genes/enzymes involved in cytoskeletal dynamics and reorganization, including CORO1A35, HCLS136, FES37, among others, as shown in FIG. 5A. Gene set enrichment analysis (GSEA) also revealed a striking enrichment for gene sets related to actin cytoskeleton reorganization as well as intermediate filament-based processes.

Figure 5B:
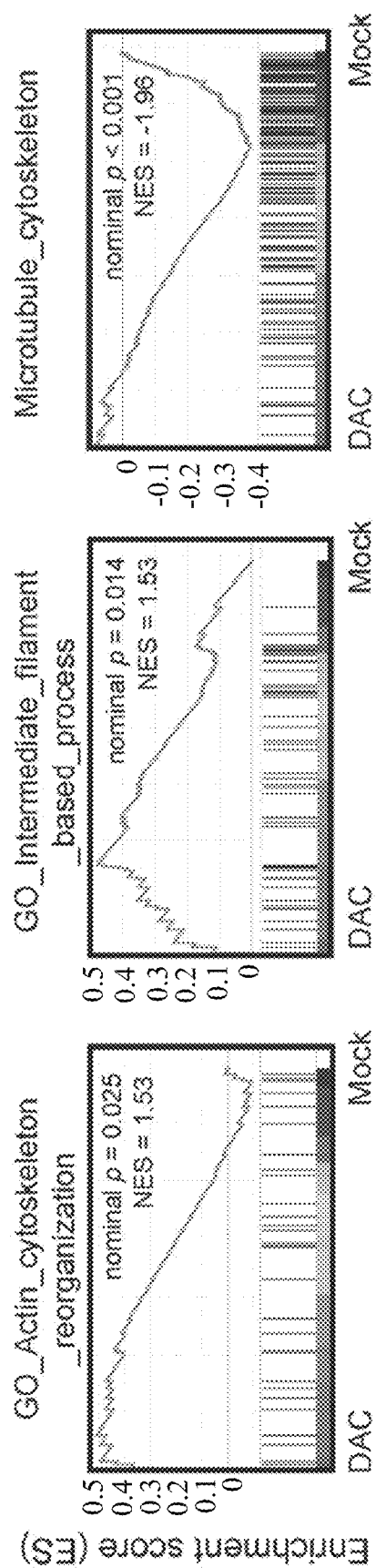
Figure 5C:
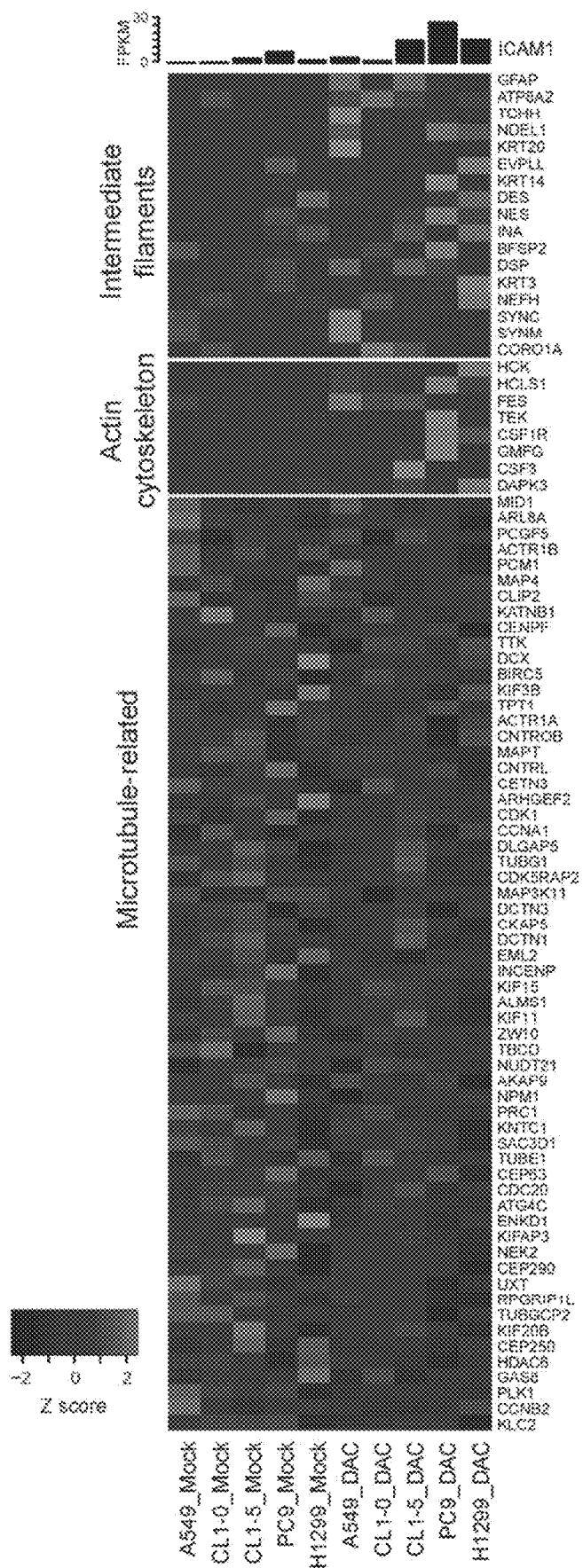
Figure 5D:
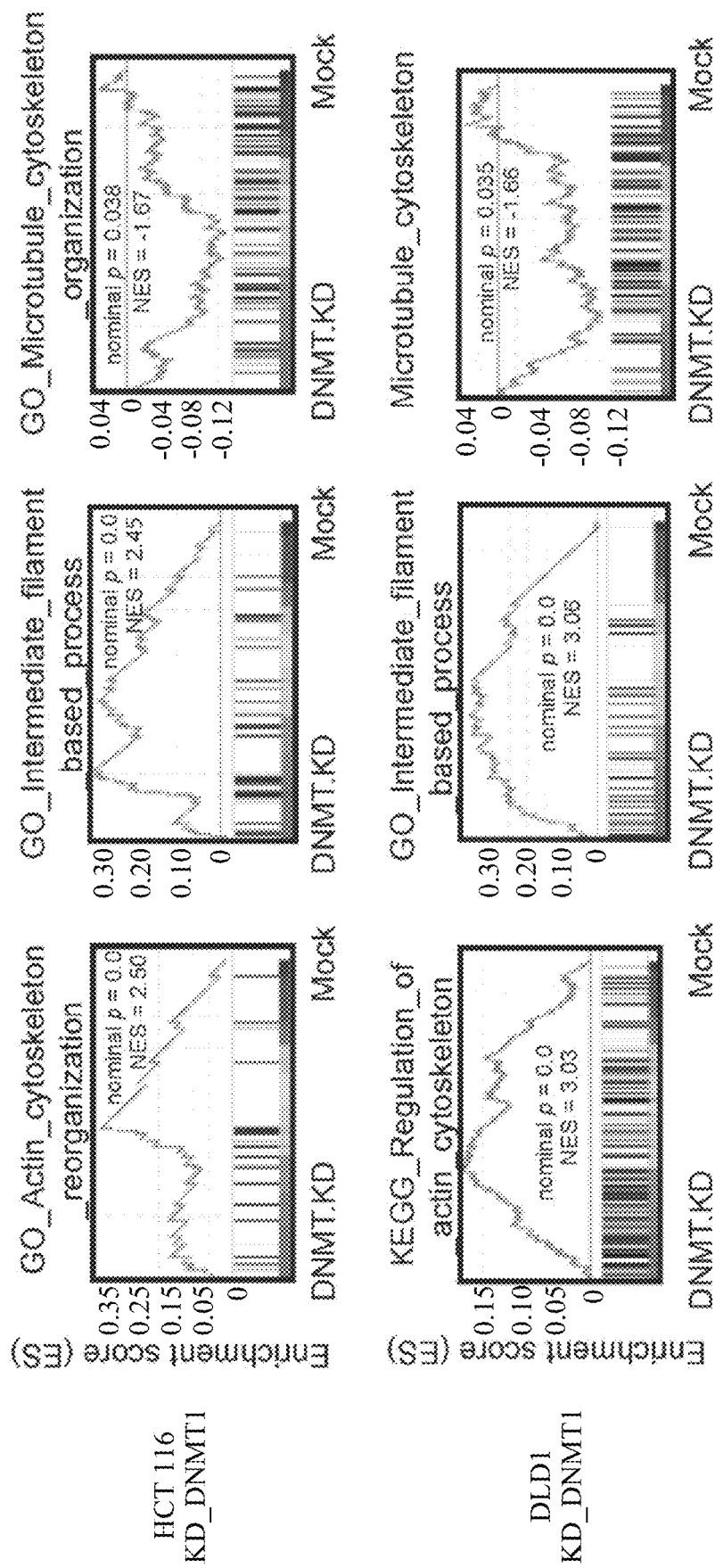

In contrast, the gene sets related to microtubules appeared to be downregulated, as shown in FIGS. 5B and 5C. Likewise, genetic depletion of DNMTs recapitulates similar cytoskeletal gene expression profiles, as shown by the analysis of transcriptomic data of colon cancer cell lines HCT116 and DLD1 subjected to shRNA targeting of DNMTs, as shown in FIG. 5D. Thus, the data indicate that the specific cytoskeletal remodeling pattern is DNMT-dependent.

Figure 5E:
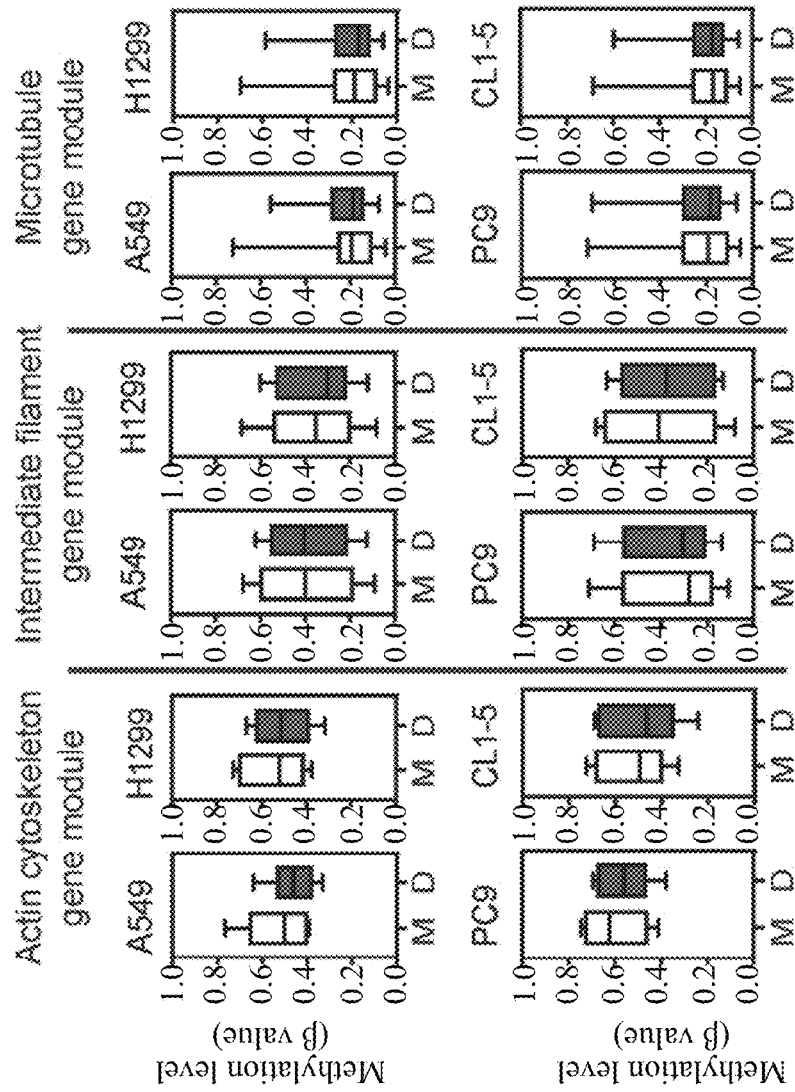

Furthermore, epigenetic regulation of these cytoskeletal genes after DAC treatment is a highly coordinated process. The promoter DNA methylation status of the genes in the three cytoskeletal gene modules, actin cytoskeleton, intermediate filaments and microtubules in human lung cancer cells were examined with Infinium MethylationEPIC BeadChips. It is found that genes in the actin gene module had a higher promoter DNA methylation at baseline and became demethylated with DAC treatment. In contrast, genes in the microtubule module tended to have low baseline methylation levels, which were minimally altered by DAC, as shown in FIG. 5E.

Figure 5F:
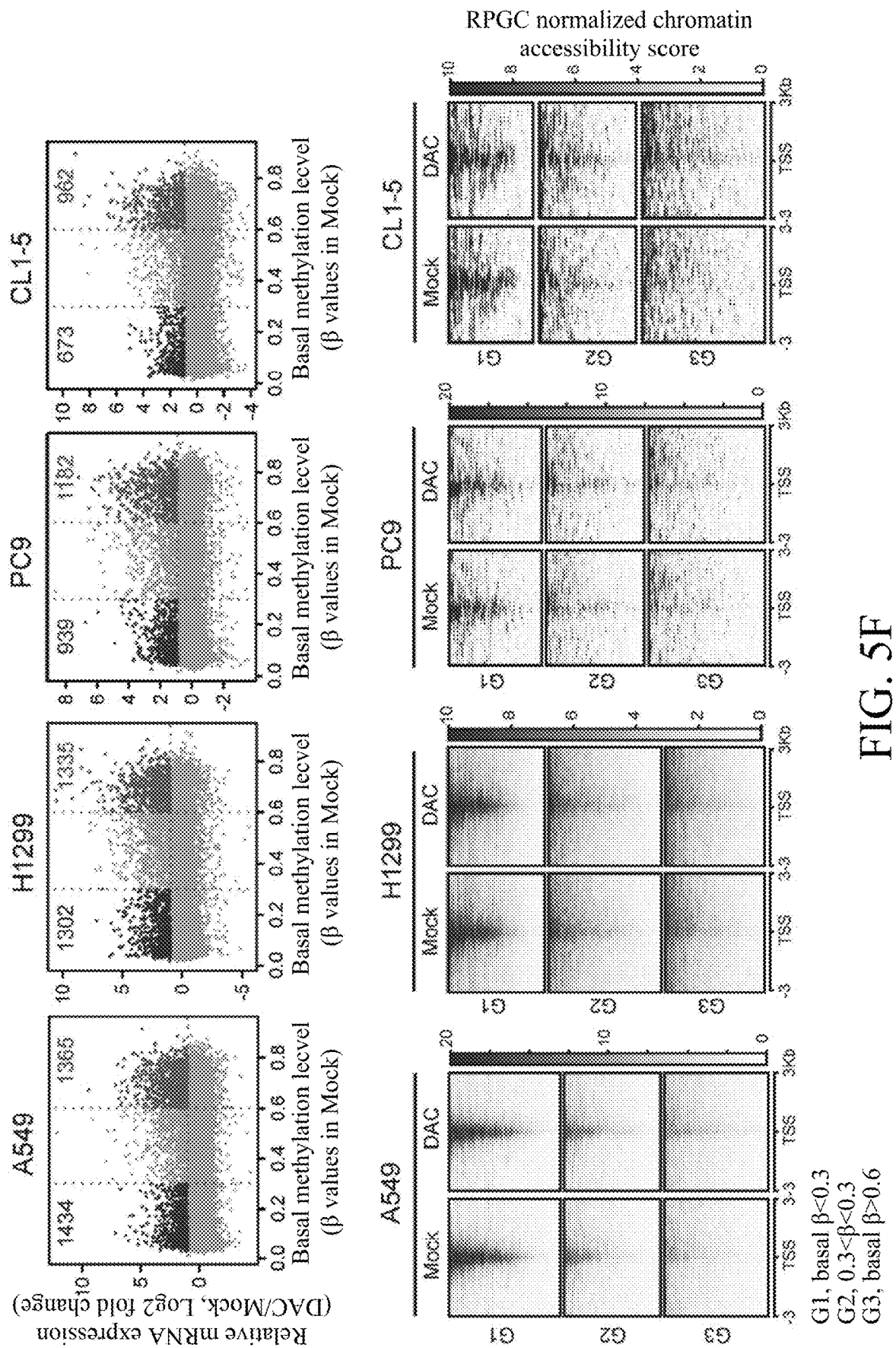

Omni-ATAC-seq was performed to investigate how chromatin accessibility is involved in DAC transcriptional regulation of cytoskeletal modules. Generally, the genes with high promoter DNA methylation levels at baseline tended to have inaccessible chromatin, which gained modest but critical accessibility after DAC treatment. Genes with low basal promoter DNA methylation that are upregulated by DAC have preexisting accessible chromatin at the TSS, which remains accessible following DAC treatment, as shown in FIG. 5F.

Figure 5G:
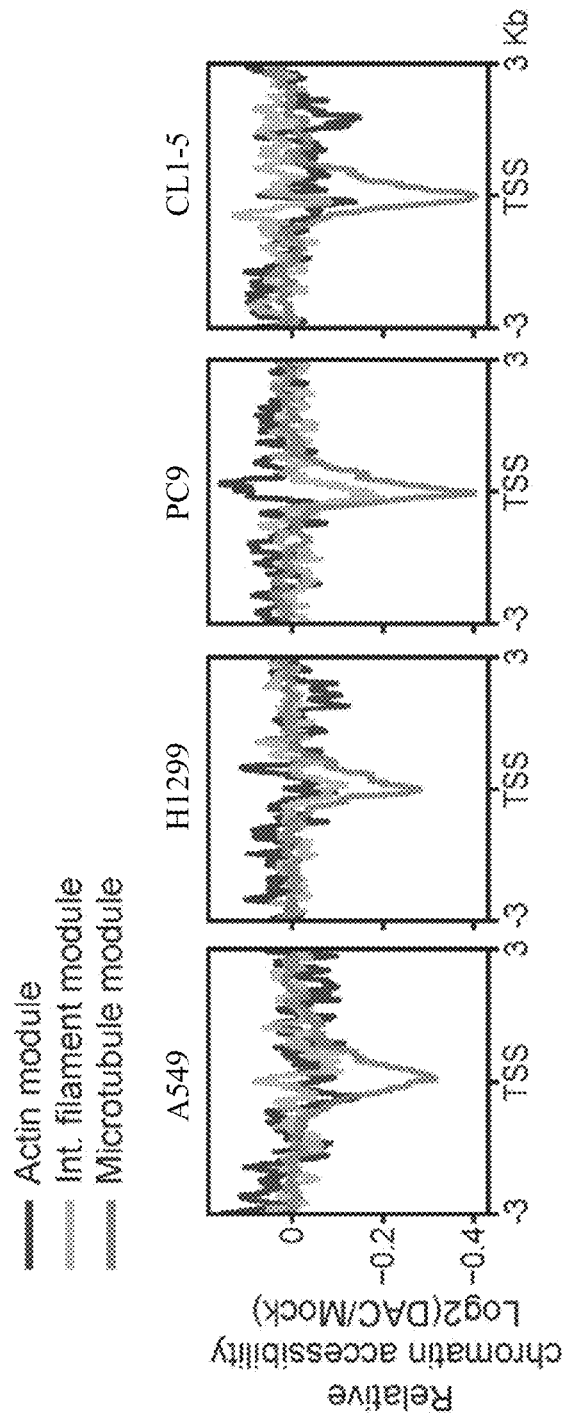
Figure 5H:
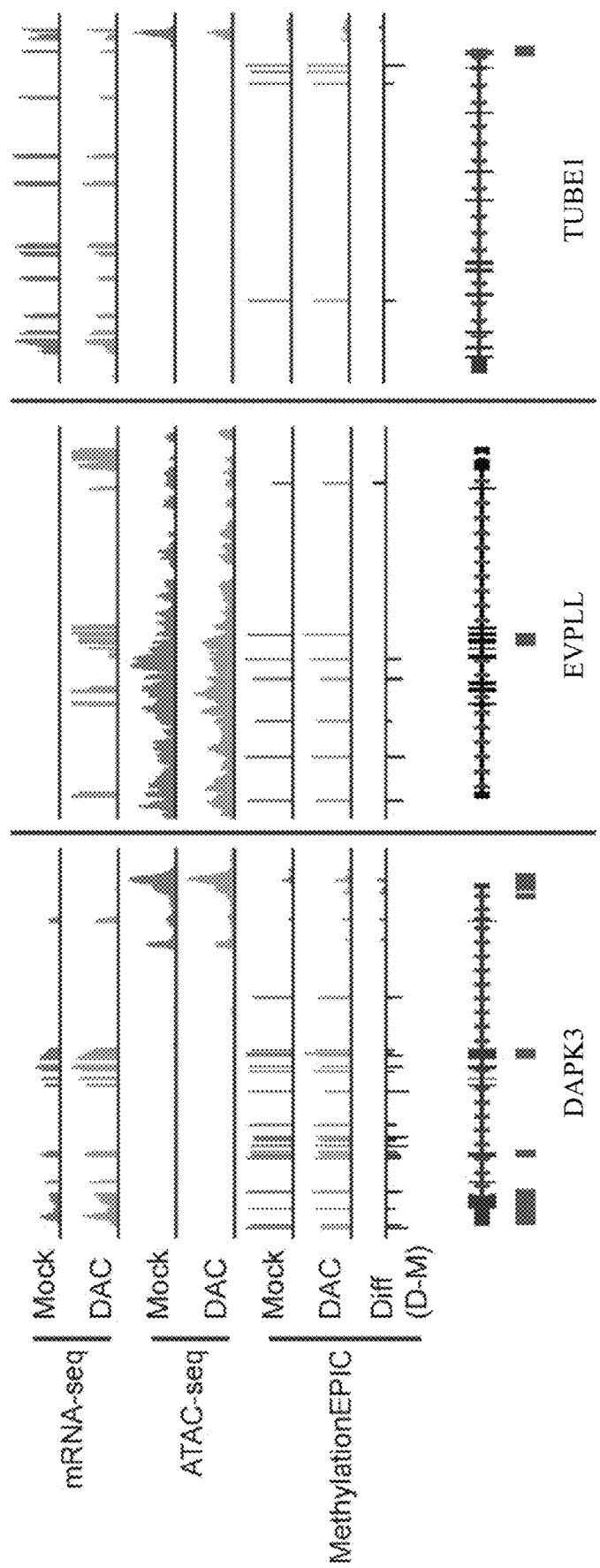

The chromatin patterns of the cytoskeletal-related genes were examined, moderate chromatin changes were found at the gene promoters in actin- or intermediate filament-related processes, as shown in FIG. 5G. In contrast, there were marked decreases in promoter chromatin accessibilities at the microtubule-related genes downregulated by DAC, as shown in FIG. 5G. The coordinated regulatory patterns were exemplified by individual genes in each of the cytoskeletal modules EVPLL, TUBE1, and DAPK3, as shown in FIG. 5H.

Figure 6A:
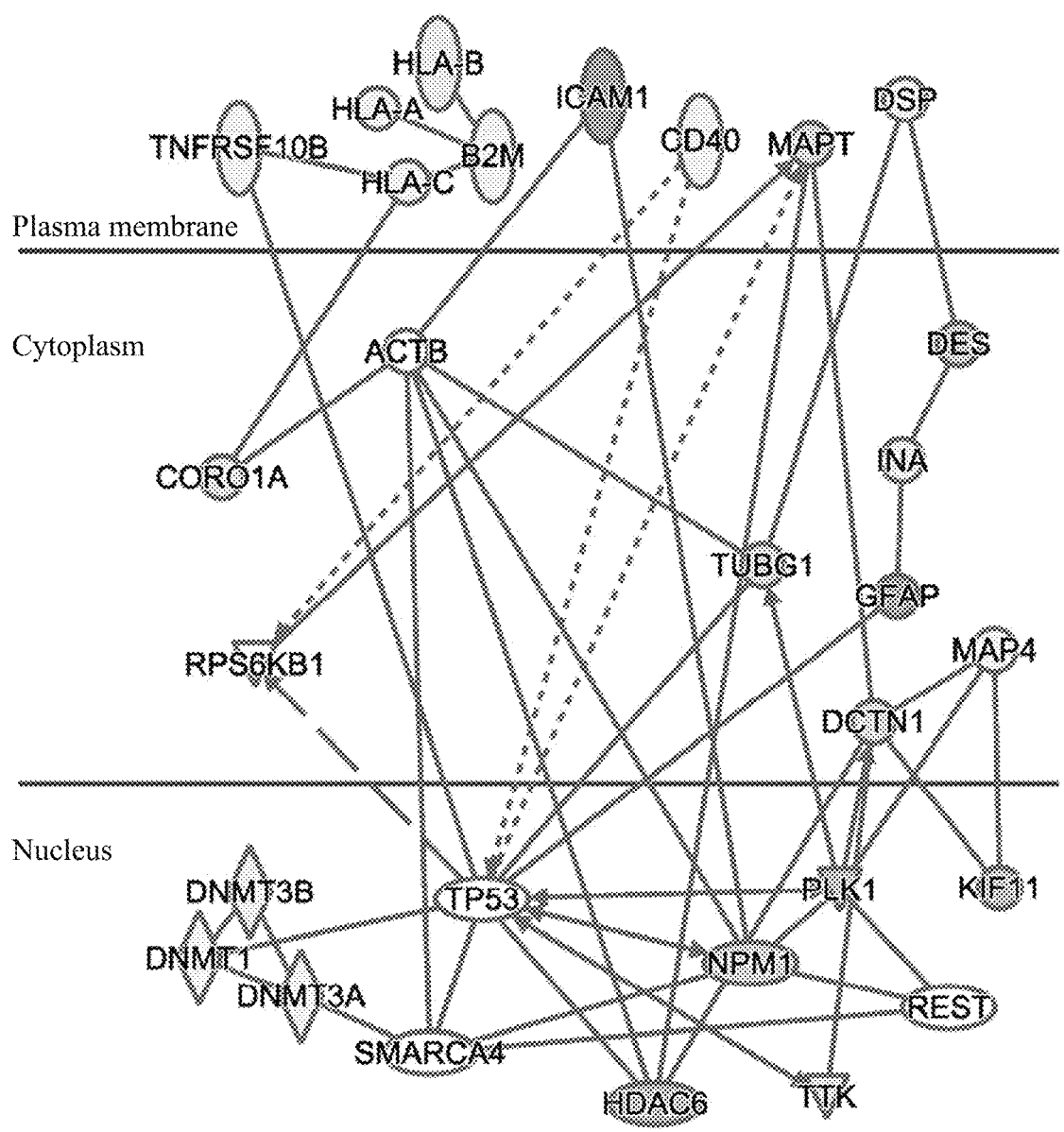
FIGS. 6A to 6C show the results of network analysis revealing TP53 as a hub for interactions of immune synaptic molecules, the cytoskeleton and epigenetic proteins.

Example 7: TP53 is a Hub for Interactions of Immune Synaptic Molecules, Cytoskeleton and Epigenetic Proteins The relationships between epigenetic proteins and immune synaptic cytoskeleton were shown by a gene network analysis of DAC transcriptomes in lung cancer cell lines by Ingenuity Pathway Analysis (IPA), which revealed an intimate interconnectedness between immune synaptic molecules, the cytoskeleton, and epigenetic proteins, as shown in FIG. 6A. As shown in the network, a general downregulation of genes involved in microtubule organization was revealed, including TUBG1, DCTN1, and PLK1. In contrast, genes participating in actin and intermediate filament dynamics such as CORO1A, GFAP, and DES were upregulated.

ICAM1 bridges surface immune receptors/HLA molecules to the cytoskeleton in the cytoplasm, which links to TP53 and other epigenetic modifiers such as DNMTs, HDACs, and SMARCA4 in the nucleus, as shown in FIG. 6A.

Figure 6B:
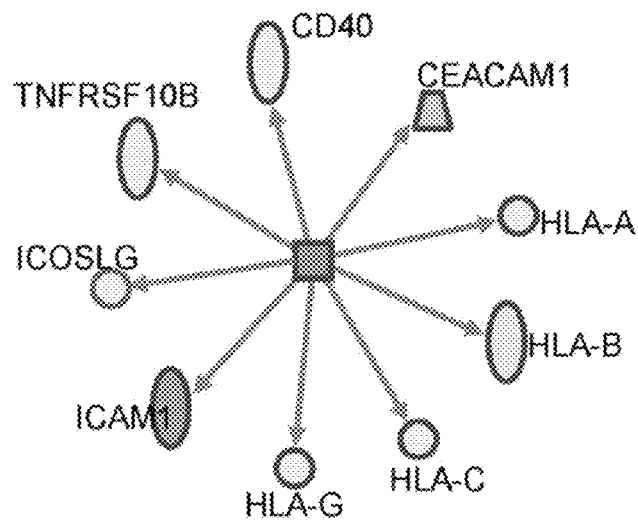
Figure 6B:
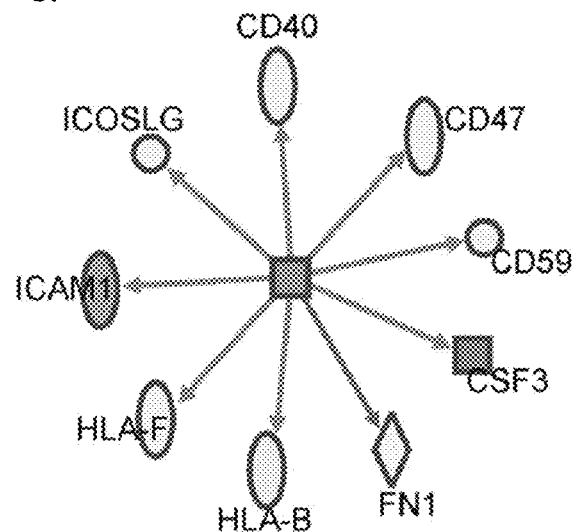
Figure 6C:
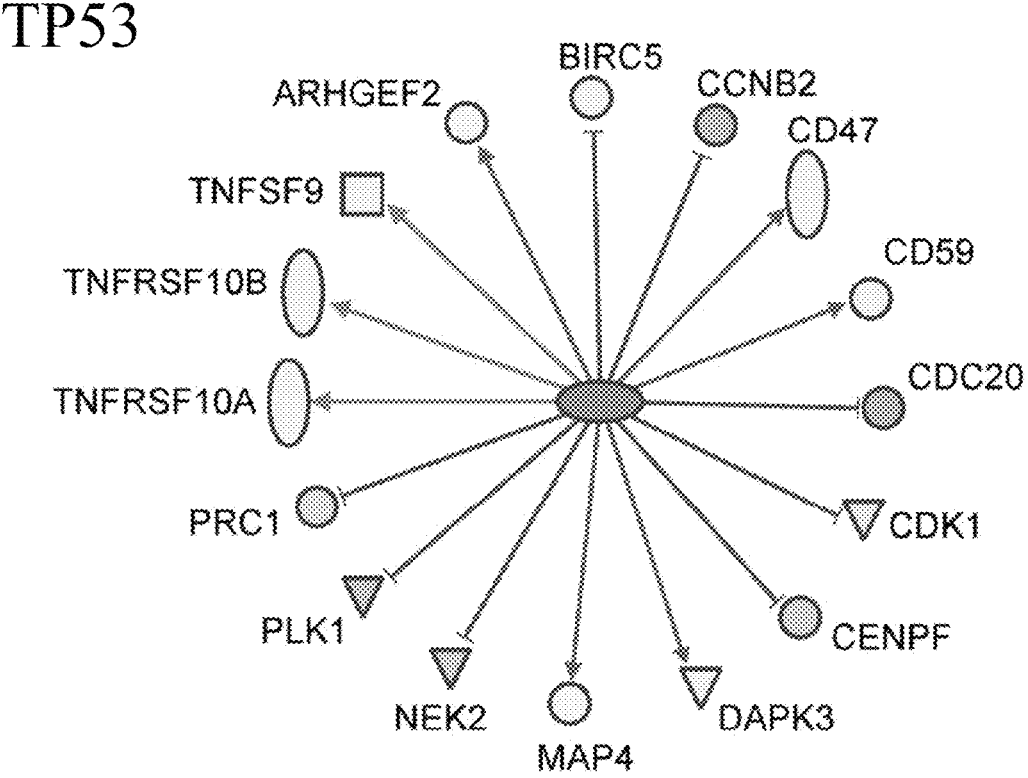

Further upstream regulator analysis showed that T cell effector cytokines, such as IFN-γ and TNF-α, enhance the DAC-induced expression pattern of immune surface molecules, including ICAM-1, ICOSLG, and HLAs, as shown in FIG. 6B. In addition, TP53 is a hub gene mediating the coordinated changes of immune surface molecules, and the cytoskeleton in response to epigenetic modifications. Therefore, a functional TP53 network is necessary for effective immune potentiating effects by DAC, as shown in FIG. 6C.

Example 8: Characterization of Functional γδ T Cell Subsets Modulated by Decitabine DAC concurrently affects γδ T cells. Mass cytometry was used to profile both phenotypic and functional immune parameters of expanded γδ T cells with or without DAC treatment. Data from both groups of cells were clustered together by an x-shift algorithm, and the frequency of each subpopulation in untreated and DAC-treated expanded γδ T cells was calculated.

Figure 7A:
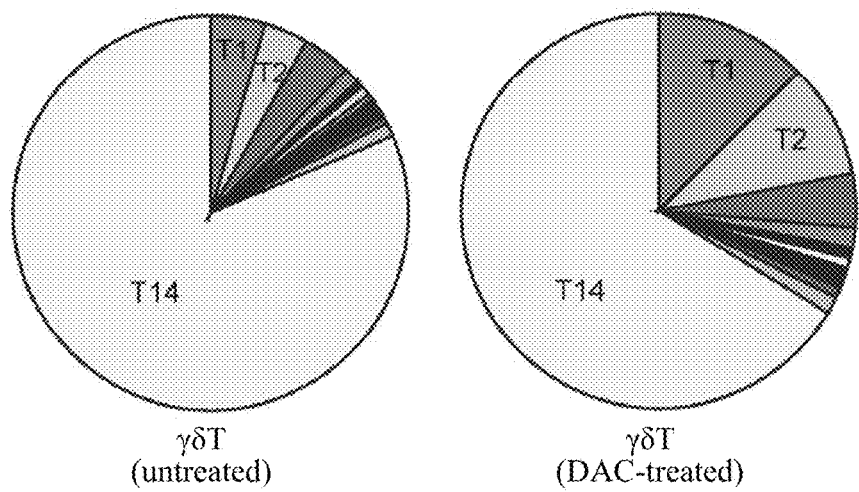
FIGS. 7A to 7D show the single-cell mass cytometry characterization of functional γδ T cell subsets modulated by decitabine.
Figure 7B:
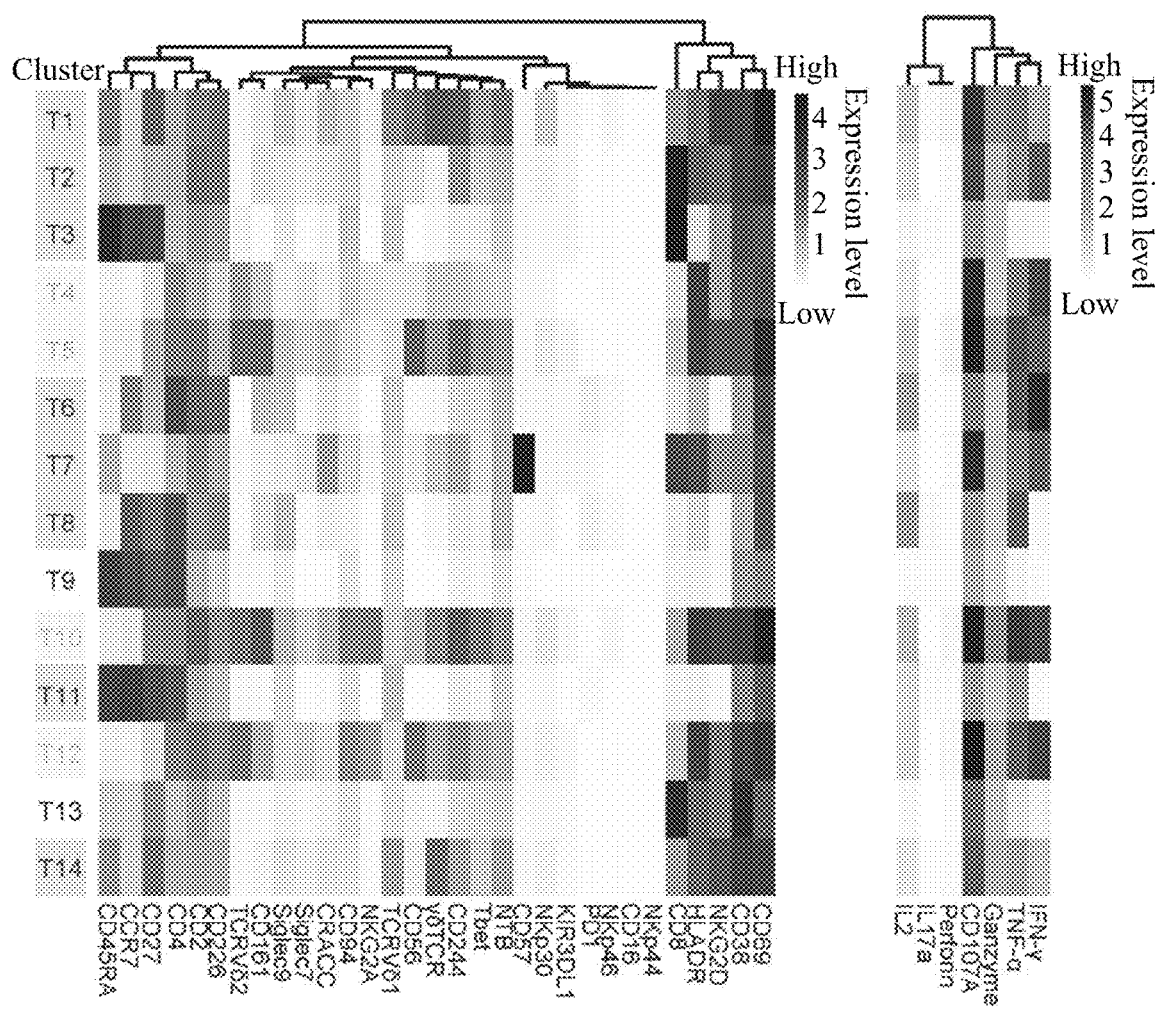

As shown in FIG. 7A, 14 clusters within CD3+ T cells were revealed (termed T1 through T14, ranked by the frequency differences between the untreated and DAC-treated groups), each with distinct phenotypic and functional effector signatures. It is noted that the top two cell clusters induced by DAC treatment correspond to Vδ1 and express higher levels of CD226, CD244, CD2, and CRACC together with stronger functional effectors, including CD107A, TNF-α, granzyme B, IL-2 and IFN-γ, than those expressed by the clusters decreased in cell frequency after DAC treatment, as shown in FIG. 7B.

Figure 7C:
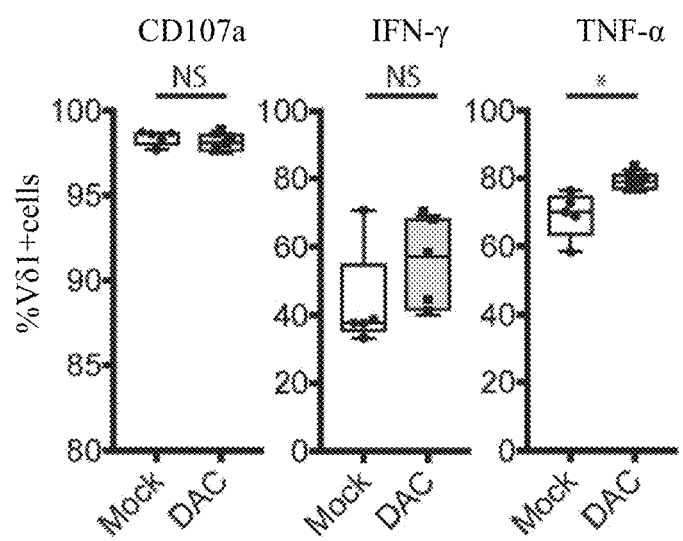
Figure 7D:
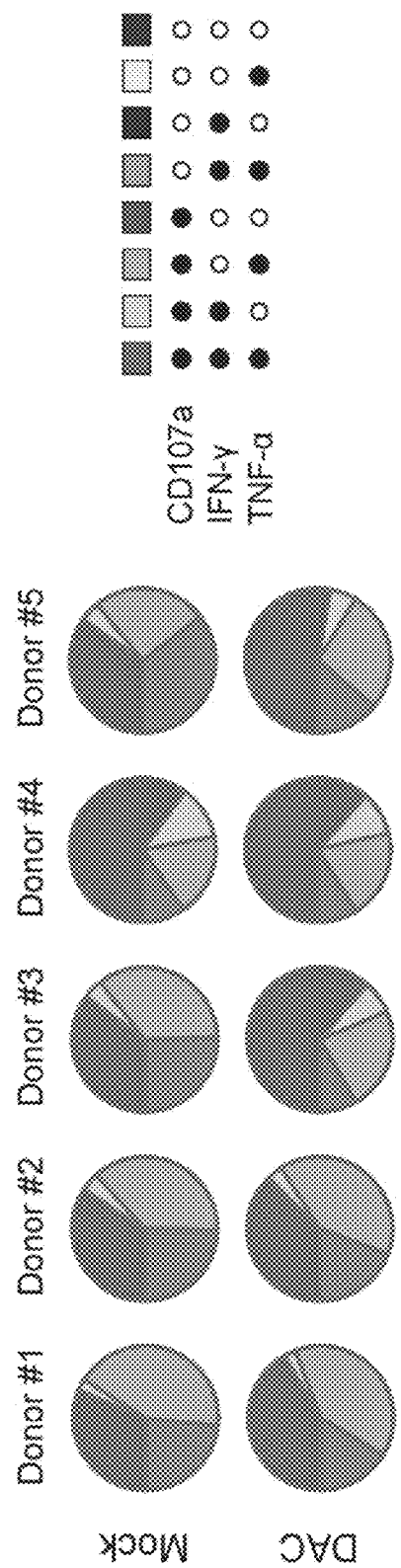

The result was corroborated by Vδ1 T cells expanded from another five healthy individuals treated with 10 nM DAC. A trend of increased production of antitumor effector cytokines such as IFN-γ and TNF-α was observed, as shown in FIG. 7C. Moreover, following the DAC treatment, there was a marked increase in the percentages of polyfunctional Vδ1+ cells that co-expressed two or more effector cytokines in three of the five individuals (donors #1, #3 and #5), as shown in FIG. 7D. As polyfunctional T cells are often considered the hallmark of protective immunity, the data that DAC increases polyfunctionality of γδ T cells support the advantages of combination therapy using DAC and adoptive transfer of γδ T cells.

Example 9: Combination Therapy of DAC and Adoptive Transfer of γδ T Cells Prolongs Survival in Mice Bearing Lung Cancer Xenografts In vivo effects of combination therapy with DAC (intraperitoneal injection) followed by the adoptive transfer of ex vivo expanded human γδ T cells (intravenous injection) in immunocompromised NSG™ (NOD.Cg-Prkdc$^{scid}$ Il2rg$^{tm1Wjl}$/SzJ) mice bearing H1299 human lung cancer xenografts was shown in this example, as depicted in FIG. 8A.

Figure 8A:
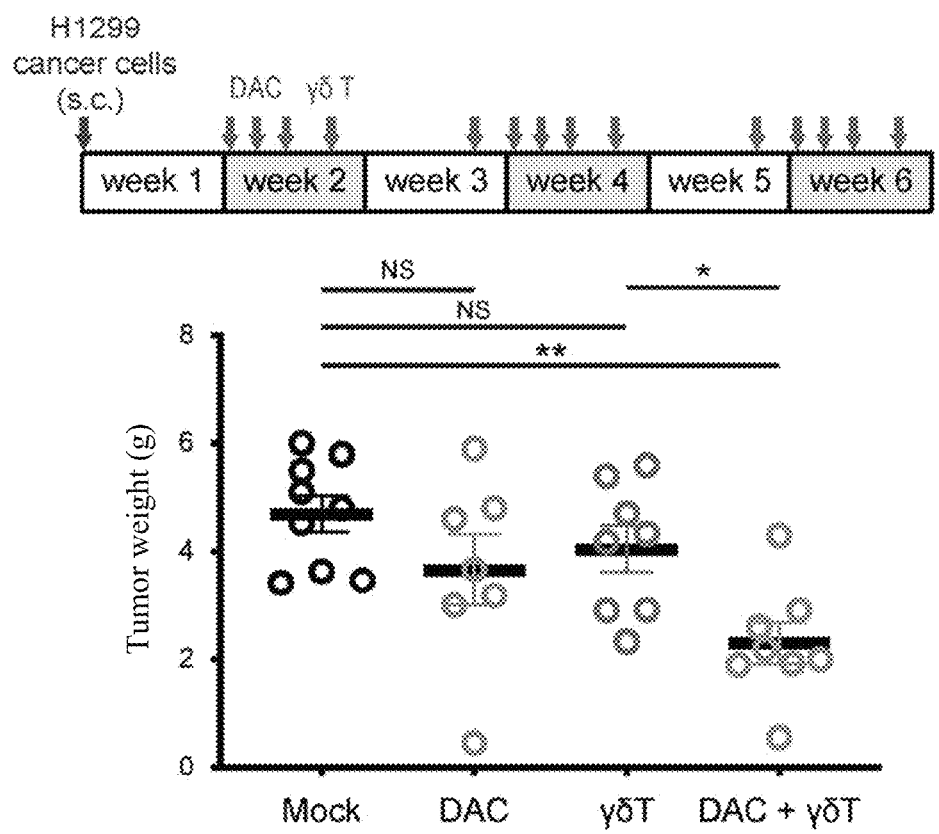
FIGS. 8A to 8E show the stratification of lung cancer patients by the immune cytoskeleton gene signature.
Figure 8B:
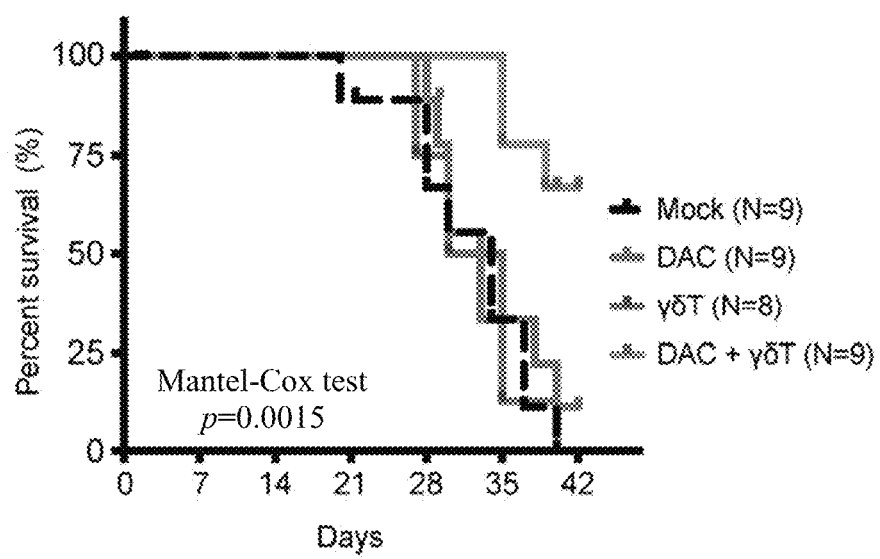
Figure 8C:
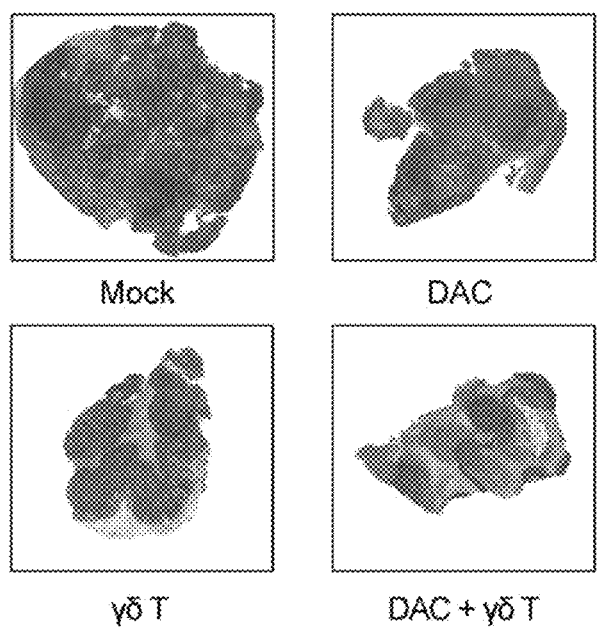

The mice in the combination therapy group had smaller tumors and significantly better overall survival than the mice receiving normal saline or subject to either treatment alone, as shown in FIGS. 8A and 8B. Pathologically, the tumor tissues in the combination group were smaller and displayed loose architecture and marked fibrosis. In contrast, tumor tissues in the control group appeared to be hypercellular, with regions of hemorrhage and necrosis, as shown in FIG. 8C. The data demonstrate that combining DAC with the adoptive transfer of γδ T cells treats lung cancer in vivo with higher efficacy.

Figure 8D:
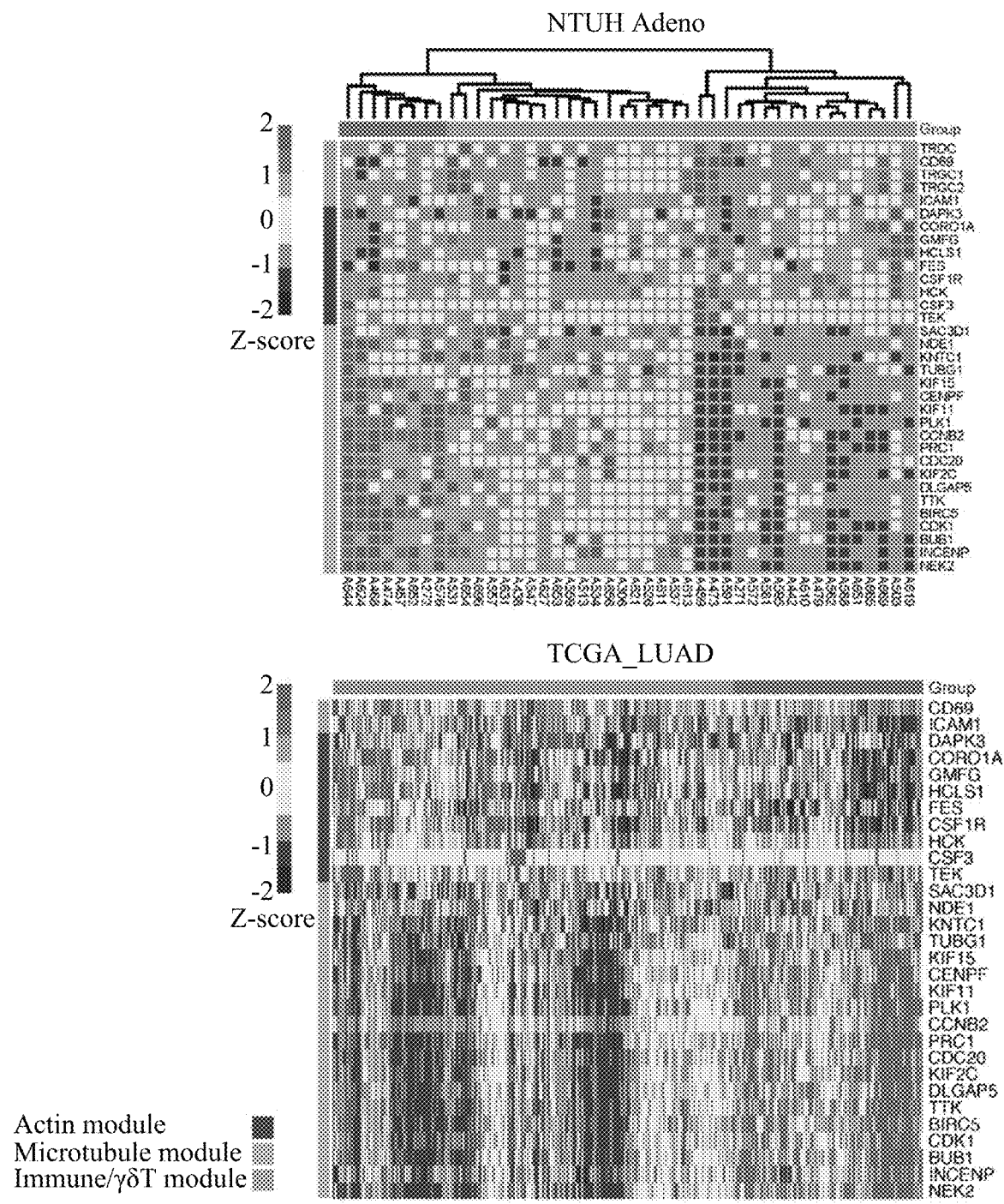

Example 10: Cytoskeletal Gene Signatures Correlate with Overall Survival of Lung Adenocarcinoma Patients DAC-induced cytoskeletal signatures identify and distinguish patients by their general immunoreactivity and/or for the benefit of epigenetic-primed γδ T cell therapy. The RNA-seq data from the primary lung cancer tissues at the National Taiwan University Hospital and the TCGA portal were examined Unsupervised clustering of primary lung adenocarcinoma tissues based on the core enrichment genes from the actin-, intermediate filament-, and microtubule-related gene modules as shown in FIG. 5C revealed three groups of patients: immune-sensitive, immune-intermediate, and immune-insensitive, as shown in FIG. 8D.

Figure 8E:
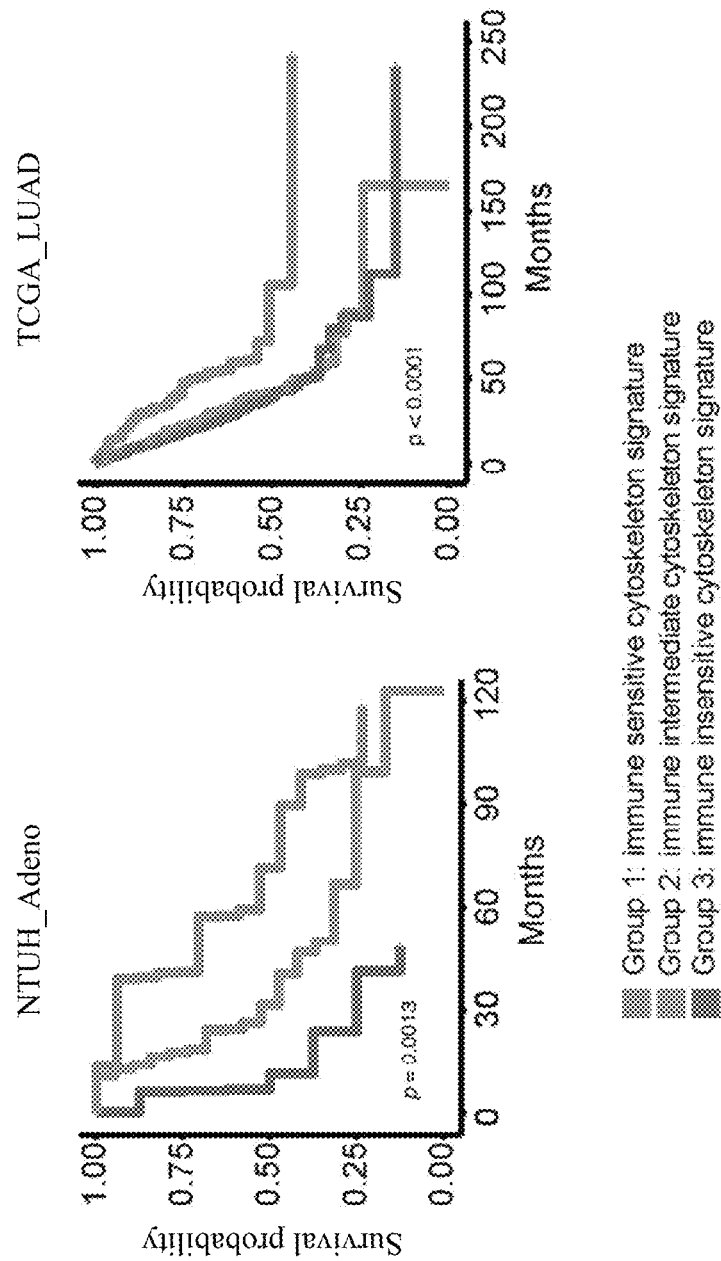

Better overall survival was found in the patients with the immune-sensitive signature, corresponding to the DAC-induced γδ T responsive pattern, that is, upregulated actin and intermediate filament modules and downregulated microtubule module, as shown in FIG. 8E.

In contrast, the γδ T cell-insensitive signature was associated with the worse prognosis in both cohorts, as shown in FIG. 8E.

The data here highlight the epigenetic reorganization of the cytoskeleton as a clinical indicator for patient outcome, and the cytoskeletal signatures serve as biomarkers to be used in a method to provide prognosis of the patients and also in a method to identify target cancer patients who better respond to γδ T cell-based therapy.

The present disclosure has been described with embodiments thereof, and it is understood that various modifications, without departing from the scope of the present disclosure, are in accordance with the embodiments of the present disclosure. Hence, the embodiments described are intended to cover the modifications within the scope of the present disclosure, rather than to limit the present disclosure. The scope of the claims therefore should be accorded the broadest interpretation so as to encompass all such modifications.

What is claimed is:

1. A method for treating or ameliorating cancer in a subject in need thereof, comprising administering to the subject a DNA demethylating agent and an immune cell, wherein the DNA demethylating agent is a DNA methyltransferase inhibitor,
   wherein the immune cell is a γδ T cell or an NK cell,
   wherein the cancer in the subject is colon cancer, breast cancer, or lung cancer,
   wherein the subject is identified and distinguished to be a patient with an immune-sensitive signature comprising upregulated actin and intermediate filament modules and downregulated microtubule module by obtaining and analyzing cytoskeleton gene patterns presented by a cancer cell of the cancer, and
   wherein the DNA methyltransferase inhibitor increases formation of an immune synapse between the immune cell and the cancer cell, thereby enhancing cancer-killing of the immune cell.

2. The method of claim 1, wherein the γδ T cell is a Vδ1+γδ T cell, a Vδ2+γδ T cell or a Vδ1⁻ Vδ2⁻ γδ T cell.

3. The method of claim 1, wherein the immune cell is autologous or allogeneic.

4. The method of claim 1, wherein the immune cell is expanded ex vivo.

5. The method of claim 1, wherein the DNA methyltransferase inhibitor (DNMTi) is decitabine, azacytidine, guadecitabine or a combination of decitabine and cedazuridine.

6. The method of claim 1, wherein the formation of the immune synapse increases expression of ICAM-1.

7. The method of claim 1, wherein the formation of the immune synapse comprises an increase of filamentous actin at the cancer cell near the immune synapse.

8. A method for identifying a target cancer patient for accepting a combination therapy of the DNA demethylating agent and immune cell according to claim 1, comprising:
   obtaining a cancer tissue from the patient;
   analyzing expression of cytoskeletal genes in the cancer tissue; and
   determining the target cancer patient based on the expression of the cytoskeletal genes,
   wherein the upregulation of actin and intermediate filament modules and the downregulation of the microtubule module indicates the patient is a target.

9. The method of 8, wherein the cytoskeletal genes comprise at least one gene of actin, intermediate filament, microtubule or any combination thereof.

10. The method of claim 1, wherein the immune cell is a parental immune cell without artificial genetic modification or is an engineered immune cell.

11. The method of claim 10, wherein the engineered immune cell is a chimeric antigen receptor T (CAR-T) cell, a chimeric antigen receptor NKT (CAR-NKT) cell or a chimeric antigen receptor NK (CAR-NK) cell.

* * * * *